（12） United States Patent
Hester et al.

(10) Patent No.: US 10,328,906 B2
(45) Date of Patent: Jun. 25, 2019

(54) INTEGRATED AUTOMOTIVE SYSTEM, COMPACT, LOW-PROFILE NOZZLE ASSEMBLY AND COMPACT FLUIDIC CIRCUIT FOR CLEANING A WIDE-ANGLE IMAGE SENSOR'S EXTERIOR SURFACE

(71) Applicant: dlhBOWLES, Inc., Canton, OH (US)

(72) Inventors: Russell D. Hester, Odenton, MD (US); Chunling Zhao, Ellicot City, MD (US); Nicholas Bryce Watkins, Baltimore, MD (US); Praveen Pai, Odenton, MD (US)

(73) Assignee: dlhBOWLES, Inc., Canton, OH (US)

( * ) Notice: Subject to any disclaimer, the term of this patent is extended or adjusted under 35 U.S.C. 154(b) by 0 days.

(21) Appl. No.: 15/303,329

(22) PCT Filed: Apr. 11, 2015

(86) PCT No.: PCT/US2015/025489
§ 371 (c)(1),
(2) Date: Oct. 11, 2016

(87) PCT Pub. No.: WO2015/157744
PCT Pub. Date: Oct. 15, 2015

(65) Prior Publication Data
US 2017/0036650 A1    Feb. 9, 2017

Related U.S. Application Data

(60) Provisional application No. 61/978,775, filed on Apr. 11, 2014.

(51) Int. Cl.
*B60S 1/52* (2006.01)
*B60S 1/56* (2006.01)
(Continued)

(52) U.S. Cl.
CPC ............. *B60S 1/56* (2013.01); *B60R 11/04* (2013.01); *B60S 1/52* (2013.01); *G02B 13/04* (2013.01);
(Continued)

(58) Field of Classification Search
CPC ... B60S 1/52; B60S 1/56; B60R 11/04; G02B 13/04; B05B 12/00; B05B 1/08
(Continued)

(56) References Cited

U.S. PATENT DOCUMENTS 4,463,904 A    8/1984  Bray, Jr.
4,508,267 A    4/1985  Stouffer
(Continued)

FOREIGN PATENT DOCUMENTS

CN    203157944    8/2013
CN    203713824    7/2014
(Continued)

OTHER PUBLICATIONS

International Searching Authority, U.S. Patent Office, International Search Report and Written Opinion for International App. No. PCT/US2015/025489 dated Jul. 16, 2015.
(Continued)

*Primary Examiner* — Steven J Ganey
(74) *Attorney, Agent, or Firm* — McDonald Hopkins LLC

(57) ABSTRACT

A low profile, integrated camera wash nozzle assembly 1010 is readily and unobtrusively integrated into a vehicle's exterior trim surfaces 1420 to make a more visually appealing exterior design while not compromising spray performance. A system and nozzle assembly (e.g., 710, 810, 1010) for cleaning an exterior objective lens or wide-angle sensor's exterior surface 1022 to remove accumulated debris sprays washer fluid at a selected shallow angle which is substantially transverse to the lenses central viewing axis
(Continued)

1050. A low-profile conformal housing fixture 1011 is adapted to receive and aim a very compact fluidic circuit insert 1200 that can generate a wide spray which substantially covers the lens surface, despite being very close to the edge of the lens 1022.

22 Claims, 28 Drawing Sheets

(51) Int. Cl.
  *B60R 11/04* (2006.01)
  *G02B 13/04* (2006.01)
  *B60S 1/08* (2006.01)
  *B60R 11/00* (2006.01)

(52) U.S. Cl.
  CPC ....... *B60R 2011/004* (2013.01); *B60S 1/0848* (2013.01)

(58) Field of Classification Search
  USPC ............. 239/69, 284.1, 284.2, 589.1, DIG. 3
  See application file for complete search history.

(56) References Cited

U.S. PATENT DOCUMENTS

| | | |
|---|---|---|
| 5,546,630 A | 8/1996 | Long |
| 5,550,677 A | 8/1996 | Schofield |
| 5,670,935 A | 9/1997 | Schofield |
| 5,724,187 A | 3/1998 | Varaprasad |
| 5,749,525 A | 5/1998 | Stouffer |
| 5,760,962 A | 6/1998 | Schofield |
| 5,796,094 A | 8/1998 | Schofield |
| 5,854,708 A | 12/1998 | Komatsu |
| 5,877,897 A | 3/1999 | Schofield |
| 5,949,331 A | 9/1999 | Schofield |
| 6,013,372 A | 1/2000 | Hayakawa |
| 6,071,606 A | 6/2000 | Yamazaki |
| 6,097,023 A | 8/2000 | Schofield |
| 6,189,808 B1 | 2/2001 | Daniels |
| 6,193,378 B1 | 2/2001 | Tonar |
| 6,201,642 B1 | 3/2001 | Bos |
| 6,222,447 B1 | 4/2001 | Schofield |
| 6,253,782 B1 | 7/2001 | Raghu |
| 6,257,500 B1 | 7/2001 | Petzold |
| 6,302,545 B1 | 10/2001 | Schofield |
| 6,396,397 B1 | 5/2002 | Bos |
| 6,498,620 B2 | 12/2002 | Schofield |
| 6,523,964 B2 | 2/2003 | Schofield |
| RE38,013 E | 3/2003 | Stouffer |
| 6,554,210 B2 | 4/2003 | Holt |
| 6,611,202 B2 | 8/2003 | Schofield |
| 6,626,377 B1 | 9/2003 | Vogt |
| 6,690,268 B2 | 2/2004 | Schofield |
| 6,708,899 B2 | 3/2004 | Nakano |
| 6,717,610 B1 | 4/2004 | Bos |
| 6,757,109 B2 | 6/2004 | Bos |
| 6,834,904 B2 | 12/2004 | Sauvonnet |
| 6,834,906 B2 | 12/2004 | Vaitus |
| 7,005,974 B2 | 2/2006 | McMahon |
| 7,014,131 B2 | 3/2006 | Berning |
| 7,038,577 B2 | 5/2006 | Pawlicki |
| 7,267,290 B2 | 9/2007 | Gopalan |
| 7,339,149 B1 | 3/2008 | Schofield |
| 7,506,823 B2 | 3/2009 | Eisele |
| 7,563,505 B2 | 7/2009 | Reihs |
| 7,726,821 B2 | 6/2010 | Bral |
| 7,965,336 B2 | 6/2011 | Bingle |
| 7,982,767 B2 | 7/2011 | Berson |
| 8,149,327 B2 | 4/2012 | Lin |
| 8,172,162 B2 * | 5/2012 | Gopalan .................. B05B 1/08 239/284.1 |
| 8,186,608 B2 | 5/2012 | Rathey |
| 8,454,245 B2 | 6/2013 | Overskeid |
| 8,567,963 B1 | 10/2013 | Criscuolo |
| 8,671,504 B2 | 3/2014 | Ono |
| 8,792,003 B2 | 7/2014 | Nakamura |
| 8,985,480 B2 | 3/2015 | Kikuta |
| 9,126,534 B2 | 9/2015 | Snider |
| 9,180,840 B2 | 11/2015 | Tanaka |
| 9,217,864 B2 | 12/2015 | Bell |
| 9,221,430 B2 | 12/2015 | Kikuta |
| 9,278,670 B2 | 3/2016 | Hattori |
| 9,319,637 B2 | 4/2016 | Lu |
| 9,452,739 B2 | 9/2016 | Kikuta |
| 9,454,003 B1 | 9/2016 | Li |
| 9,464,982 B2 | 10/2016 | Tokhtuev |
| 9,505,382 B2 | 11/2016 | Gokan |
| 9,538,054 B2 | 1/2017 | Hayakawa |
| 9,539,988 B2 | 1/2017 | Hsiao |
| 9,607,242 B2 | 3/2017 | Lavoie |
| 9,616,856 B2 | 4/2017 | Irie |
| 9,625,714 B2 | 4/2017 | Rousseau |
| 9,663,073 B2 | 5/2017 | Tanaka |
| 9,707,896 B2 | 7/2017 | Boegel |
| 9,746,666 B2 | 8/2017 | Eineren |
| 9,796,359 B2 | 10/2017 | Field |
| 9,796,361 B2 | 10/2017 | Gokan |
| 9,804,386 B2 | 10/2017 | Hayakawa |
| 9,862,321 B2 | 1/2018 | Henion |
| 2003/0124360 A1 | 7/2003 | Reihs |
| 2004/0189831 A1 | 9/2004 | Shibatani |
| 2004/0200027 A1 | 10/2004 | Sugihara |
| 2005/0129394 A1 | 6/2005 | Ichikawa |
| 2006/0157591 A1 | 7/2006 | Eisele |
| 2006/0289678 A1 | 12/2006 | Sakai |
| 2007/0132610 A1 | 6/2007 | Guemalec |
| 2008/0081108 A1 | 4/2008 | Yamada |
| 2008/0210780 A1 | 9/2008 | Discher |
| 2009/0250533 A1 | 10/2009 | Akiyama |
| 2010/0230991 A1 | 9/2010 | Fioravanti |
| 2011/0061692 A1 * | 3/2011 | Gopalan .................. B05B 1/08 239/589.1 |
| 2011/0073142 A1 | 3/2011 | Hattori |
| 2011/0147479 A1 | 6/2011 | Overskeid |
| 2011/0266375 A1 | 11/2011 | Ono |
| 2011/0292212 A1 | 12/2011 | Tanabe |
| 2012/0117745 A1 | 5/2012 | Hattori |
| 2012/0133768 A1 | 5/2012 | Stephan |
| 2012/0162428 A1 | 6/2012 | Wee |
| 2012/0266922 A1 | 10/2012 | Krahn |
| 2013/0092758 A1 | 4/2013 | Tanaka |
| 2013/0142026 A1 | 6/2013 | Matsumura |
| 2013/0146577 A1 * | 6/2013 | Haig .................... B60H 1/0025 134/18 |
| 2013/0209079 A1 | 8/2013 | Alexander |
| 2013/0255023 A1 | 10/2013 | Kikuta |
| 2013/0319486 A1 | 12/2013 | Kikuta |
| 2014/0060582 A1 * | 3/2014 | Hartranft .................. B05B 1/06 348/148 |
| 2015/0090291 A1 | 4/2015 | Na |
| 2015/0138357 A1 | 5/2015 | Romack |
| 2015/0166020 A1 | 6/2015 | Kong |
| 2015/0203077 A1 | 7/2015 | Gokan |
| 2015/0298657 A1 | 10/2015 | Kanter |
| 2015/0329083 A1 | 11/2015 | Kiyohara |
| 2015/0343999 A1 | 12/2015 | Lopez Galera |
| 2015/0353024 A1 | 12/2015 | Cooper |
| 2016/0001330 A1 | 1/2016 | Romack |
| 2016/0101735 A1 | 4/2016 | Trebouet |
| 2016/0176384 A1 | 6/2016 | Dissette |
| 2016/0264064 A1 | 9/2016 | Byrne |
| 2016/0311405 A1 | 10/2016 | Richardson |
| 2017/0021810 A1 | 1/2017 | Trebouet |
| 2017/0036647 A1 | 2/2017 | Zhao |
| 2017/0036650 A1 | 2/2017 | Hester |
| 2017/0182980 A1 | 6/2017 | Davies |
| 2017/0210304 A1 | 7/2017 | Davies |
| 2017/0225660 A1 | 8/2017 | Trebouet |
| 2017/0239693 A1 | 8/2017 | Nabavi |
| 2017/0274823 A1 | 9/2017 | Call |
| 2017/0297536 A1 | 10/2017 | Giraud |
| 2017/0297540 A1 | 10/2017 | Zhang |

(56) References Cited

U.S. PATENT DOCUMENTS

| | | |
|---|---|---|
| 2017/0313286 A1 | 11/2017 | Galera |
| 2017/0341597 A1 | 11/2017 | Buss |
| 2018/0015907 A1 | 1/2018 | Rice |

FOREIGN PATENT DOCUMENTS

| | | |
|---|---|---|
| CN | 204685543 | 10/2015 |
| CN | 105172754 | 12/2015 |
| CN | 105235647 | 1/2016 |
| CN | 106799367 | 6/2017 |
| CN | 206436913 | 8/2017 |
| CN | 107551807 | 1/2018 |
| CN | 206868696 | 1/2018 |
| DE | 10332939 | 2/2005 |
| DE | 102005007095 | 8/2006 |
| DE | 102005021671 | 11/2006 |
| DE | 102010007850 | 9/2010 |
| DE | 102014200097 | 7/2015 |
| DE | 112014002071 | 12/2015 |
| DE | 102014213282 | 1/2016 |
| DE | 102014017517 | 3/2016 |
| DE | 102015013203 | 3/2016 |
| DE | 102014220257 | 4/2016 |
| DE | 102016006039 | 11/2016 |
| DE | 112015001856 | 12/2016 |
| EP | 2845773 | 3/2015 |
| EP | 2930293 | 10/2015 |
| EP | 2949521 | 12/2015 |
| EP | 2955069 | 12/2015 |
| EP | 3141441 | 3/2017 |
| EP | 3169549 | 5/2017 |
| FR | 2875661 | 3/2006 |
| FR | 3027006 | 4/2016 |
| JP | 4202941 | 8/2005 |
| JP | 2006060425 | 3/2006 |
| JP | 2009220719 | 10/2009 |
| JP | 2012035654 | 2/2012 |
| JP | 5756349 | 1/2013 |
| JP | 6120395 | 1/2014 |
| JP | 2014201150 | 10/2014 |
| JP | 6213157 | 3/2015 |
| JP | 2015137070 | 7/2015 |
| JP | 3201779 | 12/2015 |
| JP | 2015216463 | 12/2015 |
| JP | 2016000599 | 1/2016 |
| JP | 2016009099 | 1/2016 |
| JP | 2016078688 | 5/2016 |
| JP | 2016088192 | 5/2016 |
| JP | 2016131957 | 7/2016 |
| JP | 2017105422 | 6/2017 |
| JP | 2017128188 | 7/2017 |
| JP | 2017129465 | 7/2017 |
| KR | 101704047 | 12/2012 |
| KR | 101534934 | 5/2015 |
| KR | 101813133 | 12/2017 |
| KR | 20170137359 | 12/2017 |
| WO | WO2017002877 | 1/2017 |
| WO | WO2017002878 | 1/2017 |
| WO | WO2017002879 | 1/2017 |
| WO | WO2017006818 | 1/2017 |
| WO | WO2017045832 | 3/2017 |
| WO | WO2017048126 | 3/2017 |
| WO | WO2017137277 | 8/2017 |
| WO | WO2017153476 | 9/2017 |
| WO | WO2017182224 | 10/2017 |
| WO | WO2017189219 | 11/2017 |
| WO | WO2017202562 | 11/2017 |
| WO | WO2017202625 | 11/2017 |
| WO | WO2017202691 | 11/2017 |
| WO | WO2017217161 | 12/2017 |
| WO | WO2017220584 | 12/2017 |

OTHER PUBLICATIONS

International Searching Authority, U.S. Patent Office, International Search Report and Written Opinion for International App. No. PCT/US2015/026204 dated Aug. 10, 2015.

International Searching Authority, U.S. Patent Office, International Search Report and Written Opinion for International App. No. PCT/US2012/028828 dated Jun. 22, 2012.

European Patent Office, European Search Report for EP App. No. 15 77 6160 dated Mar. 5, 2018.

* cited by examiner

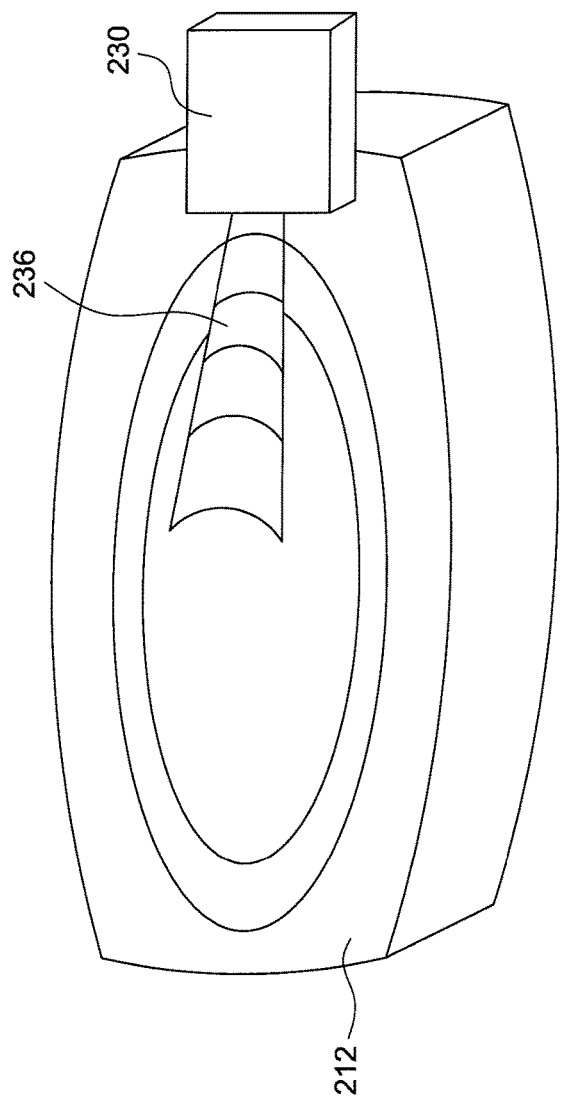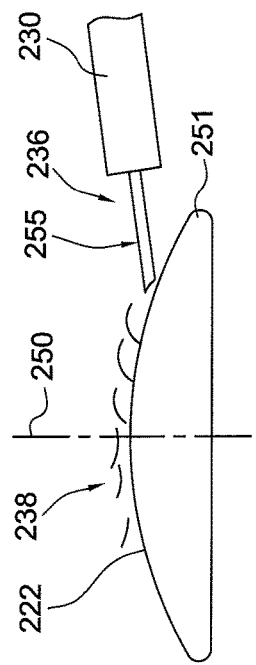
FIG. 5A
FIG. 5B

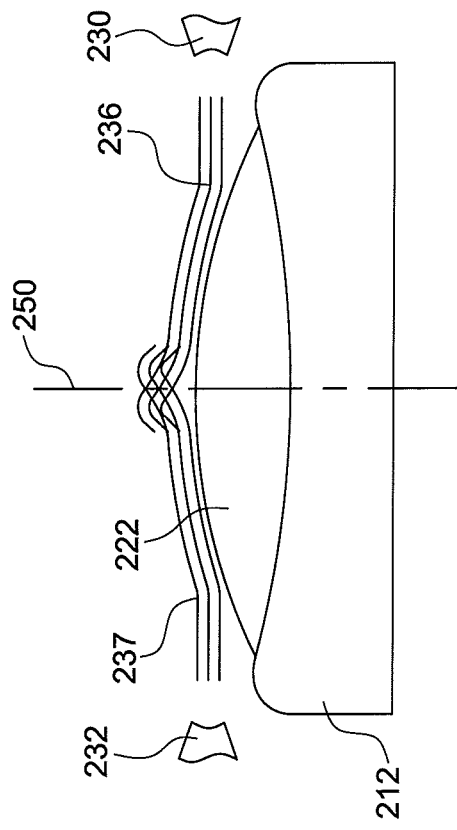
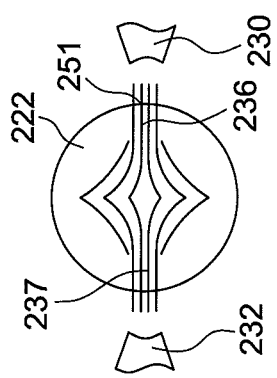
FIG. 6B
FIG. 6A

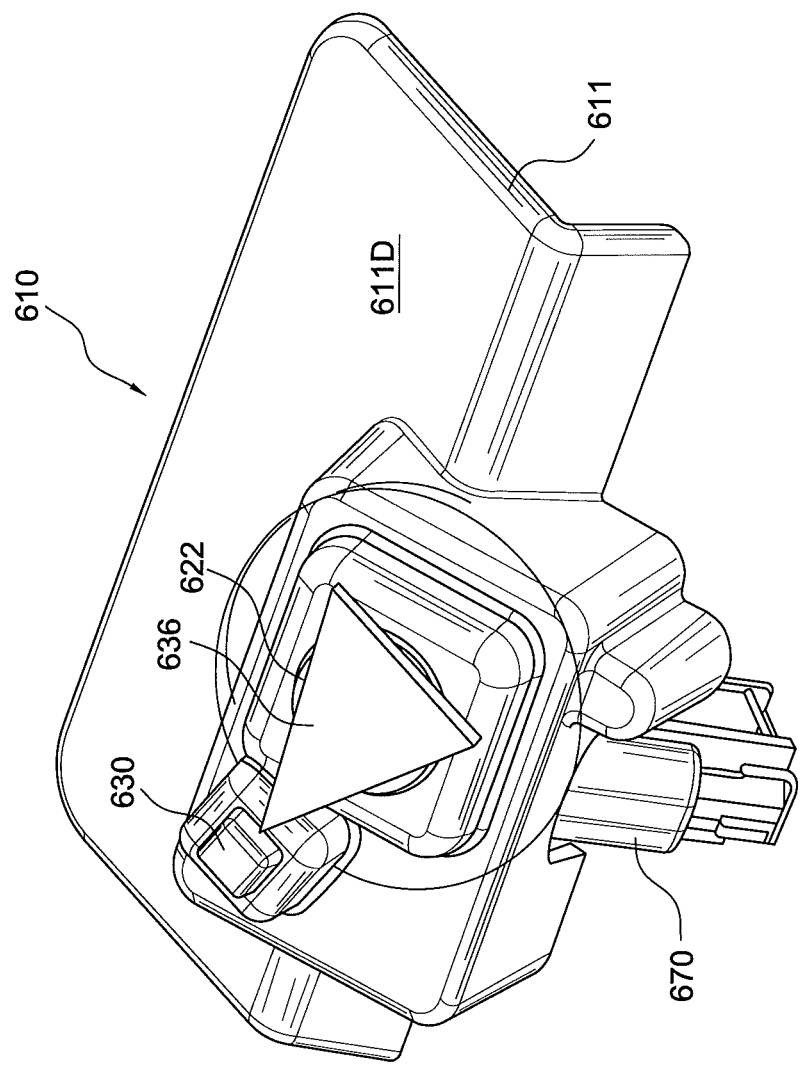

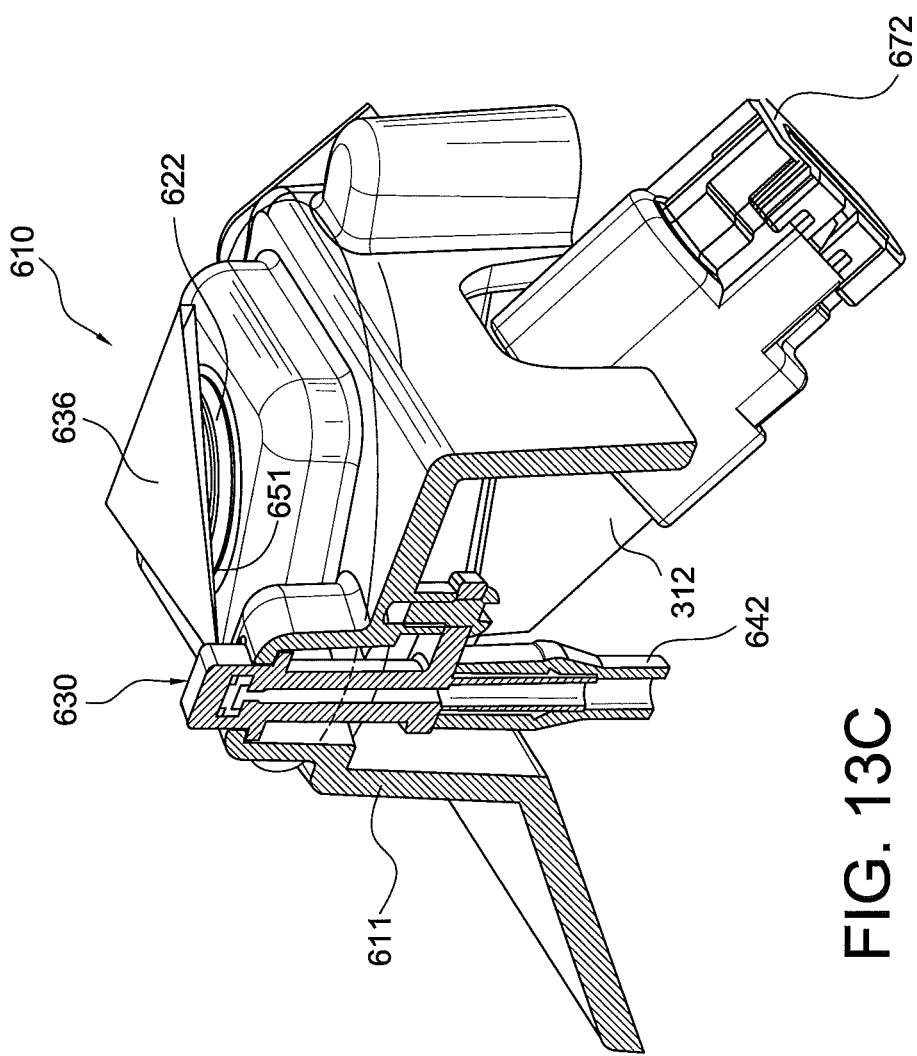

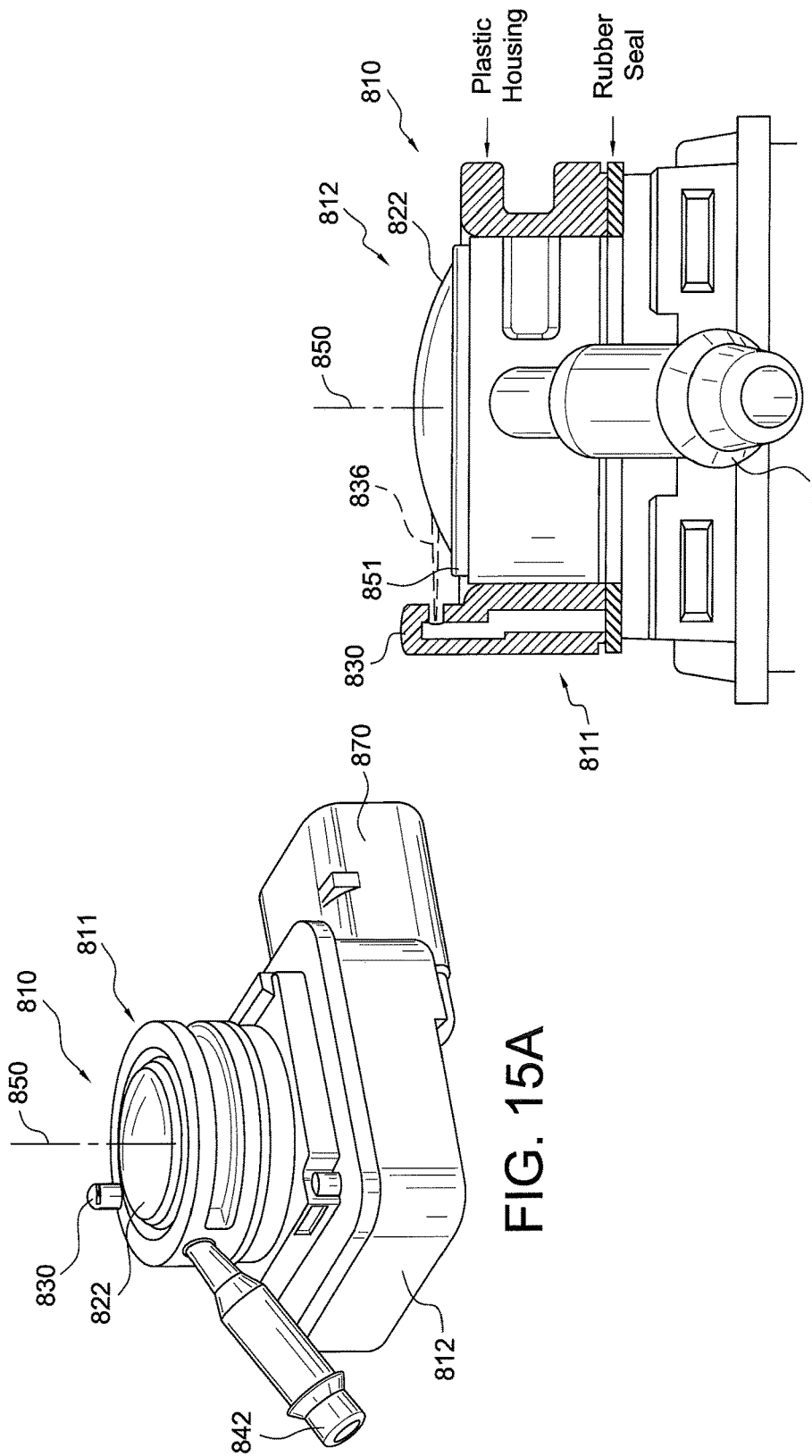

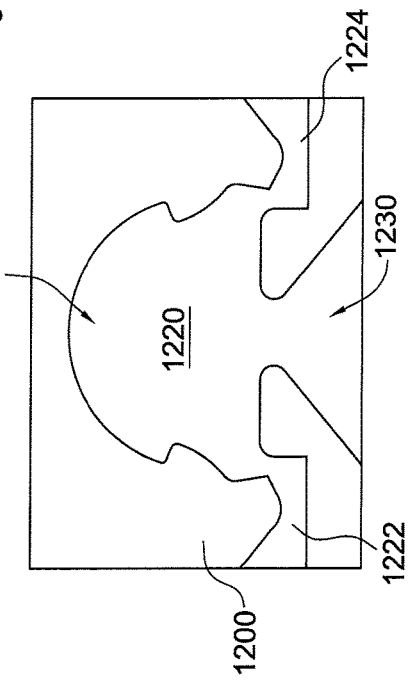

Fluidic is trimmed from longer design to shortened design without affecting critical geometry. In some cases part of the critical nozzle geometry can be included within the nozzle housing.

FIG. 18B

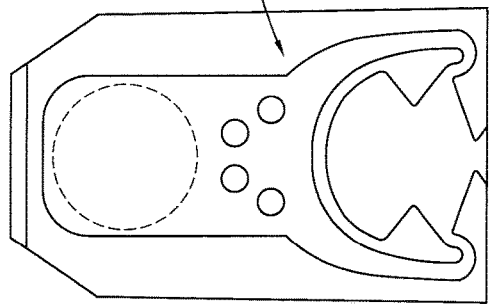

Fluidic is trimmed from longer design to shortened design without affecting critical geometry. In some cases part of the critical nozzle geometry can be included within the nozzle housing.

FIG. 18A

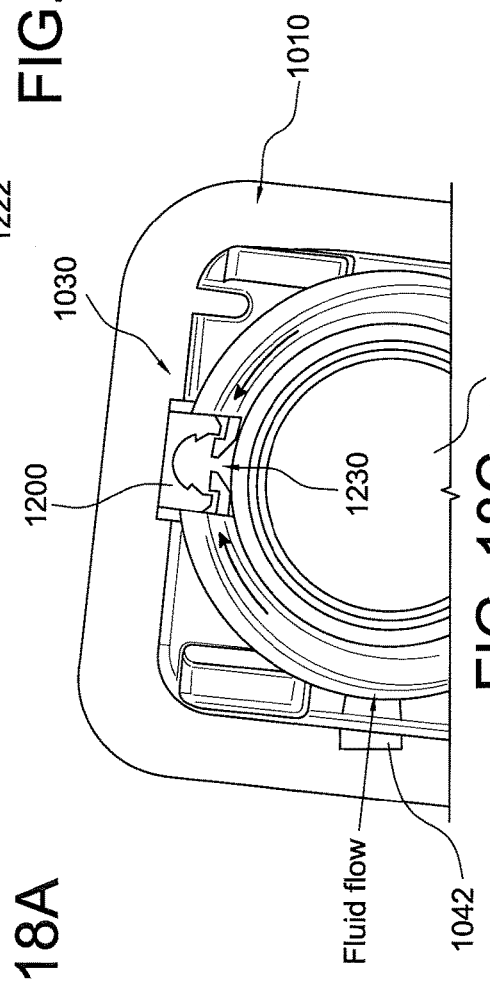

FIG. 18C

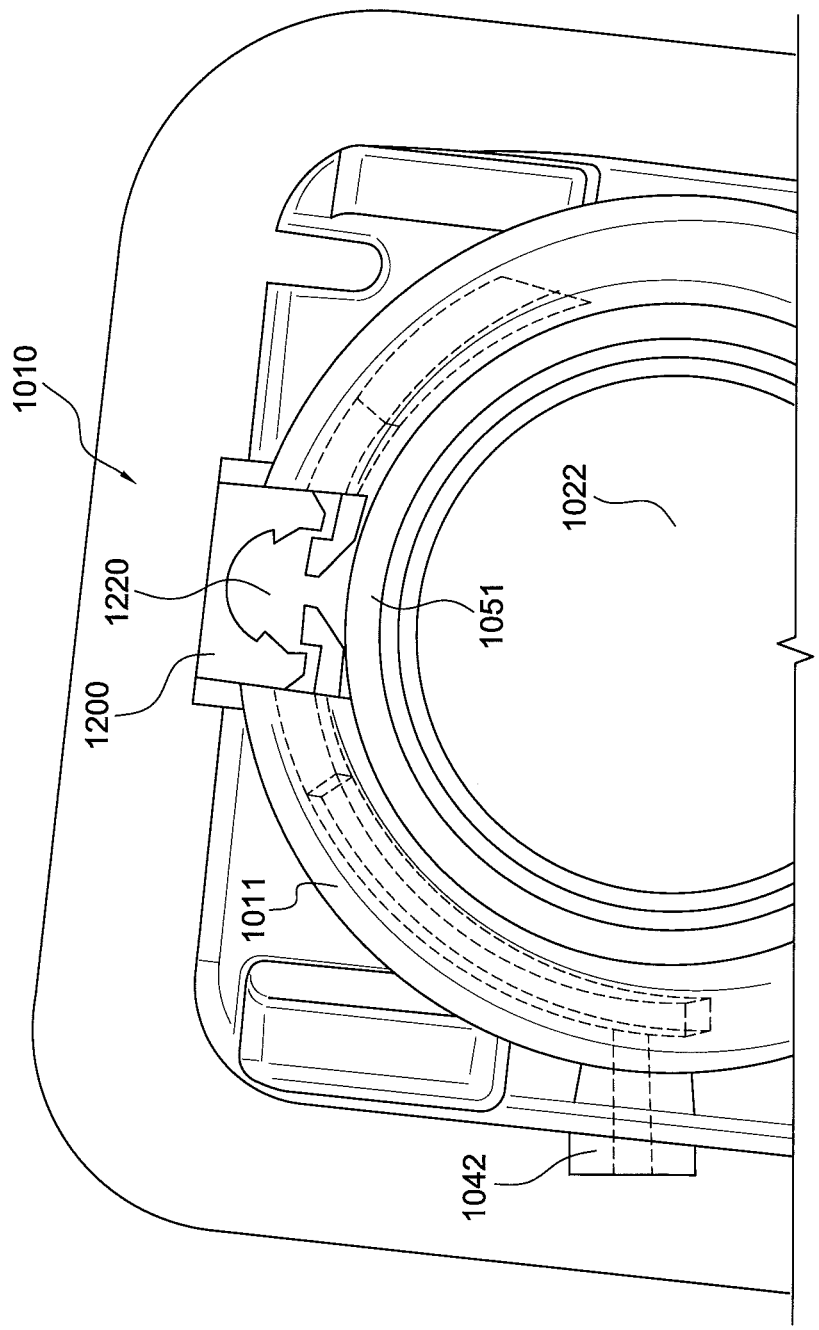

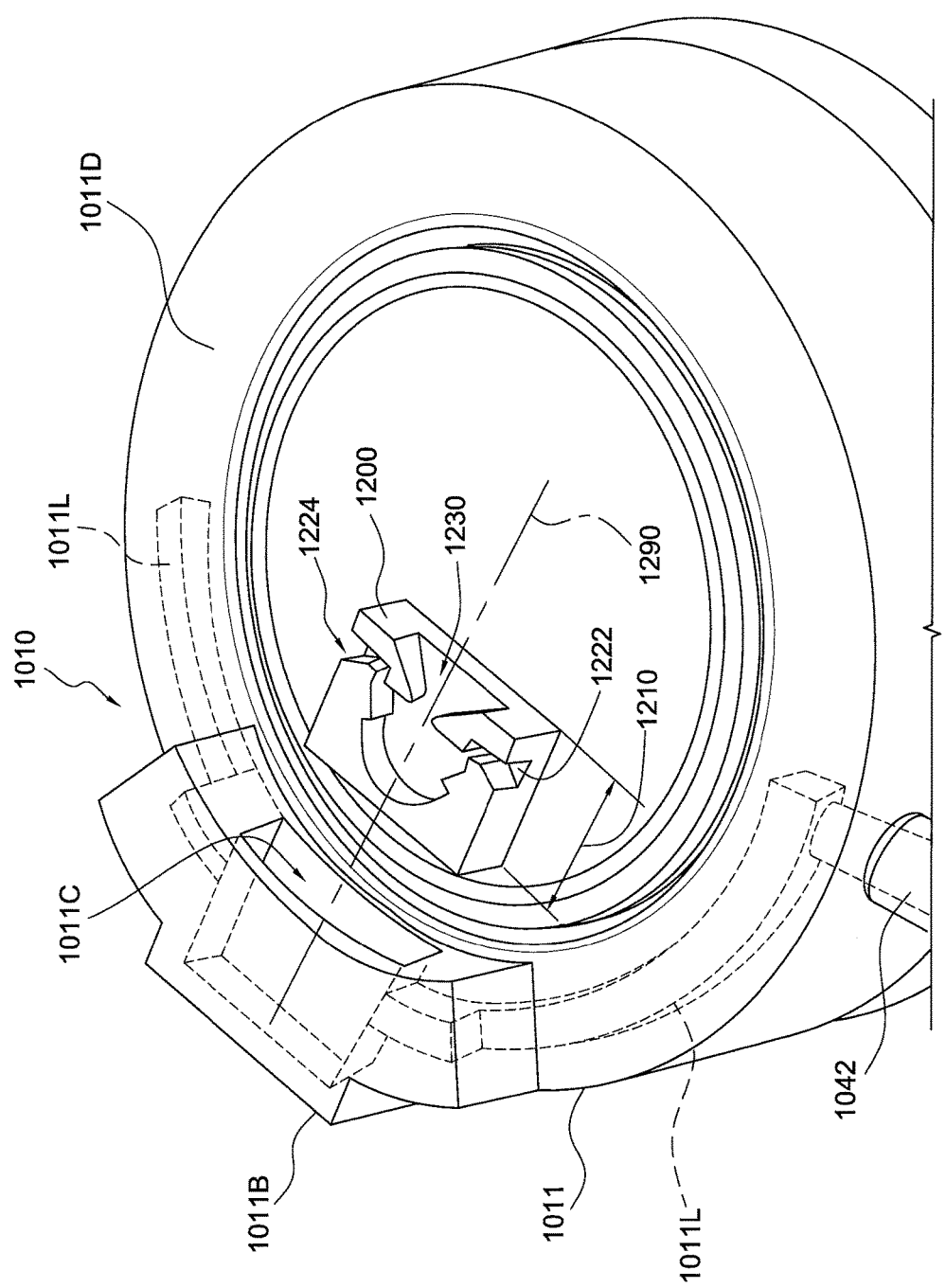

INTEGRATED AUTOMOTIVE SYSTEM, COMPACT, LOW-PROFILE NOZZLE ASSEMBLY AND COMPACT FLUIDIC CIRCUIT FOR CLEANING A WIDE-ANGLE IMAGE SENSOR'S EXTERIOR SURFACE

REFERENCE TO RELATED APPLICATIONS

This is a Continuation application which claims priority under 35 U.S.C. 120 and 35 U.S.C.111(a) as the U.S. National Phase under 35 USC 371 of PCT/US15/25489, filed Apr. 11, 2015; published, in English, as WO2015/157744 on Oct. 15, 2015 and also claims priority to U.S. provisional patent application 61/978,775 filed Apr. 11, 2014, the entire disclosures of which are expressly incorporated herein by reference. This application is also related to commonly owned U.S. provisional patent application No. 61/451,492 filed Mar. 10, 2011, PCT application no. PCT/US12/28828 filed Mar. 10, 2012, U.S. application Ser. No. 14/086,746, filed Sep. 10, 2013, and U.S. application Ser. No. 14/086,746, filed Nov. 21, 2013, the entire disclosures of which are hereby incorporated herein by reference.

BACKGROUND OF THE INVENTION

Field of the Invention

The present invention relates vehicle "backup" camera systems and remotely controlled cleaning systems for cleaning soiled objective lenses on wide angle or "fish-eye" video cameras or sensors when mounted in a configuration that is exposed to dirty environments.

Discussion of the Prior Art

The US National Highway Traffic Safety Administration ("NHTSA") has mandated that by 2018 new vehicles must include a rearview or "backup" camera system to minimize the likelihood of "backovers". A backover is a specifically-defined type of accident, in which a non-occupant of a vehicle (i.e., a pedestrian or cyclist) is struck by a vehicle moving in reverse. Automotive original equipment manufacturers ("OEMs") are thus adding external rearview cameras to all new cars. In addition, OEMs want more cameras to see into any other blind spot around a vehicle's periphery (behind, to the side, or in front) and all of these cameras necessarily include exterior lens surfaces which will eventually become soiled with road grime, mud and the like. For cosmetic and styling reasons vehicle OEMs desire to have functional cameras and corresponding lens cleaning devices which do not detract from the automotive designer's vision for the vehicle, so an entirely invisible camera and camera lens cleaning system would be ideal. Providing a camera system with its attendant lens cleaning system in an assembly which fits within the vehicle's exterior trim in a manner that is not visually conspicuous and so does not intrude into the vehicle's design is problematic.

External view (e.g., front bumper, side-view, rear-view or back-up) cameras have been added to recreational vehicles and automobiles to enhance the driver's vision and to improve safety. Increasingly, a wide range of cars and SUVs include a number of integrated video cameras which generate images for display to the driver, operator or other occupants or users within the vehicle's interior. The recent introductions of front-bumper, side-view and rear-view cameras in cars and SUVs by vehicle manufacturers allow drivers to see whether obstacles surround their vehicle using a display screen mounted either on a rear view mirror or in a navigation system screen.

The external image sensors such as those known as back-up or rear view cameras are typically mounted unobtrusively, and incorporated into existing features such as the vehicle's rear name plate. These external cameras are exposed to the vehicle's harsh environmental surroundings and are often soiled by mud, salt spray or dirt which accumulates on the lens. Accumulating dirt and debris often distort the image drivers are viewing, thus creating confusion, dissatisfaction or a safety issue due to poor judgment by relying on an unclear picture.

The advent of low cost, reliable imaging devices using solid-state sensor technologies (e.g., CMOS pixel sensor technology), combined with an improved cost/performance ratio for video displays capable of meeting automotive specifications, and an increasing application rate of video monitor displays for automotive navigation systems and the like, has lead to an increasing use of cameras or imaging sensors designed to give the driver a view of those areas around the vehicle which are not in the normal direct field of view of the driver, typically referred to as "blind spots". These areas include the region close to the front of the vehicle, typically obscured by the forward structure of the vehicle, the region along the passenger side of the vehicle, the region along the driver's side of the vehicle rearward of the driver, and the area or region immediately rearward of the vehicle which cannot be seen directly or indirectly through the rear view mirror system. The camera or imaging sensor may capture an image of the rearward (or sideward or other blind spot area) field of view, and the image may be displayed to the driver of the vehicle to assist the driver in backing up or reversing or otherwise driving or maneuvering the vehicle.

The use of electronic cameras in vehicle imaging systems can significantly increase a diligent driver's knowledge of the space immediately surrounding the vehicle prior to and during low speed maneuvers, and thus contributes to the safe completion of such maneuvers. It is thus known to provide a camera or imaging sensor on a vehicle for providing an image of an exterior scene for the driver. Such a camera may be positioned within a protective housing, which may be closed about the camera or sensor and secured together via fasteners or screws or the like. For example, a metallic protective housing may be provided, such as a die cast housing of aluminum or zinc or the like. In particular, for camera sensors mounted on the exterior of a vehicle, protection against environmental effects, such as rain, snow, road splash and/or the like, and physical protection, such as against road debris, dirt, dust, and/or the like, is important. Thus, for example, in known exterior camera sensor mounts, a butyl seal, such as a hot dispensed butyl seal, or an O-ring or other sealing member or material or the like, has been provided between the parts of the housing to assist in sealing the housing to prevent water or other contaminants from entering the housing and damaging the camera or sensor positioned therein. However, such housings typically do not provide a substantially water tight seal, and water droplets thus may enter the housing. Furthermore, any excessive vibration of the camera sensor, due to its placement (such as at the exterior of the vehicle), may lead to an undesirable instability of the image displayed to the driver of the vehicle. Also, such cameras or sensors are costly to manufacture and to implement on the vehicles.

Such vehicle vision systems often position a camera or imaging sensor at an exterior portion of a vehicle to capture an image of an exterior scene. The cameras, particularly the cameras for rearward vision systems, are thus typically placed or mounted in a location that tends to get a high dirt buildup on the camera and/or lens of the camera, with no easy way of cleaning the camera and/or lens. In order to reduce the dirt or moisture buildup on the lenses of such cameras, prior art developers proposed using hydrophilic or hydrophobic coatings on the lenses. However, the use of such a hydrophilic or hydrophobic coating on the lens is not typically effective due to the lack of air flow across the lens, especially within a sealed housing. It has also been proposed to use heating devices or elements to reduce moisture on the lenses, within the sealed housing. However, the use of a heated lens in such applications, while reducing condensation and misting on the lens, may promote the forming of a film on the lens due to contamination that may be present in the moisture or water. Also, the appearance of such cameras on the rearward portion of vehicles is often a problem for styling of the vehicle. See, for example, prior art U.S. Pat. No. 7,965,336 to Bingle, et al. which discloses a camera module with a plastic housing that houses an image sensor, which is operable to capture images of a scene occurring exteriorly of the vehicle. Bingle's camera housing assembly is welded together with the image sensor and associated components within enclosed the plastic housing, and includes a "breathable" ventilation portion that is at least partially permeable to water vapor to allow emission of internal water vapor substantially precluding passage of water droplets and other contaminants, and so Bingle's design seeks to minimize problems arising from fluid impacting or accumulating within the housing.

Bingle also seeks to use coated lenses to keep the objective lenses' view clear, and Bingle's housing or cover 22 is optionally be coated with an anti-wetting property such as via a hydrophobic coating (or stack of coatings), such as is disclosed in U.S. Pat. No. 5,724,187. Bingle notes that a hydrophobic property on the outermost surface of the cover can be achieved by a variety of means, such as by use of organic and inorganic coatings or by utilizing diamond-like carbon coatings. But Bingle and others do not propose actually taking any affirmative action to remove road debris (e.g., accumulated dirt, dust, mud, road salt or other built-up debris) apart from using such coatings or surface treatments.

Based on consumer preference and at least a perceived improved ability to extract important (e.g., child location) information from the image, it is desired to present an image to the driver that is representative of the exterior scene as perceived by normal human vision. It is also desirable that a vehicle's imaging devices or systems be useful in all conditions, and particularly in all weather and lighting conditions. However, it is often difficult to provide an imaging sensor which is capable of providing a clear image in poor weather, especially while driving. This is because conventional imaging systems typically have difficulty resolving scene information when the camera's objective lens is partially obstructed by accumulated debris (e.g., accumulated dirt, dust, mud, road salt or other built-up debris).

In order to have effective use of the camera-based visibility systems in all weather conditions, it is desirable to have an effective method of keeping the camera lens (or the housing surface protecting the objective lens) clean, but the potentially deleterious effects of moisture noted in Bingle remain. When driving or operating a vehicle during bad weather, drivers are especially reluctant to exit the vehicle to find and inspect the camera's lens.

This reluctance likely explains why the inventors of U.S. Pat. No. 6,834,906 (to Vaitus et al) included a "Nozzle" 92 "in close proximity to" lens 84 for the vehicle's camera or vision unit 71. The Vaitus '904 patent generally discloses a vehicle trim assembly called "Vehicle Liftgate with Component Module Applique" wherein applique module 50 is adapted for attachment to vehicle liftgate 20 and, as shown in Vaitus' FIG. 2, module 50 includes a nozzle 92 which receives fluid from conduit 94, but, as noted in the description at Col 5, lines 5-25, "cleaning of lens 84 may be implemented in other ways" such as hydrophobic lens coatings. It appears that the module and nozzle arrangement described so indifferently in the Vaitus '904 patent was not deemed to be a practicable or effective solution meriting further development, and so any discussion over whether this nozzle cleans effectively appears to have been ignored.

Increasingly on modern vehicles, cameras or other sensors such as infrared image sensors are incorporated to provide additional information to the driver. Many of these sensing devices can become soiled and obstructed by dirt and debris common in the driving environment, eventually causing deterioration in the efficacy of the sensing device or possibly rendering it unusable, or providing an undesirable appearance. It is therefore desirable to periodically wash these sensing devices to reduce or eliminate the buildup of obstructive debris. However, there are restrictions which are unique to certain sensor wash applications which limit use of traditional washer nozzles. Backup cameras or other sensors may need to be placed on or near the vehicle centerline, in close proximity to branding badges or other cosmetically important features on the vehicle, and it is undesirable to add a visible washer nozzle in this aesthetically important area. Another restriction is that sensors may have very wide fields of view, up to or exceeding 180°, so a traditional lens washer nozzle configuration would have to project over the lens in a manner which would place that washer nozzle within the sensor's field of view in order to be able to direct fluid against the lens at an angle which would provide acceptable cleaning.

Being located within the sensors field of view may block a significant portion of area the sensor would otherwise be capable of monitoring. A third constraint which affects sensor wash applications is that the sensor may frequently be located on an area of the vehicle which sees higher levels of contamination than do typical washer nozzle mounting locations, such as on the front grill or the rear lift gate. Washer nozzles in these locations may be at a higher risk of being clogged by the same material which obscures the sensor. There is a need, therefore, for an effective yet visually unobtrusive system and method for cleaning an exterior objective lens or wide-angle sensor's exterior surface, and preferably by remote control.

OBJECTS AND SUMMARY OF THE INVENTION

Accordingly, it is an object of the present invention to overcome the above mentioned difficulties by providing an effective and visually unobtrusive system and method for cleaning an exterior objective lens or wide-angle sensor's exterior surface to remove accumulated debris (e.g., accumulated dirt, dust, mud, road salt or other built-up debris).

In accordance with an exemplary embodiment of the present invention, an external lens washing system has a number of configurations including an aiming fixture configured to spray cleaning fluid onto an external lens or sensor surface which is exposed to the elements and apt to become soiled with debris. A visually unobtrusive nozzle assembly is configured to be supported and aimed toward the external lens surface by the aiming fixture and has at least one laterally offset spray orifice which is configured to spray washing fluid toward the external lens or sensor surface, spraying at a selected shallow, glancing spray aiming angle to impinge upon and wash the lens external surface.

Optionally, an integrated image sensor and lens washing assembly is configured for use with a remote control method for cleaning an exterior objective lens surface and includes a sealed image sensor housing assembly including an integral, remotely controllable lens cleaning system with an optimized configuration for aiming one or more cleansing sprays from one or more laterally offset fluidic oscillators.

The integrated system embodiment uses one or more aimed sprays to clean an exterior objective lens surface and the method enables the driver to determine when to clean a soiled external-view camera's objective lens, so the driver can ensure that the lens is adequately cleaned of accumulated debris (e.g., accumulated dirt, dust, mud, road salt or other built-up debris) before moving.

The system of the present invention provides an image sensor housing assembly including an integral, remotely controllable lens cleaning system with an optimized configuration for aiming one or more cleaning sprays from selected fluidic oscillators which are aimed at the housing's transparent objective lens protective cover to safely and quickly remove accumulated debris (e.g., accumulated dirt, dust, mud, road salt or other built-up debris) and minimize the likelihood that vision obstructing debris or washer fluid droplets remain in the camera's field of view.

In a preferred embodiment of the lens cleaning system of the present invention, low flow rate fluidic circuit nozzles are configured and aimed in a manner which uses very little washing fluid. As a result, integrating the system of the present invention in a vehicle uses less washing fluid from the vehicle's washer fluid bottle and provides bottle-cleanings savings, conservation of fluid, and conservation of pressure. Conservation of washer fluid pressure is especially important when the camera lens cleaning system is integrated into an existing vehicle design's front wash system, where the camera lens washing system must function without detrimentally affecting front glass cleaning, especially under dynamic driving conditions, where the front glass cleaning system's performance is highly sensitive to fluid pressure. The system and method of the present invention is not limited to use with low flow rate nozzles exclusively, however. Applicants have prototyped a relatively high flow rate nozzle assembly on an exemplary system and it works well, although the camera's image is somewhat compromised when actually spraying fluid and washing. It appears that the low flow rate is best accomplished thru a selected fluidic circuit geometry which allows washing fluid, since droplet size should remain larger when compared to a shear nozzle.

For wide angle cameras and sensors, a compact, low profile nozzle assembly has a the washer nozzle positioned to reduce or eliminating field of view issues and allow the nozzle orifice to be shielded from contamination which might otherwise clog it. Additionally the nozzle may be integrated into a cap or other feature which effectively hides the nozzle and allows it to be placed in a cosmetically important area without negatively affecting aesthetics. When activated, the nozzle projects washing fluid over a wide fan angle at an acceptable spray angle of incidence to allow efficient and effective cleaning of the sensor, minimizing the use of washer fluid.

In the preferred embodiment of the system of the present invention, a compact, visually unobtrusive, low-profile image sensor lens washing system includes a first laterally offset spray nozzle which is supplied with washing fluid and physically supported and aimed by a conformal fluid transmission duct. In an exemplary embodiment, the distally projecting image sensor's objective lens is cylindrical, and the peripheral edge of the objective lens surface is circular. The compact fluidic circuit oscillating sprayer is configured to generate a wide fan-shaped oscillating transverse spray of cleaning fluid droplets which are sprayed across the image sensor's outwardly facing or exterior surface. For circular objective lens surfaces, the conformal fluid transmission duct is configured as an annular ring-shaped member or circumferential arc-segment shaped member enclosing an interior lumen which defines a fluid flow channel. The ring-shaped or arc-shaped conformal fluid transmission duct is configured to be press-fit on or bonded to the image sensor's distally projecting lens member's cylindrical sidewall, proximate the lens member's free distal or objective lens end. The low-profile nozzle assembly's ring-shaped or arc-shaped conformal fluid transmission duct includes a fluid inlet in fluid communication with the laterally offset washing nozzle which is supported and aimed to spray washing fluid toward the external objective lens surface and across the image sensor's field of view at a selected shallow aiming angle.

Preferably, the low-profile nozzle assembly includes at least one fluidic oscillator chip which defines an interaction chamber with opposing first and second lateral inlets or fluid feeds configured to operate on a selectively actuated flow of pressurized washing fluid flowing through the oscillator's chamber to generate an exhaust flow of fluid droplets. The nozzle assembly's conformal fluid transmission duct defines a substantially rigid housing having a cavity or socket configured to receive a fluidic insert or chip which is unusually short, from front to back, viewed along the center of the spray fan axis.

The nozzle assembly is illustrated in a two-piece configuration. The conformal fluid transmission duct has an upwardly projecting boss which defines the distal most portion of a substantially rigid housing having a cavity or socket which constitutes one of the two main nozzle pieces. The fluidic insert or chip constitutes the other. The conformal housing has a generally flat cavity defined therein which terminates in a wide, generally rectangular opening to a surface defined in an inward or lens-facing side of the housing. First and second laterally extending channels or lumens are defined between opposing surfaces in the cavity or socket and those first and second lumens communicates with cavity in opposing fluid flow directions out of and below the bottom the plane of the cavity. The housing or conformal fluid transmission duct member which defines the housing and cavity is configured with a barb end to receive a tube or hose or other means of conveying pressurized fluid into the housing's internal fluid passages or lumens.

The fluidic insert or chip is a generally flat member adapted to be forced or pressed into the housing's cavity and securely retained therein by the pressure exerted by the housing cavity walls on the insert. For this purpose the material from which the housing is fabricated is a solid plastic which deforms slightly under pressure. The cavity has a top wall and bottom wall which are spaced by a distance substantially equal to the thickness of the insert between the insert top surface and bottom surface. Optionally, the bottom surface may somewhat bowed, making the insert somewhat thicker along its middle. The inserts sidewalls are likewise spaced by a distance substantially equal to the width of insert between its left and right side or lateral edges. In a preferred embodiment, the insert may be a few thousandths of an inch wider than the cavity. The insert and cavity may taper along their lengths, being wider at the forward end and narrowing toward the rearward end. The taper may be gradual or may be effected in plural discrete sections which are slightly angled toward one another.

A fluidic oscillator is defined in the insert as a plurality of recessed portions in the top surface. Specifically, the oscillator includes left and right opposing power nozzle venturi-shaped channels directed inwardly toward the center of an interaction region. The forward end of the interaction region terminates in an exit throat or orifice which is aligned with the central axis of the fluidic and the spray outlet or exit orifice. All of the fluidic's features are defined as recesses of equal or varying depths into the top surface of the insert or chip. When the fluidic insert is fully inserted into the housing's slot, the housing's first and second laterally extending channels or lumens define left and right opposing openings between the left and right sidewall surfaces, and those left and right sidewall openings align with and communicate with the insert's left and right opposing power nozzle venturi-shaped channels, so that water flowing into the conformal fluid transmission duct and into the housing cavity's left and right sidewall openings flow into the corresponding left and right opposing power nozzle channels in opposing fluid flow directions and into the interaction chamber. In this manner pressurized fluid is delivered through the conformal housing's internal lumen and to the opposing first and second power nozzles of the oscillator, so that an oscillation is established and a jet of fluid is swept back and forth and sprays or issues out through the exit orifice.

When in use, pressurized washer fluid flows into the first and second opposing lateral fluid inlets and then into the interaction chamber which passes the pressurized washer fluid distally to the outlet orifice configured to spray or exhaust the washer fluid from the interaction chamber and generate an oscillating spray of high velocity fluid droplets aimed toward an external objective lens surface and across the image sensor's field of view. The low-profile nozzle assembly's fluidic oscillator is preferably configured as a compact lateral-feed reverse mushroom fluidic oscillator (having an axial length of about 3 mm, which is much more compact that the previous oscillator's length of about 5 mm). The integrated, compact, low-profile nozzle assembly of the present invention generates a high velocity spray with a very wide fan angle so is ideally well suited for integration into very small, unobtrusive and compact nozzle assembly for placement very near the periphery of the lens surface while remaining out of the camera's view, to provide a low profile unitary camera and camera washing nozzle assembly package which can easily be concealed in an automotive trim piece or the like.

For the washer system of the present invention, in use, a driver, user or operator views the image generated by the external camera or image sensor on an interior video display and decides whether and when to clean the external camera's objective lens cover's surface to remove accumulated debris (e.g., accumulated dirt, dust, mud, road salt or other built-up debris). An interior remote actuation control input (e.g., button or momentary contact switch) is provided within the operator's easy reach for convenient use in cleaning the lens, and the operator actuates the system and causes the cleansing spray to begin while viewing the image sensor's output on the video display, stopping actuation of the system when the operator deems the image sensor's view to be satisfactory.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

BRIEF DESCRIPTION OF THE DRAWINGS

FIGS. 5A and 5B are schematic diagrams illustrating a perspective view and a side view of a fluid sheet sprayed by an aimed nozzle assembly configured for use with the method for cleaning an imaging system's exterior objective lens surface, in accordance with the present invention.

FIGS. 6A and 6B are schematic diagrams illustrating a top or plan view and a side view of an embodiment with opposing aimed washer fluid jets spreading fluid over a convex objective lens surface when sprayed by a washing system configured in accordance with the present invention.

FIGS. 13A-13C illustrate another embodiment for the external lens washing system and nozzle assembly of the present invention.

FIGS. 15A-15E illustrate another low profile nozzle assembly with a conformal fluid transmission duct defining a substantially rigid housing, in accordance with the present invention.

FIG. 18A illustrates an older, larger fluidic circuit insert having features of an exemplary feedback-free fluidic oscillator which could be used larger embodiments of the external nozzle assemblies, in accordance with applicant's own prior practices.

FIG. 18B illustrates a new fluidic circuit insert which, in combination with the new conformal fluid transmission duct and housing cavity illustrated in FIGS. 18C-18F, provides the spray and cleaning performance of larger nozzles in a very compact low profile nozzle assembly, in accordance with the present invention.

FIGS. 18C-18F illustrate another low profile nozzle assembly with a conformal fluid transmission duct defining a substantially rigid housing, in accordance with the present invention.

DESCRIPTION OF THE PREFERRED EMBODIMENT

In order to provide an exemplary context and basic nomenclature, we refer initially to FIGS. 1A-1D, illustrating a prior art imaging system for a vehicle and a camera module as disclosed in U.S. Pat. No. 7,965,336 (to Bingle et al). This overview will be useful for establishing nomenclature and automotive industry standard terminology, in accordance with the Prior Art.

Figure 1A:
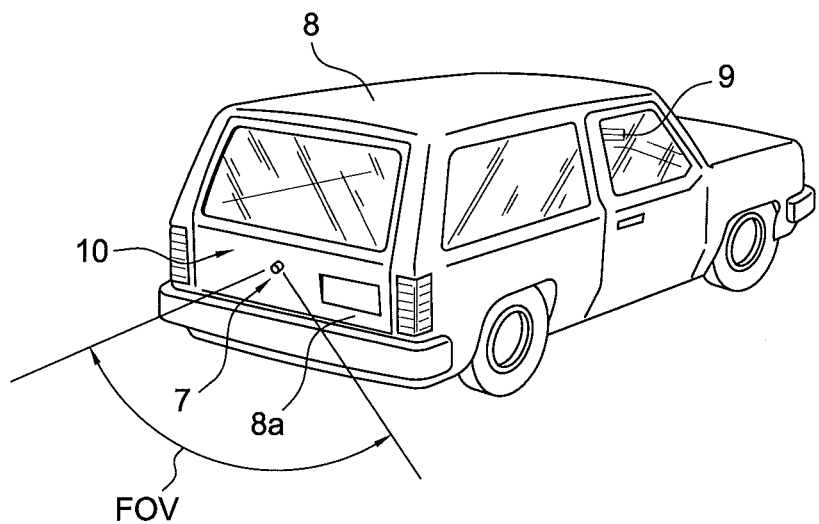
FIG. 1A is a rear perspective view illustrating a vehicle having a typical imaging system or backup camera system, in accordance with the Prior Art.
Figure 1B:
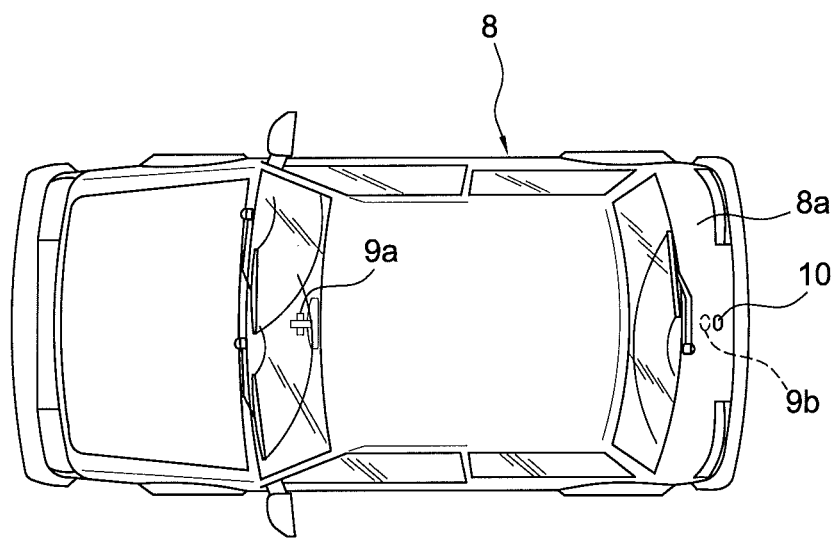
FIG. 1B is a plan view of the vehicle of FIG. 1A.

Referring now to FIGS. 1A-1D, an image capture system or imaging or vision system 7 is positioned at a vehicle 8, such as at a rearward exterior portion 8a of the vehicle 8, and is operable to capture an image of a scene occurring interiorly or exteriorly of the vehicle, such as rearwardly of the vehicle, and to display the image at a display or display system 9a of the vehicle which is viewable by a driver or occupant of the vehicle (see, e.g., FIGS. 1A and 1B). Imaging system 7 includes a camera module 10, which is mountable on, at or in the vehicle to receive an image of a scene occurring exteriorly or interiorly of the vehicle, and a control 9b that is operable to process images captured by an image sensor 18 of camera module 10. Camera module 10 includes a plastic camera housing 11 and a metallic protective shield or casing 16 (see FIGS. 1C & 1D).

Camera housing 11 includes a camera housing portion 12 and a connector portion 14, which mate or join together and are preferably laser welded or sonic welded together to substantially seal the housing 11 to substantially limit or prevent water intrusion or other contaminants from entering the housing, as discussed below.

Housing 11 of camera module 10 substantially encases a camera or image sensor or sensing device 18 (FIGS. 1C and 1D), which is operable to capture an image of the scene occurring exteriorly or interiorly of the vehicle, depending on the particular application of camera module 10. Housing 11 also includes a cover portion 20 at an end of camera housing portion 12. Cover portion 20 provides a transparent cover plate 22 which allows the image of the scene exteriorly or interiorly of the vehicle to pass therethrough and into housing 11 to camera image sensor 18. Camera module 10 may include the protective shield 16, which substantially encases camera housing portion 12 and a portion of connector portion 14, thereby substantially limiting or reducing electronic noise going into or out of the camera module and/or protecting the plastic housing 11 from damage due to impact or the like with various items or debris that may be encountered at the exterior of the vehicle.

Camera module 10 provides a camera image sensor or image capture device 18 for capturing an image of a scene occurring exteriorly or interiorly of a vehicle. The captured image may be communicated to a display or display system 9a which is operable to display the image to a driver of the vehicle. The camera or imaging sensor 18 useful with the present invention may comprise an imaging array sensor, such as a CMOS sensor or a CCD sensor or the like, such as disclosed in U.S. Pat. Nos. 5,550,677; 5,670,935; 5,796,094; 6,097,023, and 7,339,149. Camera module 10 and imaging sensor 18 may be implemented and operated in connection with various vehicular vision systems, and/or may be operable utilizing the principles of such other vehicular systems, such as a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; and 6,201,642, and/or a trailer hitching aid or tow check system, such as the type disclosed in U.S. Pat. No. 7,005,974, a reverse or sideward imaging system, such as for a lane change assistance system or lane departure warning system, such as the type disclosed in U.S. Pat. No. 7,038,577, a system for determining a distance to a leading or trailing vehicle or object, such as a system utilizing the principles disclosed in U.S. Pat. No. 6,396,397 or the like.

For example, the camera or sensor may comprise a LM9618 Monochrome CMOS Image Sensor or a LM9628 Color CMOS Image Sensor, both of which are commercially available from National Semiconductor. Other suitable cameras or sensors from other vendors (e.g., Sony®, Panasonic®, Magna™ and others) may be implemented with the camera module.

Although shown at a rear portion 8a of vehicle 8, camera 18 and camera module 10 may be positioned at any suitable location on vehicle 8, such as within a rear panel or portion of the vehicle, a side panel or portion of the vehicle, a license plate mounting area of the vehicle, an exterior mirror assembly of the vehicle, an interior rearview mirror assembly of the vehicle or any other location where the camera may be positioned and oriented to provide the desired view of the scene occurring exteriorly or interiorly of the vehicle.

The camera module 10 is particularly suited for use as an exterior camera module. The image captured by the camera may be displayed at a display screen or the like positioned within the cabin of the vehicle, such as at an interior rearview mirror assembly (such as disclosed in U.S. Pat. No. 6,690,268), or elsewhere at or within the vehicle cabin, such as by using the principles disclosed in U.S. Pat. Nos. 5,550,677; 5,670,935; 5,796,094; 6,097,023 and 6,201,642, and/or U.S. Pat. No. 6,717,610.

Figure 1C:
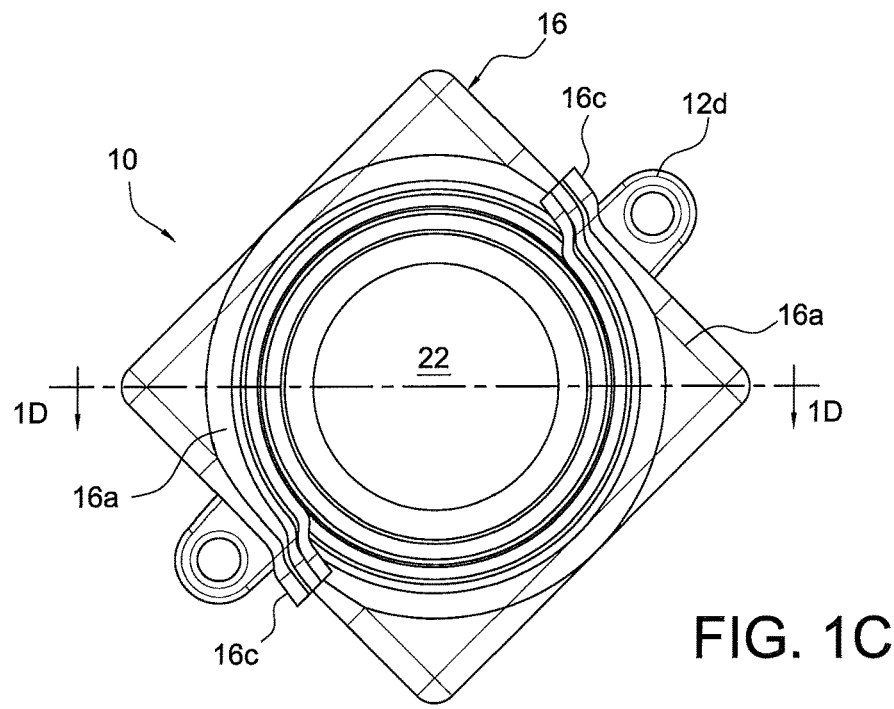
FIG. 1C is an end elevation of a sealed solid-state image sensor or camera module, in accordance with the Prior Art.
Figure 1D:
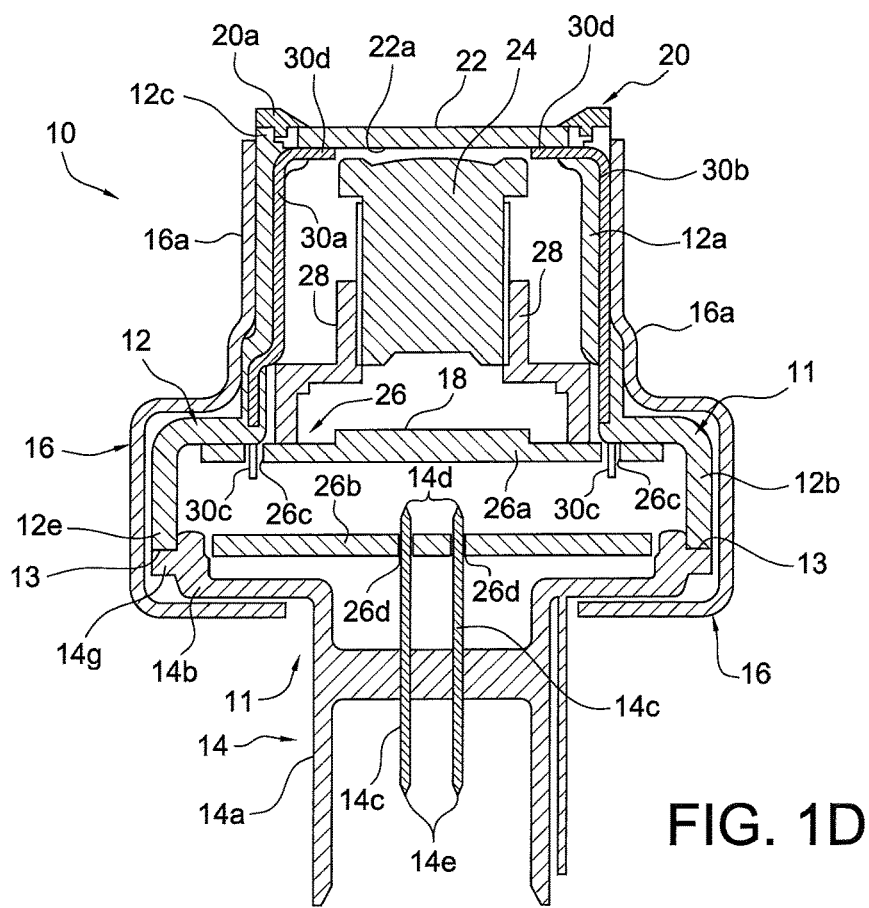
FIG. 1D is a sectional view of the camera module of FIG. 1C, taken along the line D-D.

As best shown in FIGS. 1C and 1D, camera housing portion 12 includes a generally cylindrical portion 12a extending outwardly from a base portion 12b. Camera housing portion 12 comprises a molded plastic component and may include a pair of heater terminals or elements 30a, 30b insert molded within and/or along the walls of cylindrical portion 12a. Cylindrical portion 12A receives a lens or optic system 24 therein, which functions to focus the image onto camera or sensor 18, which is positioned at a circuit board 26 mounted within the base portion 12B of camera housing portion 12.

Lens system 24 is positioned within cylindrical portion 12a of camera portion 12 to receive light from the exterior or interior scene through cover 22 at end 12c of camera portion 12. Lens system 24 is mounted to, such as via threaded engagement with, camera cover or housing 28, which functions to substantially cover or encase camera or sensor 18 to substantially prevent or limit incident light from being received by camera 18 and interfering with the image received by camera 18 through cover 22 and lens system 24. The lens system 24 may be any small lens or lens system which may focus an image of the scene exteriorly of the camera module onto the camera or image sensor 18, such as, for example, the types disclosed in U.S. Pat. No. 6,201,642 or 6,757,109. The lens system 24 may provide a wide-angle field of view, such as approximately 120 degrees or more (as shown in FIG. 1A).

Cover portion 20 is mounted at an outer end 12c of camera housing portion 12 opposite from base portion 12b, as shown in FIGS. 1C and 1D. Cover portion 20 includes an outer circumferential ring or cover retainer 20a, which engages an outer surface of transparent cover 22 and functions to retain transparent cover 22 in position at the end 12c of the cylindrical portion 12a of camera receiving portion 12. Preferably, circumferential ring 20a is laser welded or sonic welded or otherwise joined or bonded to outer end 12c of cylindrical portion 12a of camera receiving portion 12 to substantially seal and secures cover portion 20 onto camera receiving portion 12, and may limit or substantially preclude any water intrusion or contaminant intrusion into the camera receiving portion at the outer end 12c.

In the illustrated embodiment, base portion 12b is generally square and defines a generally square mating edge 12e around the base portion 12b for mating and securing to a corresponding edge 14g of connector portion 14 at joint 13. Base portion 12b receives circuit board 26 and camera 18 therein, while a camera housing or shield 28 and lens or lens system 24 extend into cylindrical portion 12a of camera portion 12 to receive the image through transparent cover 22.

Connector portion 14 of housing 11 is a molded plastic component and includes a connector terminal or connector 14a, such as a multi-pin snap-on connector or the like, extending from a base portion 14b. Base portion 14b is formed (such as in a square shape as shown in the illustrated embodiment) to substantially and uniformly mate or connect to base portion 12b of camera housing 12, as can be seen with reference to FIGS. 1C and 1D. The base portions 12b and 14b mate together and define a pocket or space for receiving and securing circuit board 26 therein. Base portions 14b and 12b may be laser welded or sonic welded together at their mating joint or connection 13. Laser or sonic welding of the joint melts the plastic edges or seams together to substantially hermetically seal housing 11 to prevent water intrusion or other contaminant intrusion into housing 11 of camera module 10. Optionally, and less desirably, the base portions may be otherwise joined or substantially sealed together (such as via suitable adhesives and/or sealants). The module may optionally include a vented portion or semi-permeable membrane to vent the module's interior. The base portions 12b and 14b may further include mounting tabs or flanges 12d, which extend outwardly from base portion 12b. Mounting tabs 12d are generally aligned with one another when the base portions are secured together and include an aperture therethrough for mounting the camera module 10 at or to the vehicle 8 via suitable fasteners or the like (not shown). Although shown as having generally square-shaped mating portions, connector portion 14 and camera portion 12 may have other shaped mating portions or surfaces.

Multi-pin connector 14a extends from base portion 14b and includes a plurality of pins or terminals 14c for electrically connecting camera module 10 with a connector (not shown) connected with the wiring harness or cables of the vehicle. For example, one end 14d of terminals 14c may connect to circuit board 26, while the other end 14e of terminals 14c connects to the corresponding connector of the vehicle. The corresponding connector may partially receive the ends 14e of pins or terminals 14c at multi-pin connector 14a and may snap together with multi-pin connector 14a via a snap connection or the like. As best shown in FIG. 1D, ends 14d of terminals 14c protrude or extend from connector portion 14, such that the ends 14d may be received within corresponding openings or apertures 26c in circuit board 26 when housing portion 11 is assembled.

As shown in FIG. 1D, connector portion 14 may provide a generally straight multi-pin connector extending longitudinally from the base portion of the housing 11. However, other shapes of connectors, such as angled connectors or bent connectors or the like, may be implemented, depending on the particular application of the camera module.

Optionally, camera module 10 may comprise a substantially hermetically sealed module, such that water intrusion into the module is limited or substantially precluded. Base portion 12b of camera housing portion 12 and base portion 14b of connector portion 14 are correspondingly formed so as to substantially mate or join together at their mating seam 13, whereby the portions may be laser welded or sonic welded together or otherwise joined, while cover portion 20 is also laser welded or sonic welded or otherwise secured and substantially sealed at the opposite end 12c of camera portion 12, in order to substantially seal the camera housing. Laser or sonic welding techniques are preferred so as to join the materials at a state where they are able to re-flow, either via heat, vibration or other means, such that the materials re-flow and cross-link and become a unitary part. Such joining results in a substantially hermetically sealed camera module. Additionally, the pores in the plastic as well as any voids around the insert molded pins and stampings may be sealed with a Loctite® brand sealing material or other suitable sealing material, to further limit or substantially preclude entry of water droplets and/or water vapor into the housing of the substantially sealed camera module 10.

Circuit board 26 includes a camera mounting circuit board 26a, which is connected to a connector receiving circuit board 26b via a multi-wire ribbon wire or the like (not shown). Camera mounting circuit board 26a is mounted or secured to the base portion 12b of camera portion 12, while connector circuit board 26b is mounted or secured to the base portion 14b of connector portion 14. Camera or image sensor 18 is mounted at a surface of camera circuit board 26a, and is substantially encased at circuit board 26a by camera cover 28 and lens 24 (FIGS. 1C and 1D). Camera circuit board 26a includes a pair of apertures 26c for receiving ends 30c of terminals 30a, 30b. Likewise, connector circuit board 26b includes a plurality of openings or apertures 26d for receiving ends 14d of connector terminals 14c therethrough. The ends of the pins or terminals may be soldered in place in their respective openings. After all of the connections are made, the housing may be folded to its closed position and laser welded or sonic welded together or otherwise joined or bonded together to substantially seal the circuit board within the housing.

Optionally, the exterior surface of cover 22 (which may be exposed to the atmosphere exterior of the camera module) may be coated with an anti-wetting property such as via a hydrophilic coating (or stack of coatings), such as is disclosed in U.S. Pat. Nos. 6,193,378; 5,854,708; 6,071,606; and 6,013,372. Also, or otherwise, the exterior or outermost surface of cover 22 may optionally be coated with an anti-wetting property such as via a hydrophobic coating (or stack of coatings), such as is disclosed in U.S. Pat. No. 5,724,187. Such hydrophobic property on the outermost surface of the cover can be achieved by a variety of means, such as by use of organic and inorganic coatings utilizing a silicone moeity (for example, a urethane incorporating silicone moeities) or by utilizing diamond-like carbon coatings. For example, long-term stable water-repellent and oil-repellent ultra-hydrophobic coatings, such as described in WIPO PCT publication Nos. WO0192179 and WO0162682, can be disposed on the exterior surface of the cover. Such ultra-hydrophobic layers comprise a nano structured surface covered with a hydrophobic agent which is supplied by an underlying replenishment layer (such as is described in Classen et al., "Towards a True 'Non-Clean' Property: Highly Durable Ultra-Hydrophobic Coating for Optical Applications", ECC 2002 "Smart Coatings" Proceedings, 2002, 181-190). For enablement and completeness of disclosure, all of the foregoing references are incorporated herein by reference.

In FIGS. 1A-1D, camera module 10 is shown to include a protective conductive shield or casing 16 which partially encases the plastic housing 11 and functions to limit or reduce electronic noise which may enter or exit camera module 10 and may protect the plastic housing from damage from impact of various items or debris which the camera module may encounter at the exterior portion of the vehicle.

The protective shield or casing 16 includes a pair of casing portions 16a (one of which is shown in FIGS. 1C and 1D). Each of the casing portions 16a partially encases about half of the plastic housing 11 of camera module 10 and partially overlaps the other of the casing portion 16a, to substantially encase the plastic housing within protective shield 16. Each of the portions 16a includes a slot 16b for receiving the mounting tabs 12d therethrough for mounting the camera module at the desired location at the vehicle. Each casing portion 16a includes overlapping portions 16c which overlap an edge of the other casing portion 16a to assemble the casing 16 around the plastic housing 11. The casing portions 16a may be welded, crimped, adhered, banded, or otherwise joined or secured together about the plastic housing 11, in order to encase the housing 11.

Preferably, protective shield 16 comprises a metallic shield and contacts ground terminal 30b of heating device 30 at the exterior surface of the cylindrical portion 12a of camera receiving portion 12 and, thus, may be grounded to the heating device and/or the camera module or unit via the ground terminal 30b. Protective shield 16 may comprise a stamped metal shielding or may be formed by vacuum metalizing a shield layer over the plastic housing 11, or may comprise a foil or the like.

Referring now to FIGS. 2-13D, an exemplary embodiment of the present invention has an integrated camera housing and washing system nozzle assembly 110 and FIGS. 2-13D illustrate the method for cleaning a camera's or image sensor's exterior objective lens surface (e.g., 122), in accordance with the present invention. Integrated camera housing and nozzle assembly 110 preferably includes one or more laterally offset nozzles 130, 132 configured and aimed to generate and an oscillating spray to clean exterior objective lens surface 122, and allows a vehicle's driver, user or operator to use interior display 9a to determine whether external-view camera objective lens surface or cover 122 is occluded by or covered with accumulated debris (e.g., accumulated dirt, dust, mud, road salt or other built-up debris, not shown). The driver will want to ensure that the external objective lens surface 122 is adequately cleaned before moving the vehicle 8. Laterally offset nozzles 130, 132 are preferably entirely out of the image sensor's distal field of view and are configured and aimed to spray washing fluid onto external objective lens surface 122 at a narrow, glancing angle which is preferably nearly parallel to the objective lens assembly's external surface 122, as will be described in more detail below.

Figure 2:
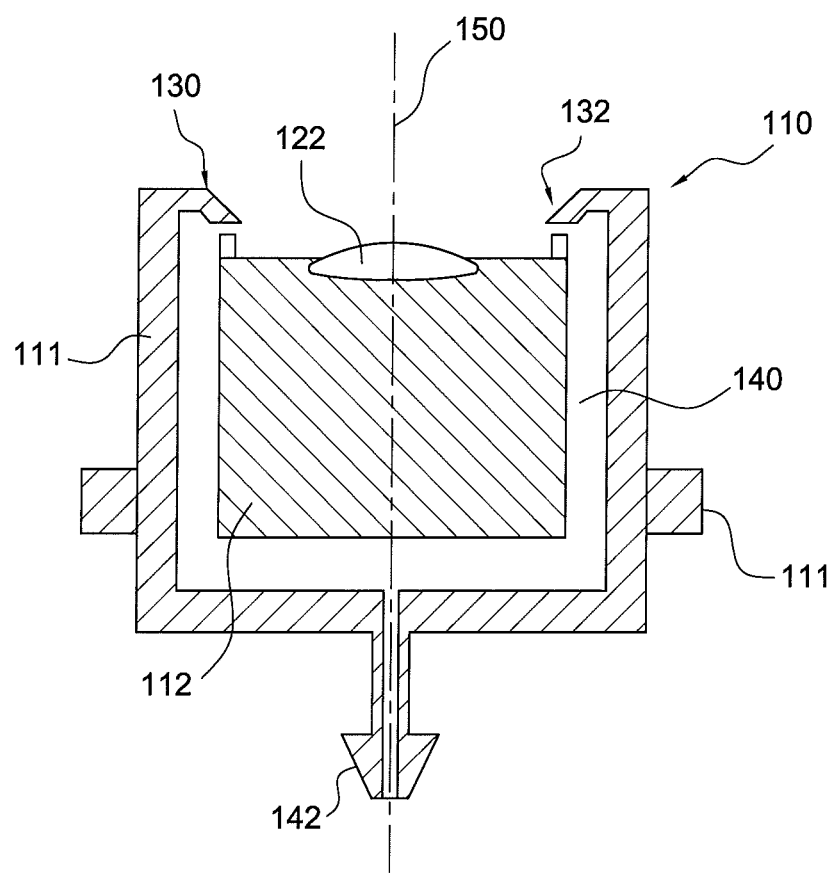
FIG. 2 is a schematic diagram illustrating an automotive imaging system with a camera housing and integrated nozzle assembly configured for use with a remote control method for cleaning the imaging system's exterior objective lens surface, in accordance with the present invention.

Camera housing and nozzle assembly 110, as illustrated in FIG. 2 has an external housing 111 with a hollow interior enclosed within fluid-impermeable sidewalls and a substantially fluid impermeable sealed camera module 112 is carried within the interior of housing 111 which defines an enclosure with an interior lumen or fluid path 140 preferably configured to define least one fluidic oscillator that operates on a selectively actuated flow of pressurized fluid flowing through the oscillator's interior 140 to generate an exhaust flow in the form of an oscillating spray of fluid droplets (not shown), as will be described below. The oscillator in fluid path 140 comprises a proximal inlet 142 for pressurized washer fluid, an interaction chamber defined within the housing fluid path 140 receives the pressurized washer fluid from inlet 142 and passes the pressurized fluid distally to outlets or nozzles 130, 132 so an oscillating washer fluid spray exhausts from the interaction chamber 140.

Fluidic oscillators can provide a wide range of liquid spray patterns by cyclically deflecting a fluid jet. The operation of most fluidic oscillators is characterized by the cyclic deflection of a fluid jet without the use of mechanical moving parts. Consequently, an advantage of fluidic oscillators is that they provide an oscillating spray of fluid droplets but don't require moving parts and so are not subject to the wear and tear which adversely affects the reliability and operation of other oscillating spray devices. Alternatively, camera housing and nozzle assembly 110 may have a featureless hollow interior lumen defining a cylindrical or annular fluid path from proximal fluid inlet 142 to an open distal shear nozzle adapted to spray external objective lens surface 122 with washer fluid at a narrow, glancing angle nearly parallel to the objective lens assembly's external surface 122.

Figure 12B:
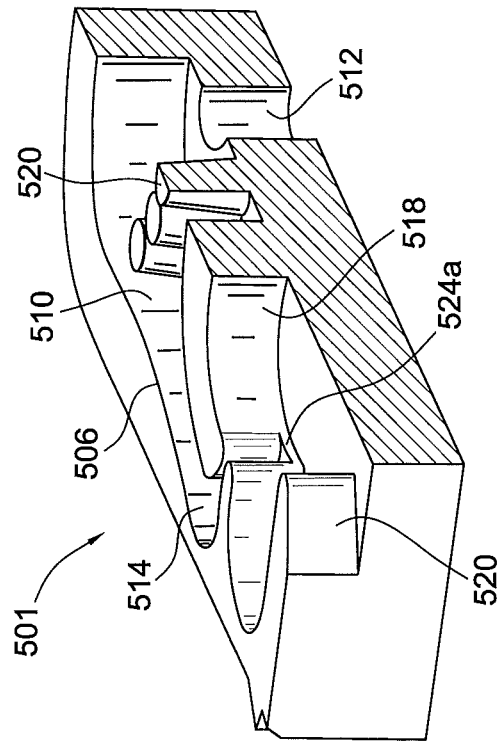
FIGS. 12A and 12B illustrate the fluidic circuit features of an exemplary stepped mushroom fluid oscillator for use with an external camera lens cleaning nozzle assembly of the present invention.
Figure 12A:
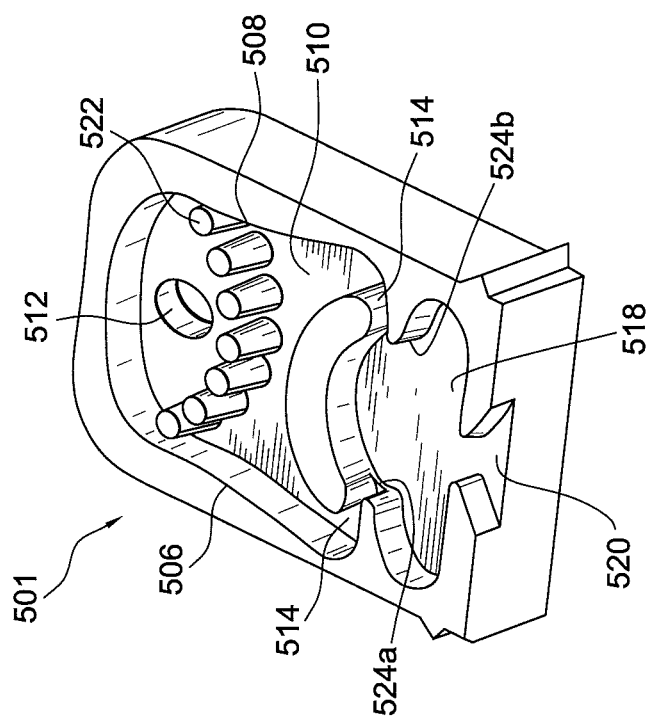

Camera housing and nozzle assembly 110 preferably includes at least one "stepped mushroom" fluidic oscillator of the type described in commonly owned U.S. Pat. No. 7,267,290 (Gopalan et al), the entire disclosure of which is incorporated herein by reference. As shown in FIGS. 12A and 12B (and described more fully in the incorporated '290 patent's description) the stepped mushroom fluidic oscillator is defined by inwardly projecting features (not shown in FIG. 2) acting on the fluid flowing distally in fluid path 140 which defines the interaction chamber within the housing fluid path 140. Washing fluid passes from proximal fluid inlet 142 distally into the interaction chamber 140 and the pressurized oscillating fluid jets pass to outlets or nozzles 130, 132 from which an oscillating washer fluid spray projects laterally onto objective lens surface 122. The preferred spray flow rate is approximately 200 ml/min per nozzle at 18 psi, and the spray thickness (i.e., which is seen in the plane transverse to the spray's fan angle plane as shown in FIG. 5B) is approximately 2 degrees.

As illustrated in FIG. 2, external lens washing system with housing and nozzle assembly 110 provides a substantially rigid aiming fixture (i.e., housing 111) having a distal side and a proximal side and being configured to support and constrain external lens 122 which is exposed toward the distal side. External lens 122 has an external lens surface with a lens perimeter and a lens central axis 150 projecting distally from the lens surface, wherein a lens field of view is defined as a distally projecting solid angle (e.g., a truncated cone or pyramid, not shown) including the lens central axis 150 and originating within the lens perimeter. The washing system includes at least a first nozzle assembly 110 which is configured to be supported and aimed toward external lens 122 by the aiming fixture defined by housing 111, and the first nozzle assembly includes a barbed fitting for fluid inlet 142 which is in fluid communication with a first laterally offset washing nozzle 132 which projects from the aiming fixture's distal side. The first nozzle assembly 110 is configured and aimed to spray washing fluid toward the external lens surface and across the field of view, spraying at a first selected spray aiming angle (e.g., between 1° and 20°) relative to the plane of the lens external surface. The first nozzle assembly is oriented to spray from a selected side, meaning that it is aimed to spray along a first selected spray azimuth angle in relation to a selected fixed reference point or datum on the lens perimeter.

Optionally, the first laterally offset washing nozzle 130 is configured as a non-oscillating shear nozzle configured to generate a substantially flat fan spray having a selected spray fan angle (e.g., 45° or another angled selected in the range of 15° to 120°). Alternatively, first laterally offset washing nozzle 130 may be configured as a non-oscillating bug-eye nozzle configured to generate at least one substantially solid fluid jet (i.e., a substantially solid fluid stream having no fan angle).

Preferably, the first laterally offset washing nozzle 130 is configured to aim the laterally offset washing nozzle from a first selected lateral offset distance from the center of the objective lens' external surface (e.g., the first selected lateral offset distance is preferably within the range bounded by 10 mm and 30 mm) for a spray having a fan angle in the range of 15° to 120°.

Figure 3A:
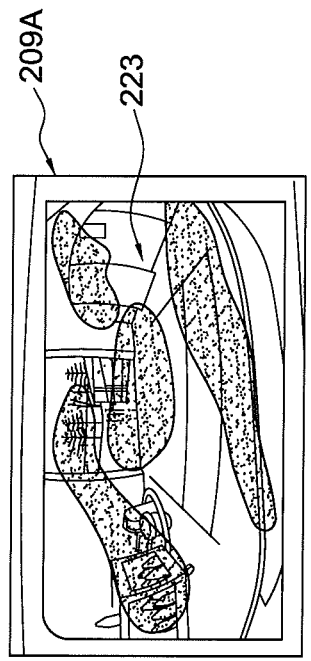
FIGS. 3A-3D illustrate a configuration of and displayed performance of the imaging system, camera housing and an aimed nozzle assembly, in accordance with the present invention.
Figure 3B:
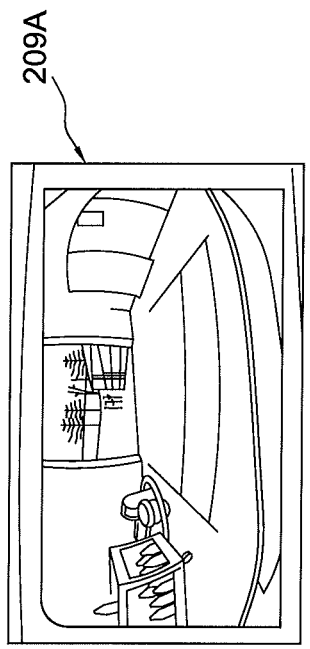
Figure 3C:
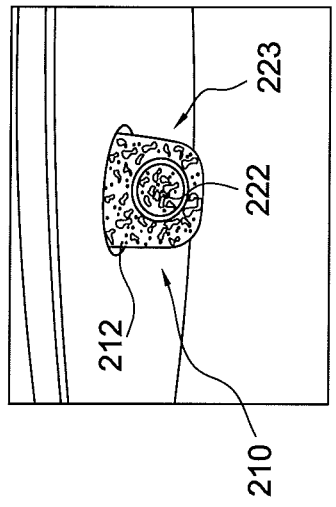
Figure 3D:
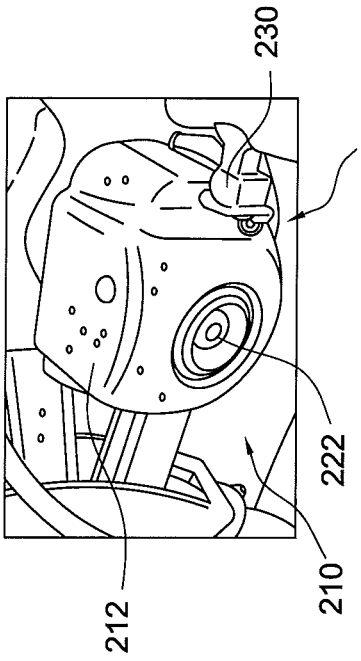
Figure 4:
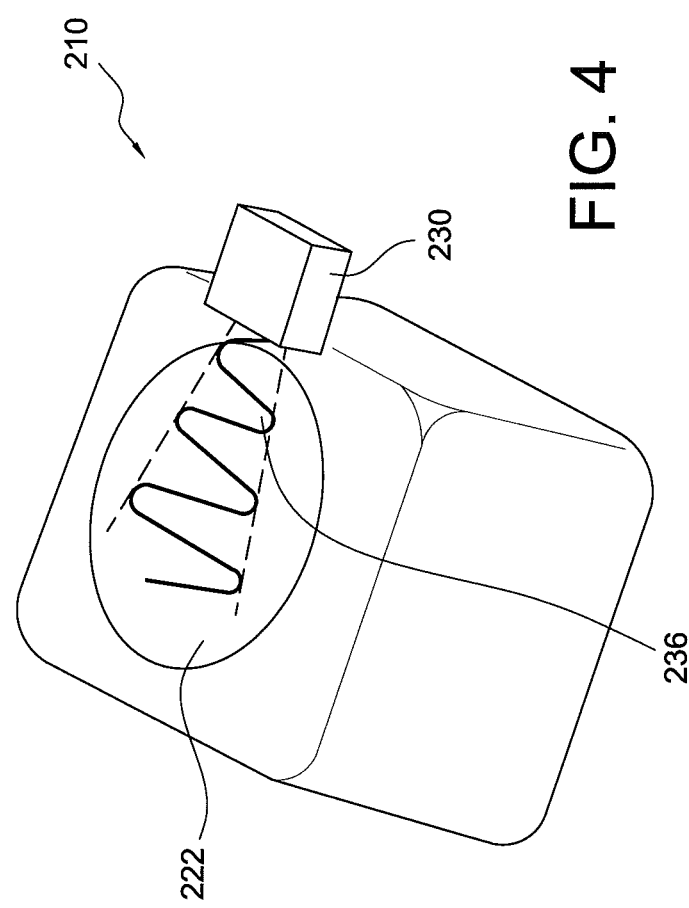
FIG. 4 is a schematic diagram illustrating a fluidic spray from an embodiment of the camera housing and integrated nozzle assembly of FIG. 3, in accordance with the present invention.

Turning now to FIGS. 3A-3D and FIG. 4, FIGS. 3A-3D are photographs illustrating a configuration of and displayed "before and after" performance of an imaging system with a sealed camera housing 212 and an aimed nozzle assembly 210 with laterally offset nozzle 230, in accordance with the present invention. FIG. 4 is a schematic diagram illustrating a fluidic spray 236 from camera housing 212 nozzle assembly 210 with laterally offset nozzle 230, and FIGS. 5A and 5B are schematic diagrams illustrating a perspective view and a side view of a fluid sheet 236 sprayed by an aimed nozzle 230 configured for the method for cleaning the imaging system's exterior objective lens surface 222, in accordance with the present invention.

Returning to FIG. 3A, a soiled or dirty objective lens surface 222 has been coated with a representative distribution of "SAE mud", which serves as a standard exemplar of a coating of road grime or debris 223. FIG. 3B is a photograph of the image generated by camera 212 while coated with debris 223 and the debris 223 is clearly obstructing the displayed view 209A as displayed to the user or driver. FIGS. 3C and 3D are photographs illustrating the washing or debris removal effect of the system of the present invention, and illustrate (in FIG. 3C) that debris 223 has been entirely removed from the distal surface of camera housing 212 and lens surface 222 by spray 236. In addition, the user operating the washer system 210 has been able to actuate the system to spray from aimed nozzle 230 while viewing displayed view 209A and so knows when to stop the washing, since debris 223 has been entirely removed from the distal surface of camera housing 212 and is seen to no longer obstruct lens surface 222.

As illustrated in FIGS. 3A-5B, external lens washing system 210 includes a substantially rigid aiming fixture having a distal side and a proximal side and being configured to support and constrain an external lens 222 exposed toward the distal side; the external lens has an external lens surface with a lens perimeter and a lens central axis 250 projecting distally from the lens surface 222, wherein a lens field of view is defined as a distally projecting solid angle (e.g., a truncated pyramid, encompassing the view in display 209A) including the lens central axis 250 and originating within the lens perimeter. Washing system 210 includes at least a first nozzle assembly configured to be supported and aimed toward the external lens 222 by the aiming fixture, and the first nozzle assembly includes a fluid inlet (not shown) in fluid communication with a first laterally offset washing nozzle 230 which projects from the aiming fixture's distal side. The nozzle 230 is configured and aimed to spray washing fluid in a substantially planar sheet 236 having a selected thickness 255 toward the external lens surface 222 and across the field of view, spraying at a first selected spray aiming angle (i.e., preferably spraying in a plane inclined proximally at an angle) of about 1°. The selected aiming angle can be in a range between 1° and 20° (as seen in FIGS. 4 and 5B) relative to a plane tangent to the lens external surface 222. Nozzle 230 is oriented to spray from a selected side, meaning that it is aimed to spray along a first selected spray azimuth angle in relation to a selected fixed reference point or datum 251 on the lens perimeter.

Preferably, lens washing nozzle 230 includes a first fluidic oscillator interaction chamber configured to operate on a selectively actuated flow of pressurized washing fluid flowing through the first oscillator's chamber to generate a first exhaust flow of fluid droplets 236, and the first nozzle assembly's fluid inlet receives pressurized washer fluid and is in fluid communication with the first interaction chamber which passes the pressurized washer fluid distally to the first laterally offset outlet nozzle 230 which is configured to exhaust the washer fluid from the first interaction chamber and generate a first oscillating spray of fluid droplets 236 aimed toward the external lens surface 222 and across the field of view. Preferably that fluidic oscillator is configured as a stepped mushroom fluidic oscillator (as illustrated in FIGS. 12A and 12B). The preferred spray flow rate is approximately 200 ml/min per nozzle at 18 psi, and the spray thickness 255 (i.e., which is seen as thickness in the spray plane transverse to the spray's fan angle plane, as shown in FIG. 5B) is preferably approximately 2 degrees. The oscillating action and large drops generated by the fluidic oscillator aimed by nozzle 230 in this manner were discovered to wet lens surface 222 very rapidly and provided a kinetic impact effect which was found to impact, flood and drive debris 223 as part of a flowing effluent 238 laterally off lens surface 222.

Optionally, laterally offset washing nozzle 230 is configured as a non-oscillating shear nozzle configured to generate a substantially flat fan spray having a selected spray fan angle (e.g., 45° or another angled selected in the range of 15° to 120°). Alternatively, first laterally offset washing nozzle may be configured as a non-oscillating bug-eye nozzle configured to generate at least one substantially solid fluid jet (i.e., a substantially solid fluid stream having no fan angle).

Preferably, the first laterally offset washing nozzle 230 is configured to aim the spray 236 from a first selected lateral offset distance (from the nozzle's throat or outlet to the center of objective lens' external surface 222) of about 15 mm. The selected lateral offset distance is preferably within the range bounded by 10 mm and 30 mm, in order to keep the entire package as compact as possible.

Some external camera systems include convex or dome-shaped lens surfaces, which can be more difficult to clean. As shown in FIGS. 6A and 6B, the system of the present invention can be configured with plural nozzle assemblies to effectively clean different image sensor housing configurations and different external lens surface shapes. Optionally, as shown in FIGS. 6A and 6B, an external lens washing system 210 of FIG. 3A-5B can include a second nozzle 232 configured to be supported and aimed by the aiming fixture, where the second nozzle 232 is configured and aimed direct a second spray 237 along a second selected spray azimuth angle being radially spaced at a selected inter-spray angle (e.g., 180°) from the first nozzle assembly's spray azimuth angle, aiming second spray 237 to oppose first spray 236.

For the external lens washing system illustrated in FIGS. 6A and 6B, the second nozzle assembly 232 preferably has a second fluidic oscillator interaction chamber configured to operate on a selectively actuated flow of pressurized washing fluid flowing through the second oscillator's chamber to generate the second exhaust flow of fluid droplets 237. Second nozzle assembly 232 receives pressurized washer fluid and is in fluid communication with the second interaction chamber which passes the pressurized washer fluid distally to the second laterally offset nozzle's outlet or throat which is configured to exhaust the washer fluid from the second interaction chamber and generate the second oscillating spray of fluid droplets 237 which is also aimed toward the external lens surface 222 and across the field of view. The second fluidic oscillator is also preferably configured as a stepped mushroom fluidic oscillator.

Impinging fluid jets 236, 237 are aimed to create a specific hydraulic effect and cooperate to distribute fluid across the lens surface in very little time. As the colliding and impinging fluid jets 236, 237 impact debris 223 (not shown) and the lens surface the provided a kinetic impact effect which was found to dislodge, dissolve and drive debris as a turbulent flowing effluent 238 laterally off lens surface 222. The preferred spray flow rate for each nozzle 230, 232 is approximately 200 ml/min per nozzle at 18 psi, and the spray thickness 255 (i.e., which is seen as thickness in the spray plane transverse to the spray's fan angle plane, as shown in FIGS. 5B and 6B) is preferably approximately 2 degrees.

Optionally, second laterally offset washing nozzle 232 is configured as a non-oscillating shear nozzle configured to generate a substantially flat fan spray having a selected spray fan angle (e.g., 45° or another angled selected in the range of 15° to 120°). Alternatively, second laterally offset washing nozzle 232 may be configured as a non-oscillating bug-eye nozzle configured to generate at least one substantially solid fluid jet (i.e., a substantially solid fluid stream having no fan angle).

Preferably, the second laterally offset washing nozzle 232 is configured to aim the spray 237 from a first selected lateral offset distance (from the nozzle's throat or outlet to the center of objective lens' external surface 222) of about 15 mm. The selected lateral offset distance is preferably within the range bounded by 10 mm and 30 mm, in order to keep the entire washing system's package as compact as possible.

Figure 7:
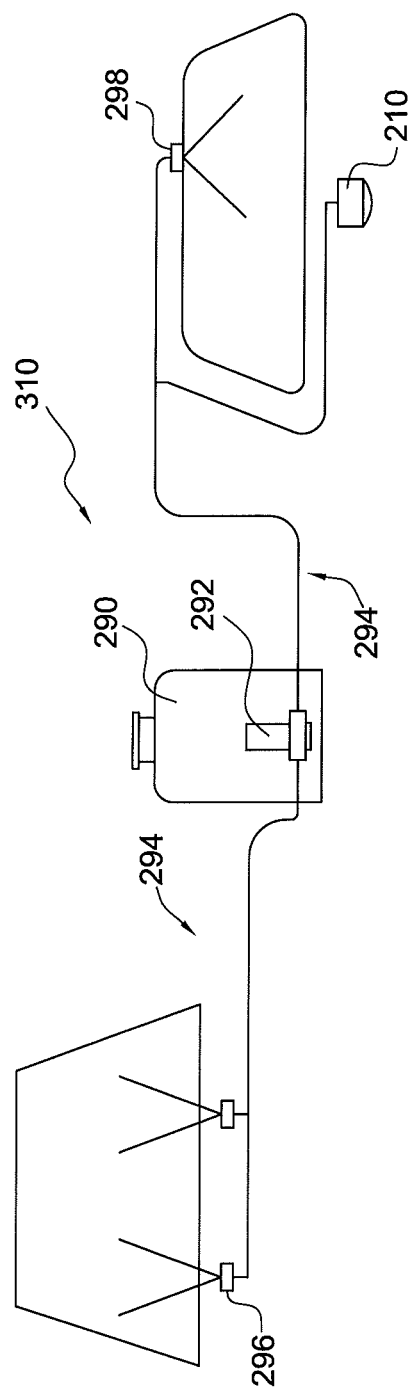
FIG. 7 is a schematic diagram illustrating another automotive imaging system with a camera washing nozzle assembly configured for use with the remote control method for cleaning the imaging system's exterior objective lens surface, in accordance with the present invention.

Turning now to system diagrams 7 and 8, The lens washing system of the present invention is readily integrated into standard equipment already specified for inclusion in many automobiles and other vehicles (e.g., 8). As best seen in FIG. 7, vehicles (e.g., 8) configured with an existing windshield washing system ("front wash") or rear window washing system ("rear wash") require use of a washing fluid reservoir and pumping system to provide a supply of pressurized washing fluid. Washer tank or reservoir 290 typically includes an internal pump 292 which is activated to draw washing fluid from the reservoir 290 and supply pressurized fluid to a conduit network 294 (e.g., comprising lumens, tubes or hoses) which supply the windshield washing nozzles 296 and rear window washing nozzle(s) 298. In accordance with one embodiment of the present invention, the system of the present invention (e.g., 110 or 210) actuates lens washing in response to driver control input or automatically. In automatic operation, lens washing is initiated or triggered in response to the driver's use of the windshield washing system or "front wash" (e.g., where lens washing happens every time the windshield is sprayed with front wash nozzle 296 or alternatively, lens wash may be selectively actuated periodically, with one momentary lens wash cycle for every 3-5 front wash events). Similarly, rear window or liftgate/backlight cleaning can be linked to the lens washing for a back-up camera system wherein backup camera lens washing happens every time the rear window is sprayed with rear wash nozzle 298 or alternatively, a backup camera lens wash may be selectively actuated periodically, with one momentary lens wash cycle for every 3-5 rear wash events.

Alternatively, camera lens washing may be user-controlled using an interior display (e.g., 9a) wherein remotely controllable system 310 includes at least one nozzle assembly 210 and configured to clean the external image sensor's objective lens surface and washing off accumulated image distorting debris 223 uses the display mounted within the vehicle's interior 9A connected to the vehicle's data communication network to receive image signals for display to the driver. The external image sensor is configured to generate an external image display the sensor's external objective lens surface 222 is aimed toward the vehicle's exterior (e.g., rear, front or to the sides of vehicle 8) and the sensor or camera has a selected field of view. The image sensor being substantially exposed to the ambient environment and accumulated image distorting debris when the vehicle is in use. The image sensor lens washing system is configured with laterally offset washing nozzle 230 to selectively spray washing fluid onto the image sensor's objective lens surface at a narrow, glancing angle, the spray being aimed across the field of view along an aiming angle which is aimed at a selected aiming angle that within the range bounded by 1° and 20° in relation to the external objective lens surface, and the spray being actuated in response to a momentary wash control signal of a few seconds duration. The washing system actuation switch mounted within the interior of vehicle 8 and is configured to selectively and momentarily generate the wash control signal when actuation of the lens washing system 210 is desired by the driver, while viewing the display 9A.

Figure 8:
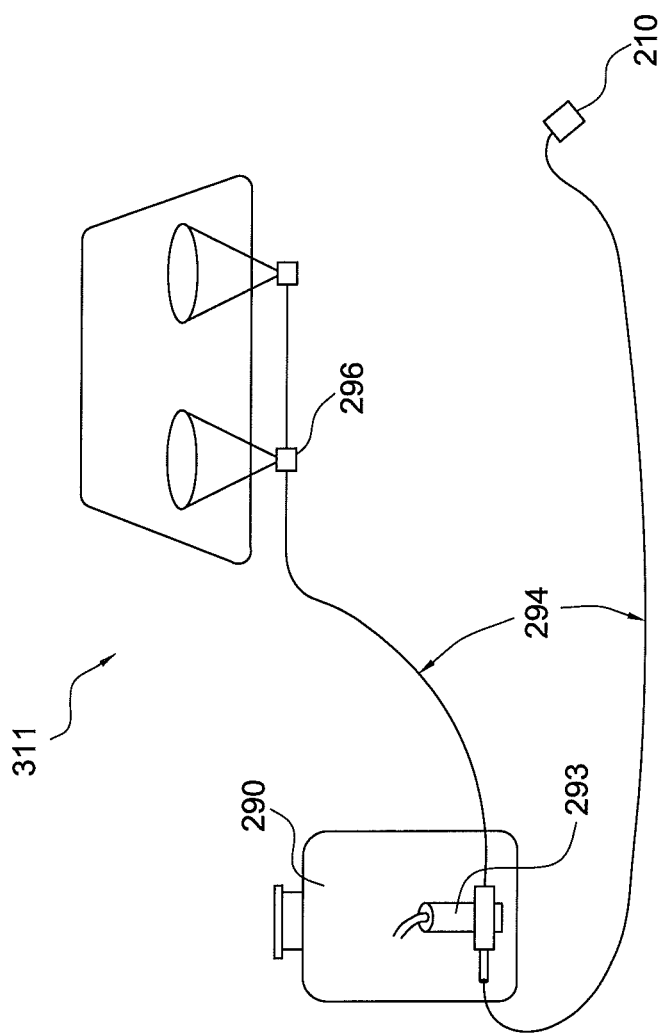
FIG. 8 is a schematic diagram illustrating yet another automotive imaging system configuration with a camera washing nozzle assembly configured for use with the remote control method for cleaning the imaging system's exterior objective lens surface, in accordance with the present invention.

Turning now to FIG. 8, The lens washing system of the present invention is readily integrated into standard equipment already specified for inclusion in many automobiles and other vehicles (e.g., 8). A vehicles (e.g., 8) configured with a front wash system also requires use of a washing fluid reservoir and pumping system to provide a supply of pressurized washing fluid. Washer tank or reservoir 290 has an internal dual outlet pump 293 which is activated to draw washing fluid from the reservoir 290 and supply pressurized fluid to a conduit network 294 (e.g., comprising lumens, tubes or hoses) which supply the windshield washing nozzles 296 and via a rear or secondary outlet conduit, supplies camera washing system 210. Pressurized fluid transmission to camera system 210 may be controlled either by selective actuation of pump 293 or by control of one or more valves (not shown) placed to either allow or stop washer fluid flow to lens washing assembly 210.

In accordance with another embodiment of the system of the present invention, lens washing system 311 is actuated in response to driver control input or automatically. In automatic operation, lens washing is initiated or triggered in response to the driver's use of the windshield washing system or "front wash" (e.g., where lens washing happens every time the windshield is sprayed with front wash nozzle 296 or alternatively, lens wash may be selectively actuated periodically, with one momentary lens wash cycle for every 3-5 front wash events).

Alternatively, for system 311, as illustrated in FIG. 8, camera lens washing may be user-controlled using an interior display (e.g., 9a) wherein remotely controllable system 311 includes at least one nozzle assembly 210 and configured to clean the external image sensor's objective lens surface and washing off accumulated image distorting debris 223 uses the display mounted within the vehicle's interior 9A connected to the vehicle's data communication network to receive image signals for display to the driver. The external image sensor is configured to generate an external image display the sensor's external objective lens surface 222 is aimed toward the vehicle's exterior (e.g., rear, front or to the sides of vehicle 8) and the sensor or camera has a selected field of view. The image sensor being substantially exposed to the ambient environment and accumulated image distorting debris when the vehicle is in use. The image sensor lens washing system is configured with laterally offset washing nozzle 230 to selectively spray washing fluid onto the image sensor's objective lens surface at a narrow, glancing angle, the spray being aimed across the field of view along an aiming angle which is aimed at a selected aiming angle that within the range bounded by 1° and 20° in relation to the external objective lens surface, and the spray being actuated in response to a momentary wash control signal of a few seconds duration. The washing system actuation switch mounted within the interior of vehicle 8 and is configured to selectively and momentarily generate the wash control signal when actuation of the lens washing system 210 is desired by the driver, while viewing the display 9A.

Figure 9:
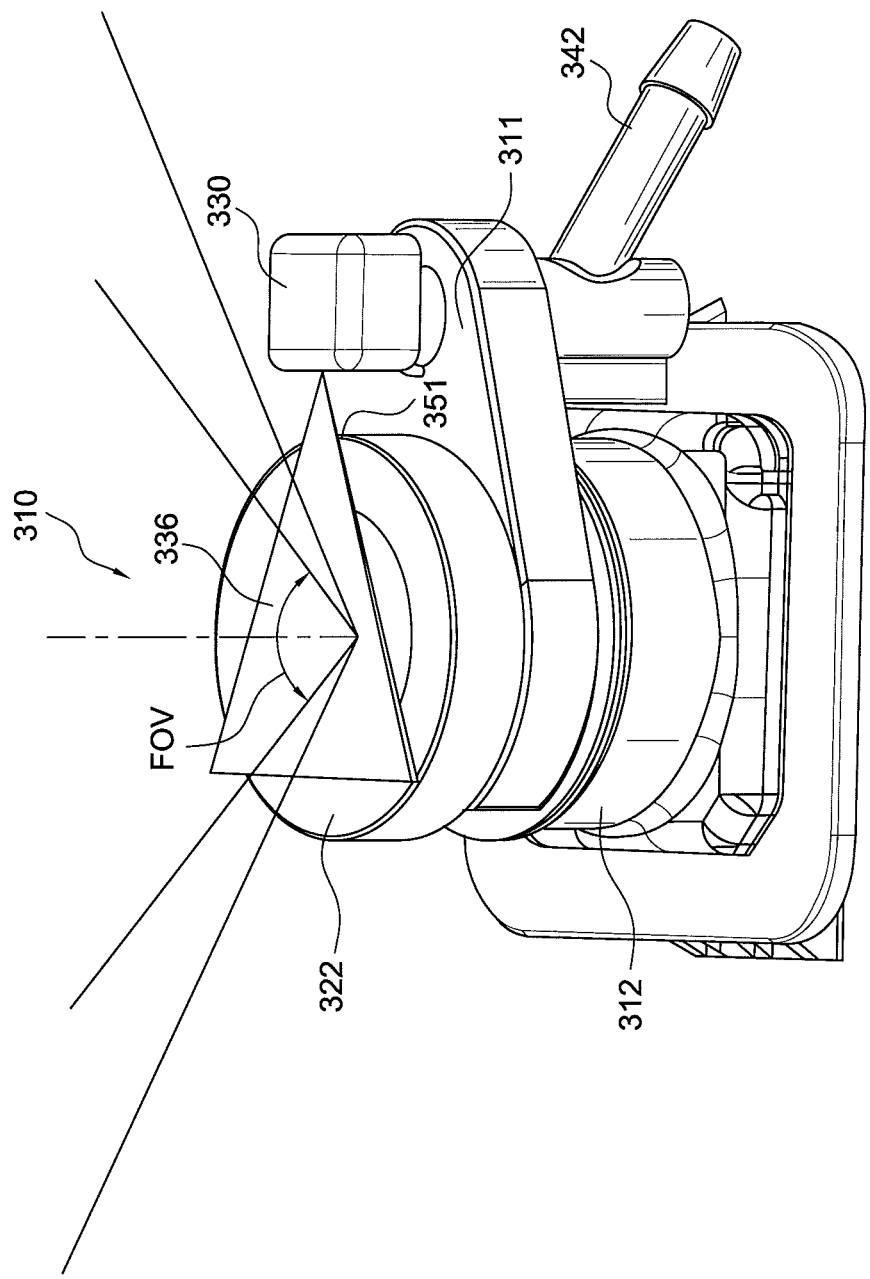
FIG. 9 is a perspective view illustrating aimed spray orientation for another camera nozzle assembly configured for use with the method for cleaning the imaging system's exterior objective lens surface, in accordance with the present invention.
Figure 10:
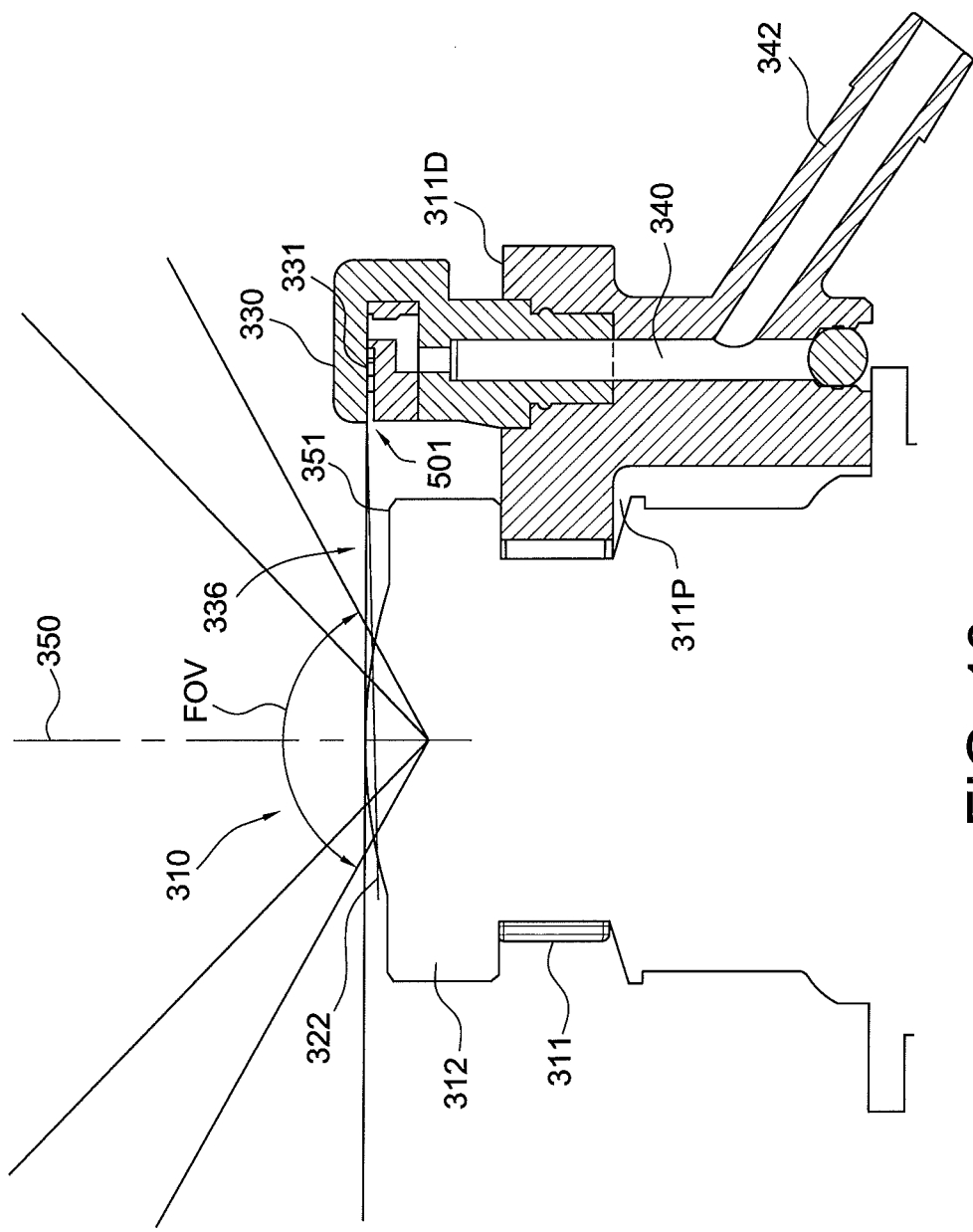
FIG. 10 is a side view illustrating aimed spray fan angle and incidence angle for the system and nozzle assembly of FIG. 9, in accordance with the present invention.
Figure 11:
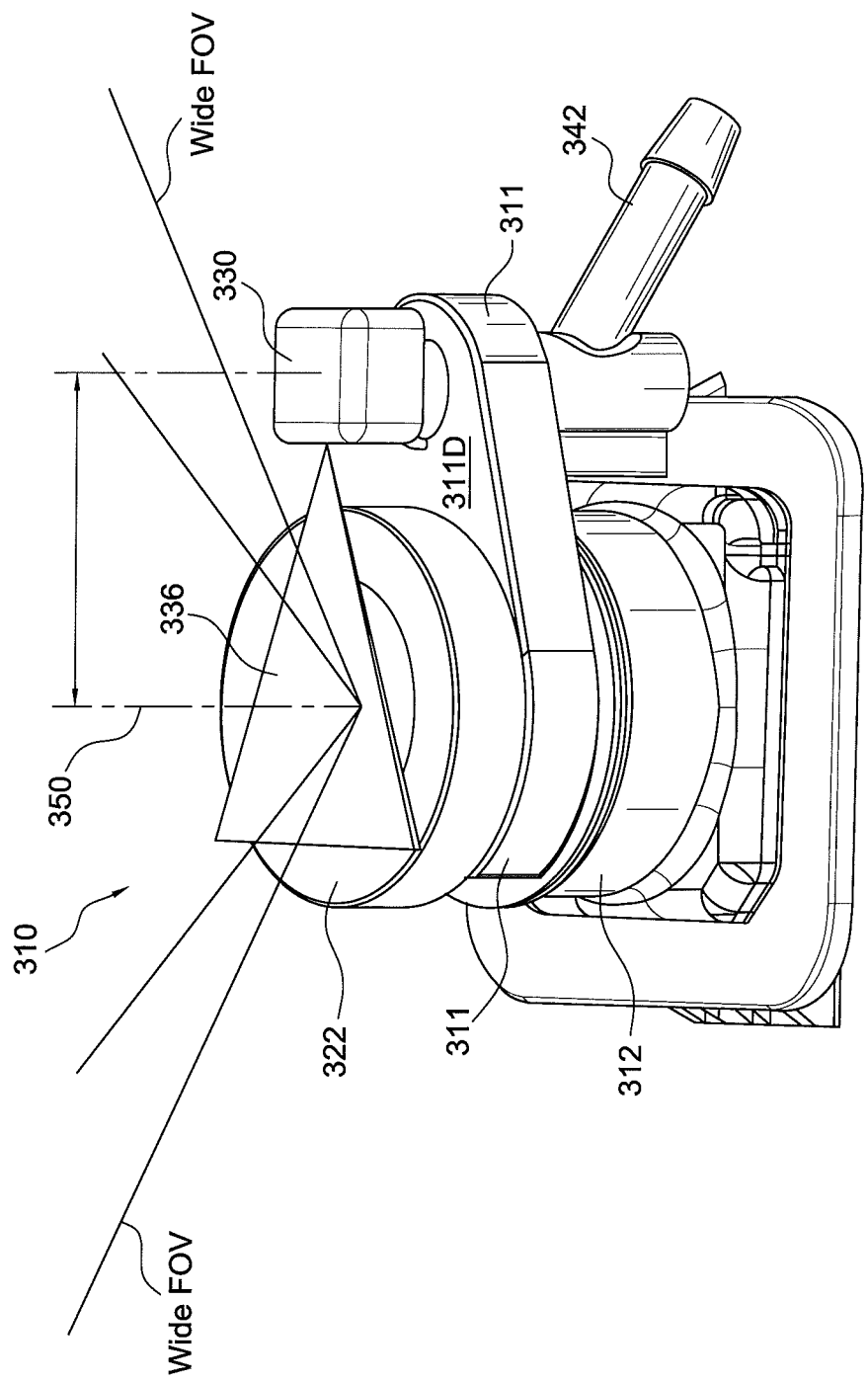
FIG. 11 is a perspective view illustrating range of fluidic oscillator nozzle mounting distances for the system and nozzle assembly of FIGS. 9 and 10, in accordance with the present invention.

Turning now to FIGS. 9-11, a bracket indexed external lens washing system 310 is illustrated. As illustrated in FIG. 9, external lens washing system 310 includes a substantially rigid aiming bracket or fixture 311 having a distal side 311D and a proximal side 311P (best seen in the cross section view of FIG. 10). Fixture or bracket 311 is a rigid durable support fabricated and configured to support camera module 312 and thus orients and constrains the camera's external lens which is exposed toward the distal side of assembly 310. The camera's lens has an external lens surface 322 with a lens perimeter and a lens central axis 350 projecting distally from the lens surface 322, and the lens field of view is defined as a distally projecting solid angle (e.g., a truncated cone or pyramid, generating an image signal having, for example, the view in display 209A). The Field of View ("FOV") typically has an angular width of 90° to 170°. The camera or image sensor 312 has a lens central axis 350 centered within the lens perimeter and the lens FOV is typically symmetrical about lens central axis 350.

Washing system 310 includes at least a first nozzle assembly 330 configured to be supported and aimed toward the external lens 322 by the aiming fixture 311, and the first nozzle assembly includes a fluid inlet 342 in fluid communication with first laterally offset washing nozzle 330 which projects above or distally from the aiming fixture's distal side 311D. Laterally offset nozzle 330 is configured and aimed to spray washing fluid in a substantially planar sheet 336 having a selected thickness (e.g., 255) toward external lens surface 322 and across the field of view, spraying at a first selected spray aiming angle (i.e., preferably spraying in a plane inclined proximally at an angle) of about 1°. The selected aiming angle can be in a range between 1° and 20° (as best seen in FIG. 10) relative to a plane tangent to the lens external surface 322. Nozzle 330 is oriented to spray from a selected side, meaning that it is aimed to spray along a first selected spray azimuth angle in relation to a selected fixed reference point or datum 351 on the lens perimeter.

Preferably, lens washing nozzle 330 includes a first fluidic oscillator interaction chamber 331 configured to operate on a selectively actuated flow of pressurized washing fluid flowing through the first oscillator's chamber 331 to generate a first exhaust flow of fluid droplets 336, and the first nozzle assembly's fluid inlet 342 receives pressurized washer fluid (e.g., from reservoir 290) and is in fluid communication via fluid path 340 which passes the pressurized washer fluid distally to the first laterally offset outlet nozzle 330 which is configured to exhaust the washer fluid from the first interaction chamber 331 and generate a first oscillating spray of fluid droplets 336 aimed toward the external lens surface 322 and across the field of view. Preferably the fluidic oscillator including interaction chamber 331 is configured as a stepped mushroom fluidic oscillator (as illustrated in FIGS. 12A and 12B). The preferred flow rate in oscillating spray 336 is preferably approximately 200 ml/min per nozzle at 18 psi, and the spray thickness (i.e., which is seen as thickness in the spray plane transverse to the spray's fan angle plane, as shown in FIGS. 10 and 5B) is preferably approximately 2 degrees. The oscillating action and large drops generated by the fluidic oscillator aimed by nozzle 330 in this manner was discovered to wet lens surface 322 very rapidly and provided a kinetic impact effect which was found to impact, dissolve and drive debris (not shown, but like debris 223) as part of a flowing effluent laterally off lens surface 222.

Optionally, laterally offset washing nozzle 330 may be configured as a non-oscillating shear nozzle configured to generate a substantially flat fan spray having a selected spray fan angle (e.g., 45° or another angled selected in the range of 15° to 120°). Alternatively, first laterally offset washing nozzle 33 may be configured as a non-oscillating bug-eye nozzle configured to generate at least one substantially solid fluid jet (i.e., a substantially solid fluid stream having no fan angle).

Preferably, the laterally offset washing nozzle 330 is configured to aim the spray 336 from a first selected lateral offset distance (from the nozzle's throat or outlet to the center of objective lens' external surface 222, see FIG. 11) of about 15 mm. The selected lateral offset distance is preferably within the range bounded by 10 mm and 30 mm, in order to keep the entire package as compact as possible.

In the embodiment illustrated in FIGS. 9-11 has camera 312 with lens 322, a nozzle 330 mounted distally and aiming spray 336 nearly parallel to the lens 322 and associated bracketing (i.e., fixture 311) that is necessary to hold nozzle 330 in a fixed location relative to the lens both (in lateral offset and azimuth) from the center line of the lens and distally or above the lens. There are several variables to consider when designing for this camera cleaning system and package, including: mounting methods, packaging space, Field of View (FOV) considerations and Adverse System Effect Mitigation. Taking each in turn:

One preferred mounting or attachment method for the nozzle 330 with the camera 312 is on the camera module housing or body, directly. This mounting location assures that no matter where the camera moves, fluid sprayed from the nozzle is always aimed at the right location toward the center of the lens surface. A nozzle mounted separately from the camera could be subject to extra tolerance stackups and become mis-aimed. It is of course, understood that there will be some camera designs that do not allow for direct attachment and will require separate mounting schemes. The basics of good nozzle placement discussed above are the same regardless of attachment method.

In general, the location of cameras (e.g., 312) in vehicles (e.g., 8) is limited to certain specific regions, due to packaging and line-of-sight objectives. Unfortunately for camera wash nozzle packaging, prime vehicle panel exterior locations also tend to be good for other components like; liftgate handles or lighting components. As a result, these vehicle panel exterior locations have very tight packaging constraints, driving the need for very small nozzles and tight camera-to-nozzle envelopes.

It should be understood that many existing cameras have Field of View Angles from 120 to 170 degrees (e.g., as indicated by radial lines in FIGS. 9-11). A major constraint to system functionality is to have nothing intrude into the displayed field of view of the camera, (e.g., 209A) so that the user is not distracted by the appearance of the lens washing nozzle 330. Thus the nozzle (e.g., 230 or 330) should be laterally positioned such that it is not in the camera FOV. In the illustrated embodiments of the present invention, the nozzle (e.g., 230 or 330) is oriented and aimed from a fixed nearly parallel-to-lens location, to be away from and behind the FOV of the camera. As the camera FOV's approaches and exceeds 180 degrees this will become impossible. However, it will be noted that with these large angles other components in the vehicle will become visible to the camera. It will then be necessary to place the nozzle (e.g., 230 or 330) such that it aligned with the vehicle's other features and is thereby not silhouetted beyond (and so is "hidden" in the clutter of) the vehicle's exterior surface features, minimizing intrusion into "clear" view of the camera. In the embodiment of FIGS. 9-11, nozzle 330 creates a fluid distribution such that the entirety, or as much as possible, of the lens is covered by fluid and impacts the lens at −1 degrees to −20 degrees or so before the nozzle head becomes visible to the camera, ("aim angle"). Another significant advantage to nearly parallel impact of the spray 336 to the lens 322 is that the fluid is fully engaged in pushing the debris off or laterally across the lens, and not in obliquely impact or bouncing off the lens as would be experienced in higher aim angles, with a more direct impingement. As the aim angle increases, the nozzle must be moved distally further and up into the FOV, and farther from the camera, making cosmetically attractive packaging difficult. Therefore, the nozzle should be kept within 10 degrees (aim angle down to the lens) to keep cosmetic packaging reasonable.

In addition to aim angle considerations, the nozzle distance from the center of the lens (as illustrated in FIG. 11) is important. The closer nozzle 330 is to the center of the lens 322, the wider the fluid distribution (and spray fan angle) must be to cover the entirety of the lens. Excessive closeness to the lens center is objectionable for a number of reasons. Firstly, the nozzle is simply too close to the camera body and may crash with it physically. Secondly, the wider the distribution angle (or spray fan angle) needs to be to get good coverage. Wider spray fan angles spread a relatively small fluid flow rate over a larger lens cleaning area, which could result in the need for a different distribution geometry or higher flow rates. Applicants have found that with one effective distribution geometry, the lateral offset distance is preferably between 18 mm and 28 mm. This lateral offset is approximate, as aim angle and nozzle distal height variations tend to complicate the geometry.

Addition of cleaning systems (e.g., 310) to vehicle systems can be accomplished in a number of ways. They can be tied into existing systems, like rear glass cleaning in an SUV, whereby the camera is cleaned whenever the rear glass is cleaned and vice-a-versa. Systems can also be designed such that cleaning in on-demand, and requires the addition of a pump (e.g. 292) and controller or control system (e.g., 9B) programmed to perform the method steps described above. However, it is highly preferable to keep the same number and size of the washer fluid reservoir (s) (e.g., 290). It is highly unlikely that a second reservoir or fluid bottle would be added to vehicle 8, thus the camera cleaning nozzle system (e.g., 310) is likely to be seen as a parasitic system with regard to overall vehicle performance. Since vehicle packaging generally does not allow for larger washer reservoirs, any camera cleaning system must consume as little fluid as possible to have the least impact on the overall vehicle performance.

Since minimizing the overall effect of the addition of the lens washer system (e.g., 310) to the systems of vehicle 8 is desired, a small flow rate is preferred for the nozzle (e.g., 330). One embodiment used a fluidic nozzle with a target flow rate of 200+/−40 mL/min @ 18 PSI and this was shown to be very effective in cleaning the lens 322 with the aforementioned packaging guidelines. With these flow and packaging considerations in mind, the stepped mushroom circuit of FIGS. 12A and 12B was chosen for the preferred fluid delivery geometry embodiment of FIGS. 9-11. This fluidic circuit (e.g., with stepped mushroom chip 501) is capable of performing well in cold weather conditions with 0.06 mm step and allows for very small packaging at 5 mm×5 mm for a 200 mL/min flow rate and 50° spray fan angle for spray 336. Most importantly, this design can maintain a minimum 0.014" power nozzle dimension which is required for good clog resistant performance. Power nozzles smaller than this risk clogging in automotive situations. The fluidic circuit has also been provided with internal filters (e.g., posts 522). Additionally, this circuit design allows for a small interaction region 331, approximately 3.3 mm×2.5 mm, helping to support fan angles as high as 50 degrees and still staying within the target packaging space.

The lens washer nozzle assemblies (e.g., 110, 210, 310, 610 or, for low profile embodiments 710, 810 and 1010) preferably a include fluidic oscillators as part of a nozzle assembly and preferably a stepped mushroom fluidic oscillator as described in commonly owned U.S. Pat. No. 7,267,290, the entirety of which is incorporated herein by reference. Referring again to FIGS. 12A and 12B, the lens washer nozzle fluidic oscillator is optionally configured as a removable fluidic chip 501 having an oscillating chamber defined between the fluid impermeable surfaces of chip 501 and the nozzle assembly's chip-receiving interior surfaces (as seen in section in FIG. 10). Referring again to FIGS. 10, 12A and 12B the fluidic oscillator with interaction chamber 331 as configured in nozzle assembly 310 is suitable for use at colder temperatures for an exhaust flow in the form of oscillating spray of fluid droplets 336 and has a pair of power nozzles 514 configured to accelerate the movement of the pressurized fluid, a fluid pathway that connects and allows for the flow of pressurized fluid between its inlet 512 and the power nozzles 514, an interaction chamber 518 which is attached to the nozzles and receives the flow from the nozzles, a fluid spray outlet 520 from which the spray exhausts from the interaction chamber, and a flow instability generating structural feature for increasing the instability of the fluid's flow from the power nozzles, with this structural feature being situated in a location chosen from the group consisting of a location within the fluid pathway or proximate the power nozzles. The flow instability generating feature preferably comprises a protrusion that extends inward from each sidewall 506 of the fluid pathway so as to cause a flow separation region downstream of the protrusions, but may comprise a step 524A in the height elevation of the floor of the power nozzles 514 with respect to that of the interaction chamber, as best seen in FIG. 12B.

Figure 13B:
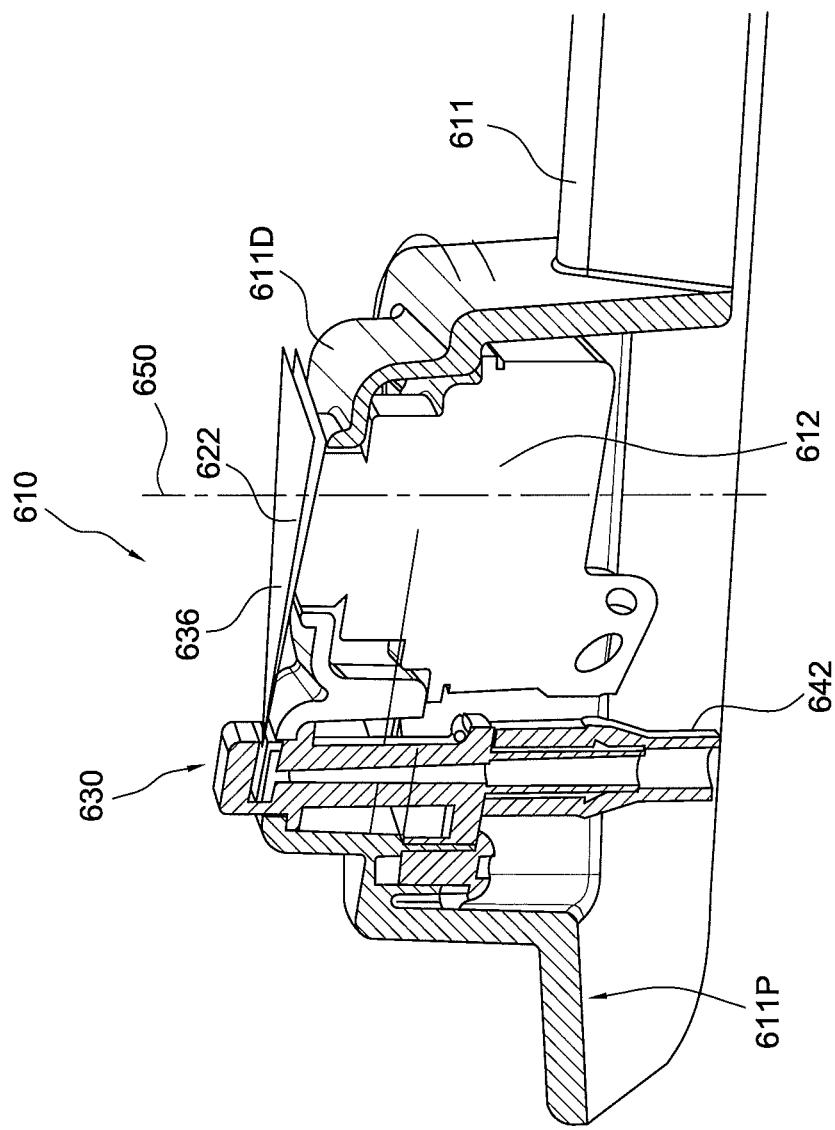

Turning now to FIGS. 13A-C, another embodiment for the external lens washing system and nozzle assembly 610 includes a substantially rigid bezel or aiming fixture 611 having a distal side 611D and a proximal side 611P. Bezel or fixture 611 is configured to support an image sensor or camera 612 and constrain the camera's external lens exposed toward the distal side; the external lens has an external lens surface 622 with a lens perimeter and a lens central axis 650 projecting distally from the lens surface 222, wherein a lens field of view is defined as a distally projecting solid angle (e.g., a truncated cone or pyramid, encompassing the view in display 209A) including the lens central axis 650 and originating within the lens perimeter. Washing system 610 includes at least a first nozzle assembly configured to be supported and aimed toward the external lens 622 by the bezel or aiming fixture 611, and the first nozzle assembly includes a fluid inlet 642 in fluid communication with a first laterally offset washing nozzle 630 which distally projects from the aiming fixture's distal side 611D. The nozzle 630 is configured and aimed to spray washing fluid in a substantially planar sheet 636 having a selected thickness toward the external lens surface 622 and across the field of view, spraying at a first selected spray aiming angle (i.e., preferably spraying in a plane inclined proximally at an angle) of about 1°. The selected aiming angle can be in a range between 1° and 20° (as seen in FIGS. 13B, 13C and 5B) relative to a plane tangent to the lens external surface 622. Nozzle 630 is oriented to spray from a selected side, meaning that it is aimed to spray along a first selected spray azimuth angle in relation to a selected fixed reference point or datum 651 on the lens perimeter.

Preferably, lens washing nozzle 630 includes a first fluidic oscillator interaction chamber 631 configured to operate on a selectively actuated flow of pressurized washing fluid flowing through the first oscillator's chamber to generate a first exhaust flow of fluid droplets 636, and the first nozzle assembly's fluid inlet 642 receives pressurized washer fluid and is in fluid communication with the first interaction chamber 631 which passes the pressurized washer fluid distally to the first laterally offset outlet nozzle 630 which is configured to exhaust the washer fluid from the first interaction chamber and generate a first oscillating spray of fluid droplets 636 aimed toward the external lens surface 622 and across the field of view. Preferably, as noted above, that fluidic oscillator is configured as a stepped mushroom fluidic oscillator (as illustrated in FIGS. 12A and 12B). The preferred spray flow rate is approximately 200 ml/min per nozzle at 18 psi, and the spray thickness (i.e., which is seen as thickness in the spray plane transverse to the spray's fan angle plane, as shown in FIG. 5B) is preferably approximately 2 degrees. The oscillating action and large drops generated by the fluidic oscillator aimed by nozzle 630 in this manner were discovered to wet lens surface 622 very rapidly and provided a kinetic impact effect which was found to impact, dissolve and drive debris (e.g., like 223, not shown) as part of a flowing effluent laterally off lens surface 622.

Optionally, laterally offset washing nozzle 630 is configured as a non-oscillating shear nozzle configured to generate a substantially flat fan spray having a selected spray fan angle (e.g., 45° or another angled selected in the range of 15° to 120°). Alternatively, first laterally offset washing nozzle may be configured as a non-oscillating bug-eye nozzle configured to generate at least one substantially solid fluid jet (i.e., a substantially solid fluid stream having no fan angle).

Preferably, the first laterally offset washing nozzle 630 is configured to aim the spray 636 from a first selected lateral offset distance (from the nozzle's throat or outlet to the center of objective lens' external surface 622) of about 15 mm. The selected lateral offset distance is preferably within the range bounded by 10 mm and 30 mm, in order to keep the entire package as compact as possible.

The camera lens washing assembly 610 illustrated in FIGS. 13A-13C is preferably is configured as an integrated automotive camera module and nozzle assembly, with 612 camera module and the aimed nozzle assembly integrally packaged as a one-piece unitary module configured for assembly into a vehicle 8. Substantially fluid impermeable camera module 612 is affixed within bezel or housing 611 and has an interior configured to enclose and aim an imaging sensor having an objective lens and a pixelated image sensor array (e.g., like 18), where bezel or housing 611 is configured to support and aim the camera module 612. Camera module 612 comprises a self-contained and sealed module enclosing the image sensor array (e.g., like 18) and associated image signal processing components (e.g., as illustrated in FIG. 1D), and is substantially sealed to limit or substantially preclude water intrusion into the camera module's interior volume. Camera module 612 and integral housing 611 are configured to be positioned at or affixed upon vehicle 8 as a camera lens and lens washer unit 610. Camera module 612 also includes an electrical connector 670 suitable for electrically conductive connection to a vehicle electrical connector when the camera module housing is positioned at the vehicle 8. The camera module's electrical connector extends to be accessible at a proximal end 672 for connecting to the vehicle electrical connector (or vehicle controller 9B) when the camera module is positioned at the vehicle 8 and camera module 612 is responsive to vehicle controller 9B to process video images captured by the imaging sensor.

Figure 14B:
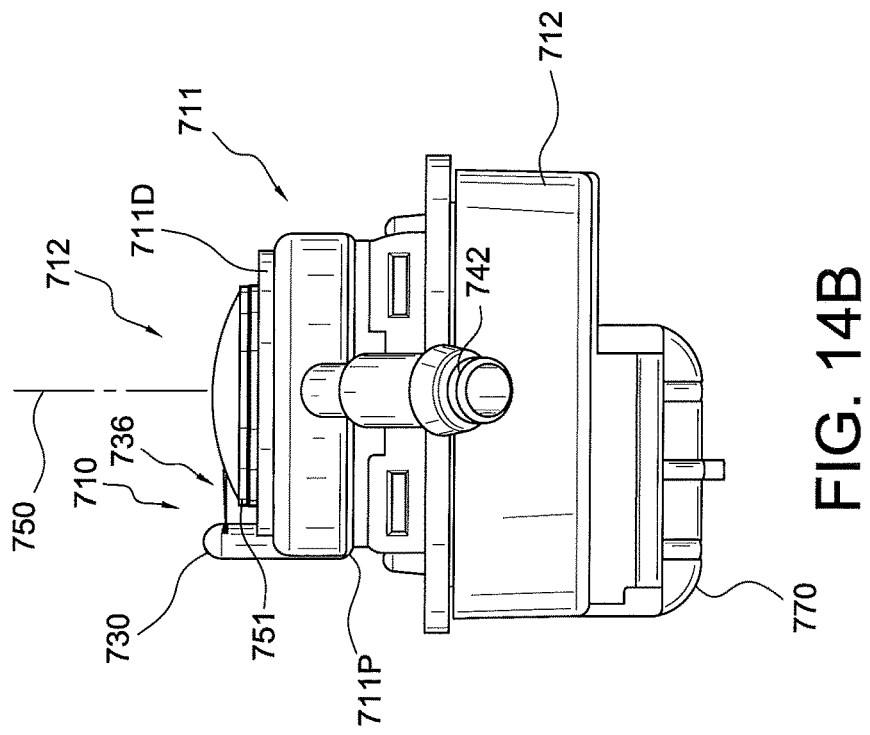
FIGS. 14A and 14B illustrate an integrated camera and low profile nozzle assembly having a conformal fluid transmission duct defining a substantially rigid housing, in accordance with the present invention.
Figure 14A:
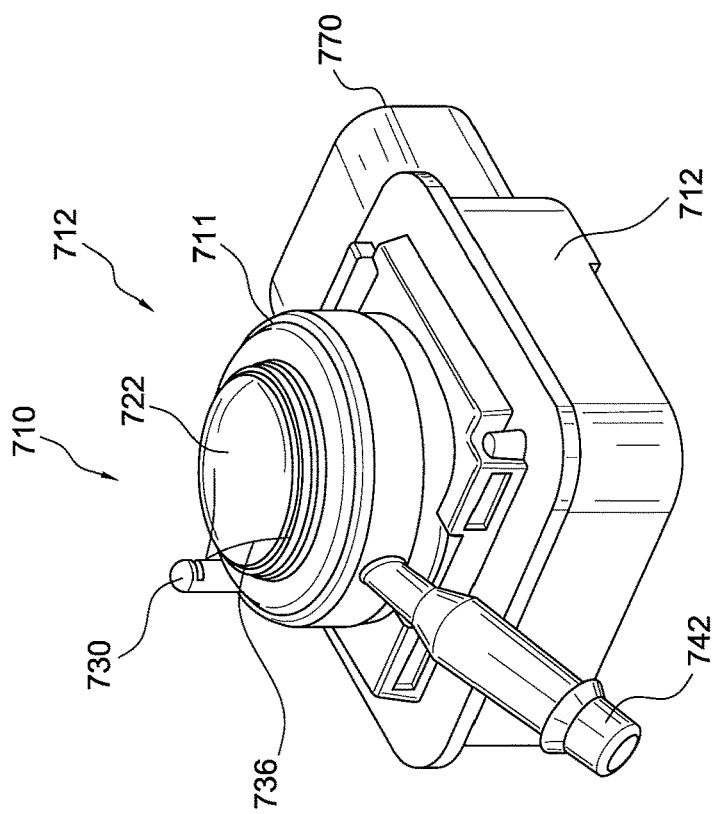
Figure 15C:
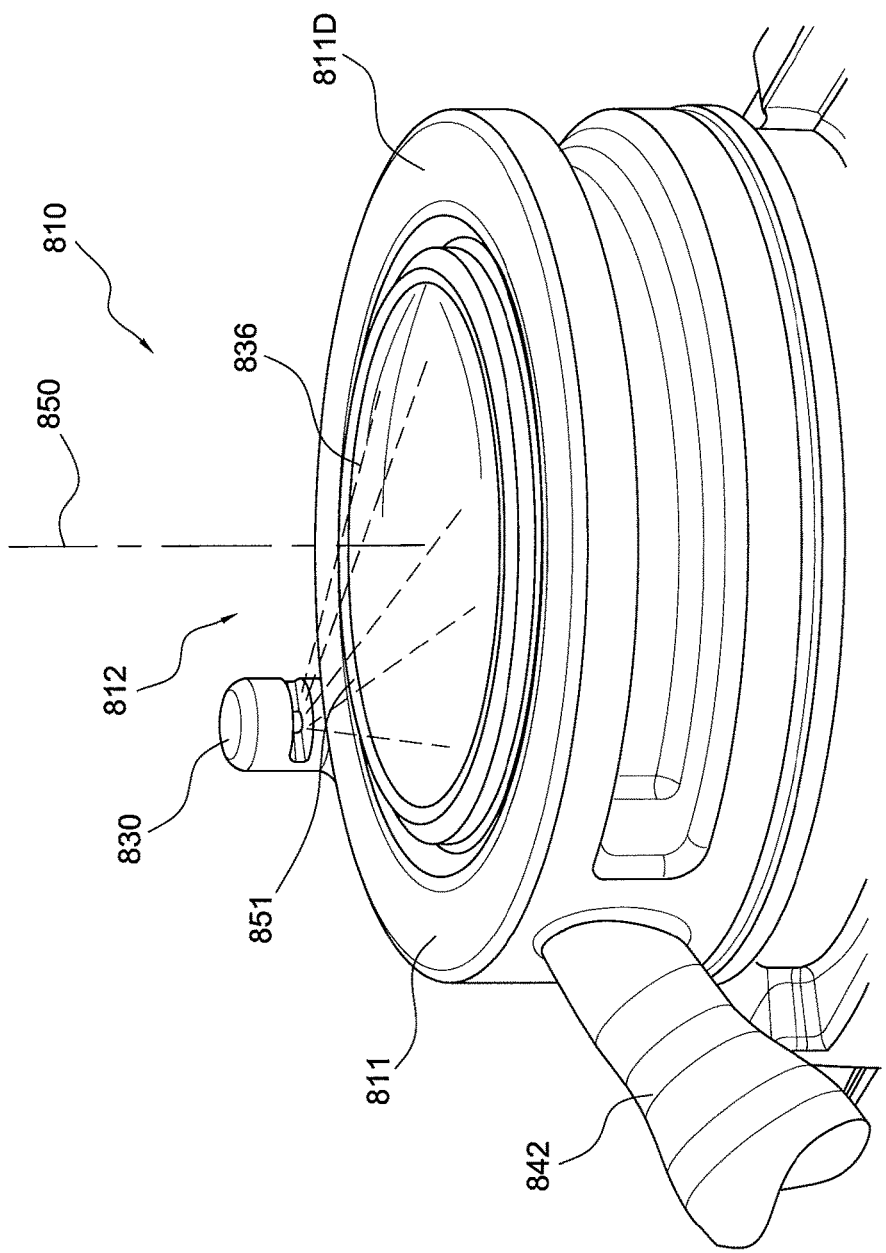
Figure 15E:
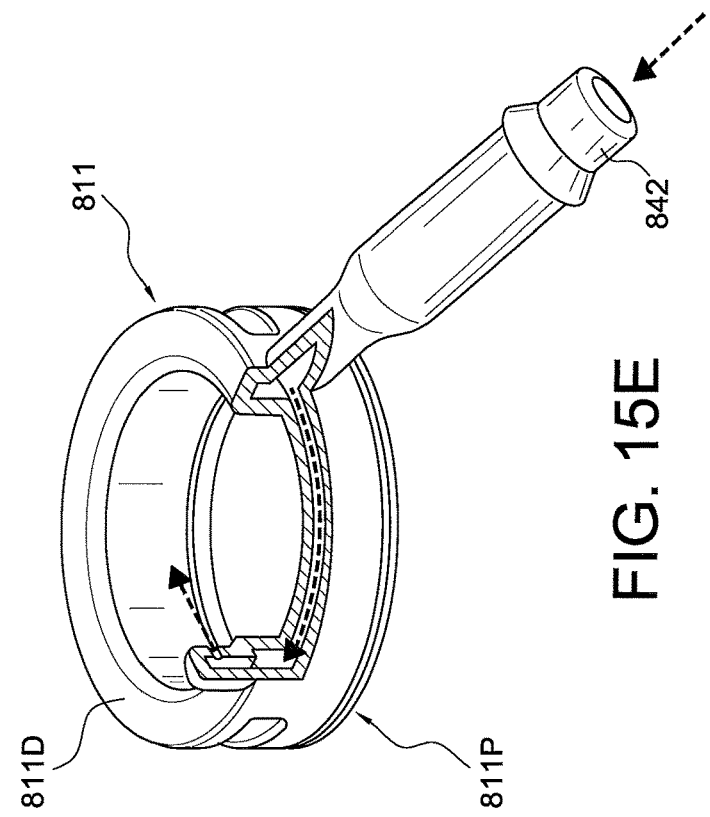
Figure 15D:
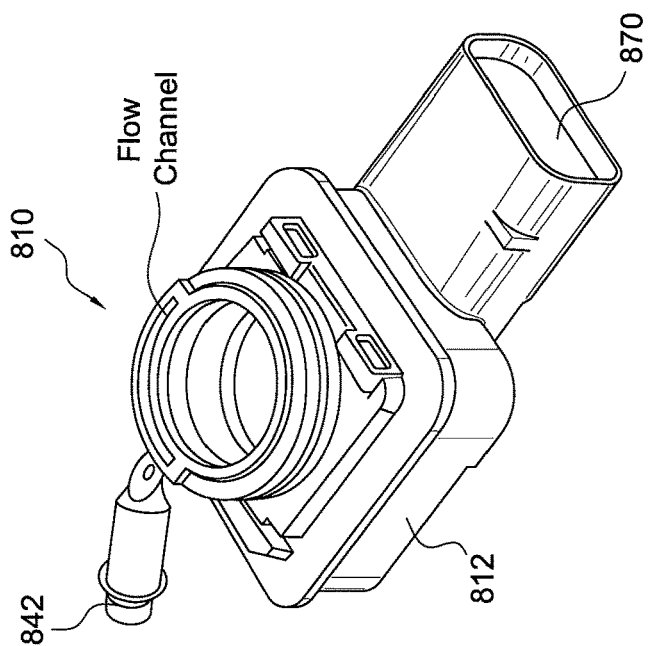

More compact, low profile embodiments have also been developed. For example, a first low-profile embodiment of the lens washing system of the present invention is illustrated in FIGS. 14A and 14B. Low-profile nozzle assembly 710 is configured (preferably) with a low-profile conformal housing fixture 711 aiming a very compact lateral-feed reverse mushroom fluidic oscillator (having an spray-axis length of about 3 mm, which is much more compact that the previous oscillator's length of about 5 mm). The remotely controllable system and low-profile nozzle assembly provides a compact or axially short fluidic oscillator which generates a high velocity spray with a very wide fan angle and so can be integrated into the compact nozzle assembly for placement very near the periphery of the lens surface while remaining out of the camera's view, to provide a very compact and low profile unitary camera and camera washing nozzle assembly package. The compact nozzles may also be configured with nozzles configured to generate fan-shaped shear jets.

Low-profile external lens washing system and nozzle assembly 710 includes a conformal fluid transmission housing and spray aiming fixture 711 having a distal side 711D and a proximal side 711P. Conformal housing fixture 711 is configured to encircle and support an image sensor or camera 712 and constrain the camera's external lens exposed toward the distal side; the external lens has an external lens surface 722 with a lens perimeter and a lens central axis 750 projecting distally from the lens surface 722, wherein a lens field of view is defined as a distally projecting solid angle (e.g., a truncated cone or pyramid, encompassing the view in display 209A) including the lens central axis 750 and originating within the lens perimeter. Washing system 710 includes at least a first nozzle assembly configured to be supported and aimed toward the external lens 722 by the nozzle head 730 of aiming fixture 711, and the first nozzle assembly includes a fluid inlet 742 in fluid communication with a first laterally offset washing nozzle head 730 which distally projects from the aiming fixture's distal side 711D. The nozzle head 730 is configured and aimed to spray washing fluid in a substantially planar sheet 736 having a selected thickness toward the external lens surface 722 and across the field of view, spraying at a first selected spray aiming angle (i.e., preferably spraying in a plane inclined proximally at an angle) of about 1°. The selected aiming angle can be in a range between 1° and 20° (as seen in FIG. 14B) relative to a plane tangent to the lens external surface 722. Nozzle head 730 is oriented to spray from a selected side, meaning that it is aimed to spray along a first selected spray azimuth angle in relation to a selected fixed reference point or datum 751 on the lens perimeter. Put another way, distally projecting nozzle head 730 is positioned beside and aimed to spray along a transverse spray axis aimed at the center of distal objective lens surface 722, so the spray axis from the nozzle head 733 is preferably aimed to intersect the lens axis 750 and that spray passes over the lens peripheral edge at reference point or datum 751.

Preferably, low-profile lens washing nozzle head 730 includes a first fluidic oscillator interaction chamber configured to operate on a selectively actuated flow of pressurized washing fluid flowing through the first oscillator's chamber to generate a first exhaust flow of fluid droplets 736, and the first nozzle assembly's fluid inlet 742 receives pressurized washer fluid and is in fluid communication with the first interaction chamber which passes the pressurized washer fluid distally to the first laterally offset outlet nozzle head 730 which is configured to exhaust the washer fluid from the first interaction chamber and generate a first oscillating spray of fluid droplets 736 aimed toward the external lens surface 722 and across the field of view. Optionally, as noted above, that fluidic oscillator is configured as a compact lateral-feed reverse mushroom fluidic oscillator (e.g., as illustrated in FIG. 18B). The preferred spray flow rate is approximately 200 ml/min per nozzle at 18 psi, and the spray thickness (i.e., which is seen as thickness in the spray plane transverse to the spray's fan angle plane, as shown in FIG. 5B) is preferably approximately 2 degrees. The oscillating action and large drops generated by the fluidic oscillator aimed by nozzle 730 in this manner were discovered to wet lens surface 722 very rapidly and provided a kinetic impact effect which was found to impact, dissolve and drive debris (e.g., like 223, not shown) as part of a flowing effluent laterally off lens surface 722.

Optionally, laterally offset low-profile washing nozzle head 730 is configured as a non-oscillating shear nozzle configured to generate a substantially flat fan spray having a selected wide spray fan angle (e.g., 90°) due to the very close proximity with the lens peripheral edge. Alternatively, laterally offset low-profile washing nozzle head 730 may be configured as a non-oscillating bug-eye nozzle configured to generate at least one substantially solid fluid jet (i.e., a substantially solid fluid stream having no fan angle).

Preferably, the laterally offset low-profile washing nozzle head 730 is configured to aim the spray 736 from a first selected lateral offset distance (from the nozzle's throat or outlet to the nearest peripheral edge 751 of objective lens' external surface 722) of about 3 mm. The selected lateral offset distance is preferably within the range bounded by 2 mm and 10 mm, in order to keep the entire package as compact as possible.

The low-profile camera lens washing assembly 710 illustrated in FIGS. 14A-14B is preferably is configured as an integrated automotive camera module and nozzle assembly, with camera module 712 and the aimed nozzle assembly integrally packaged as a one-piece unitary module configured for assembly into a vehicle 8. Substantially fluid impermeable camera module 712 has a cylindrical projection which is encircled and affixed within low-profile conformal housing fixture 711 and has an interior configured to enclose and aim an imaging sensor having an objective lens and a pixelated image sensor array (e.g., like 18), where a bezel or low-profile conformal housing fixture 711 is configured to support and aim the camera module 712. Camera module 712 comprises a self-contained and sealed module enclosing the image sensor array (e.g., like 18) and associated image signal processing components (e.g., as illustrated in FIG. 1D), and is substantially sealed to limit or substantially preclude water intrusion into the camera module's interior volume. Camera module 712 and low-profile integral housing 711 are configured to be positioned at or affixed upon vehicle 8 as a camera lens and lens washer unit 710. Camera module 712 also includes an electrical connector 770 suitable for electrically conductive connection to a vehicle electrical connector when the camera module housing is positioned at the vehicle 8. The camera module's electrical connector extends to be accessible at a proximal end for connecting to the vehicle electrical connector (or vehicle controller 9B) when the camera module is positioned at the vehicle 8 and camera module 712 is responsive to vehicle controller 9B to process video images captured by the imaging sensor.

Turning now to another low-profile embodiment of the lens washing system of the present invention, FIGS. 15A-15E illustrate a low-profile nozzle assembly 810 configured (preferably) with a low-profile conformal housing fixture 811 aiming a very compact lateral-feed reverse mushroom fluidic oscillator (having an spray-axis length of about 3 mm, which is much more compact that the previous oscillator's length of about 5 mm). The remotely controllable system and low-profile nozzle assembly provides a compact or axially short fluidic oscillator which generates a high velocity spray with a very wide fan angle and so can be integrated into the compact nozzle assembly for placement very near the periphery of the lens surface while remaining out of the camera's view, to provide a very compact and low profile unitary camera and camera washing nozzle assembly package. The compact nozzles may also be configured with nozzles configured to generate fan-shaped shear jets.

Low-profile external lens washing system and nozzle assembly 810 includes a conformal fluid transmission housing and spray aiming fixture 811 having a distal side 811D and a proximal side 811P. Conformal housing fixture 811 is configured to encircle and support an image sensor or camera 812 (or 712) and constrain the camera's external lens exposed toward the distal side; the external lens has an external lens surface 822 with a lens perimeter and a lens central axis 850 projecting distally from the lens surface 822, wherein a lens field of view is defined as a distally projecting solid angle (e.g., a truncated cone or pyramid, encompassing the view in display 209A) including the lens central axis 850 and originating within the lens perimeter. Washing system 810 includes at least a first nozzle assembly configured to be supported and aimed toward the external lens 822 by the low-profile conformal housing fixture 811 which defines an enclosed internal fluid transmission duct or lumen providing unimpeded continuous fluid communication between a fluid inlet 842 and the laterally offset, inwardly aimed washing nozzle head 830 which distally projects from the aiming fixture's distal side 811D (see FIG. 15E). Ring-shaped conformal housing fixture 811 is preferably made of plastic and carries an annular elastomeric or rubber seal between the proximal side surface 811P and the camera housing.

The nozzle head 830 is configured and aimed to spray washing fluid in a substantially planar sheet 836 having a selected thickness toward the external lens surface 822 and across the field of view, spraying at a first selected spray aiming angle (i.e., preferably spraying in a plane inclined proximally at an angle) of about 1°. The selected aiming angle can be in a range between 1° and 20° (as seen in FIG. 15B) relative to a plane tangent to the lens external surface 822. Nozzle head 830 is oriented to spray from a selected side, meaning that it is aimed to spray along a first selected spray azimuth angle in relation to a selected fixed reference point or datum 851 on the lens perimeter. Put another way, distally projecting nozzle head 830 is positioned beside and aimed to spray along a transverse spray axis aimed at the center of distal objective lens surface 822, so the spray axis from the nozzle head 833 is preferably aimed to intersect the lens axis 850 and that spray passes over the lens peripheral edge at reference point or datum 851.

Preferably, low-profile lens washing nozzle head 830 includes a first fluidic oscillator interaction chamber configured to operate on a selectively actuated flow of pressurized washing fluid flowing through the first oscillator's chamber to generate a first exhaust flow of fluid droplets 836, and the first nozzle assembly's fluid inlet 842 receives pressurized washer fluid and is in fluid communication with the first interaction chamber which passes the pressurized washer fluid distally to the first laterally offset outlet nozzle 830 which is configured to exhaust the washer fluid from the first interaction chamber and generate a first oscillating spray of fluid droplets 836 aimed toward the external lens surface 822 and across the field of view. Optionally, as noted above, that fluidic oscillator is configured as a compact lateral-feed reverse mushroom fluidic oscillator (e.g., as illustrated in FIG. 18B). The preferred spray flow rate is approximately 200 ml/min per nozzle at 18 psi, and the spray thickness (i.e., which is seen as thickness in the spray plane transverse to the spray's fan angle plane, as shown in FIG. 5B) is preferably approximately 2 degrees. The oscillating action and large drops generated by the fluidic oscillator aimed by nozzle 830 in this manner were discovered to wet lens surface 822 very rapidly and provided a kinetic impact effect which was found to impact, dissolve and drive debris (e.g., like 223, not shown) as part of a flowing effluent laterally off lens surface 822.

Optionally, laterally offset low-profile washing nozzle head 830 is configured as a non-oscillating shear nozzle configured to generate a substantially flat fan spray having a selected wide spray fan angle (e.g., 90°) due to the very close proximity with the lens peripheral edge. Alternatively, laterally offset low-profile washing nozzle head 830 may be configured as a non-oscillating bug-eye nozzle configured to generate at least one substantially solid fluid jet (i.e., a substantially solid fluid stream having no fan angle).

Preferably, the laterally offset low-profile washing nozzle head 830 is configured to aim the spray 836 from a first selected lateral offset distance (from the nozzle's throat or outlet to the nearest peripheral edge 851 of objective lens' external surface 822) of about 3 mm. The selected lateral offset distance is preferably within the range bounded by 2 mm and 10 mm, in order to keep the entire package as compact as possible.

The low-profile camera lens washing assembly 810 illustrated in FIGS. 15A-15E is preferably is configured as an integrated automotive camera module and nozzle assembly, with camera module 812 and the aimed nozzle assembly integrally packaged as a one-piece unitary module configured for assembly into a vehicle 8. Substantially fluid impermeable camera module 812 has a cylindrical projection which is encircled and affixed within low-profile conformal housing fixture 811 and has an interior configured to enclose and aim an imaging sensor having an objective lens and a pixelated image sensor array (e.g., like 18), where a bezel or low-profile conformal housing fixture 811 is configured to support and aim the camera module 812. Camera module 812 comprises a self-contained and sealed module enclosing the image sensor array (e.g., like 18) and associated image signal processing components (e.g., as illustrated in FIG. 1D), and is substantially sealed to limit or substantially preclude water intrusion into the camera module's interior volume. Camera module 812 and low-profile integral housing 811 are configured to be positioned at or affixed upon vehicle 8 as a camera lens and lens washer unit 810. Camera module 812 also includes an electrical connector 870 suitable for electrically conductive connection to a vehicle electrical connector when the camera module housing is positioned at the vehicle 8. The camera module's electrical connector extends to be accessible at a proximal end for connecting to the vehicle electrical connector (or vehicle controller 9B) when the camera module is positioned at the vehicle 8 and camera module 812 is responsive to vehicle controller 9B to process video images captured by the imaging sensor.

Figure 16B:
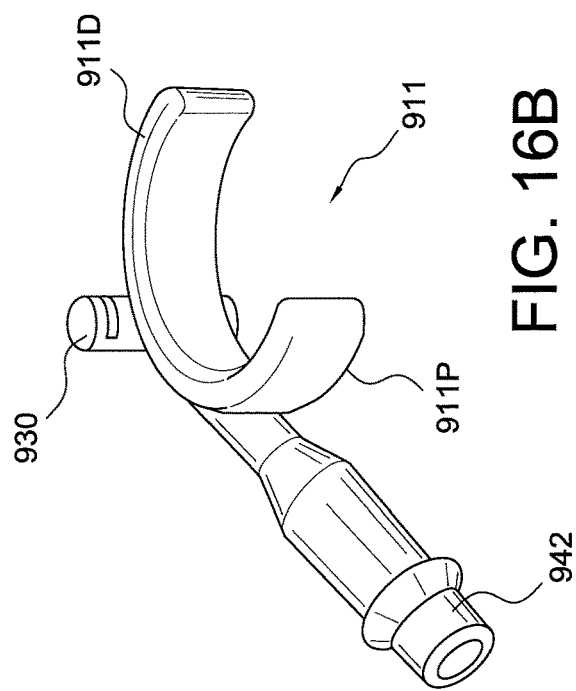
FIGS. 16A and 16B illustrate another conformal fluid transmission duct defining a substantially rigid housing, for use in the low profile nozzle assemblies of the present invention.
Figure 16A:
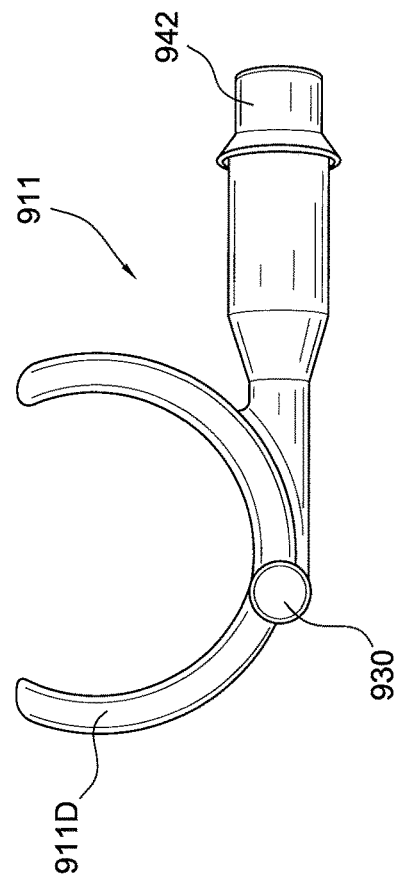

An alternative embodiment of the low-profile conformal housing fixture 911 is illustrated in FIGS. 16A-16B. Low-profile conformal housing fixture 911 also can be integrated into the compact nozzle assembly for placement very near the periphery of a lens surface (e.g., 722, 822) while remaining out of the camera's view, to provide a very compact and low profile unitary camera and camera washing nozzle assembly package.

Conformal fluid transmission housing and spray aiming fixture 911 has a distal side 811D and a proximal side 811P and is configured to partially encircle and support an image sensor or camera (e.g., 812 or 712) and constrain the camera's external lens exposed toward the distal side. A lens washing system (e.g., like 810 or 710) with low-profile conformal housing fixture 911 includes at least a first nozzle head assembly 930 configured to be supported and aimed toward the external lens surface (e.g., 822) by the rigid low-profile conformal housing fixture 811 which defines a fluid transmission duct or lumen providing unimpeded continuous fluid communication between a fluid inlet 942 and the laterally offset, inwardly aimed washing nozzle 930 which distally projects from the aiming fixture's distal side 811D (see FIG. 16B). The nozzle head 930 is configured and aimed to spray washing fluid in a substantially planar sheet (not shown) having a selected thickness toward the external lens surface and across the field of view, spraying at a first selected spray aiming angle (i.e., preferably spraying in a plane inclined proximally at an angle) of about 1°. The selected aiming angle can be in a range between 1° and 20° relative to a plane tangent to the lens external surface. Nozzle 930 is oriented to spray from a selected side, meaning that it is aimed to spray along a first selected spray azimuth angle in relation to a selected fixed reference point on the lens perimeter.

Preferably, low-profile lens washing nozzle head 930 includes a first fluidic oscillator interaction chamber configured to operate on a selectively actuated flow of pressurized washing fluid flowing through the first oscillator's chamber to generate a first exhaust flow of fluid droplets (e.g., like 836), and the Conformal housing fixture fluid inlet 942 receives pressurized washer fluid and is in fluid communication with the first interaction chamber which passes the pressurized washer fluid distally to the first laterally offset outlet nozzle head 930 which is configured to exhaust the washer fluid from the first interaction chamber and generate a first oscillating spray of fluid droplets aimed toward the external lens surface and across the field of view. Optionally, as noted above, that fluidic oscillator is configured as a compact lateral-feed reverse mushroom fluidic oscillator (e.g., as illustrated in FIG. 18B). The preferred spray flow rate is approximately 200 ml/min per nozzle at 18 psi, and the spray thickness (i.e., which is seen as thickness in the spray plane transverse to the spray's fan angle plane, as shown in FIG. 5B) is preferably approximately 2 degrees. The oscillating action and large drops generated by the fluidic oscillator aimed by nozzle head 930 in this manner were discovered to wet a lens surface very rapidly and provided a kinetic impact effect which was found to impact, dissolve and drive debris (e.g., like 223, not shown) as part of a flowing effluent laterally off the lens surface.

Optionally, laterally offset low-profile washing nozzle head 930 is configured as a non-oscillating shear nozzle configured to generate a substantially flat fan spray having a selected wide spray fan angle (e.g., 90°) due to the very close proximity with the lens peripheral edge. Alternatively, laterally offset low-profile washing nozzle 930 may be configured as a non-oscillating bug-eye nozzle configured to generate at least one substantially solid fluid jet (i.e., a substantially solid fluid stream having no fan angle).

Preferably, the laterally offset low-profile washing nozzle head 930 is configured to aim a spray from a first selected lateral offset distance (from the nozzle's throat or outlet to the nearest peripheral edge (e.g., 751) of objective lens' external surface (e.g., 722)) of about 3 mm. The selected lateral offset distance is preferably within the range bounded by 2 mm and 10 mm, in order to keep the entire package as compact as possible.

Figure 17:
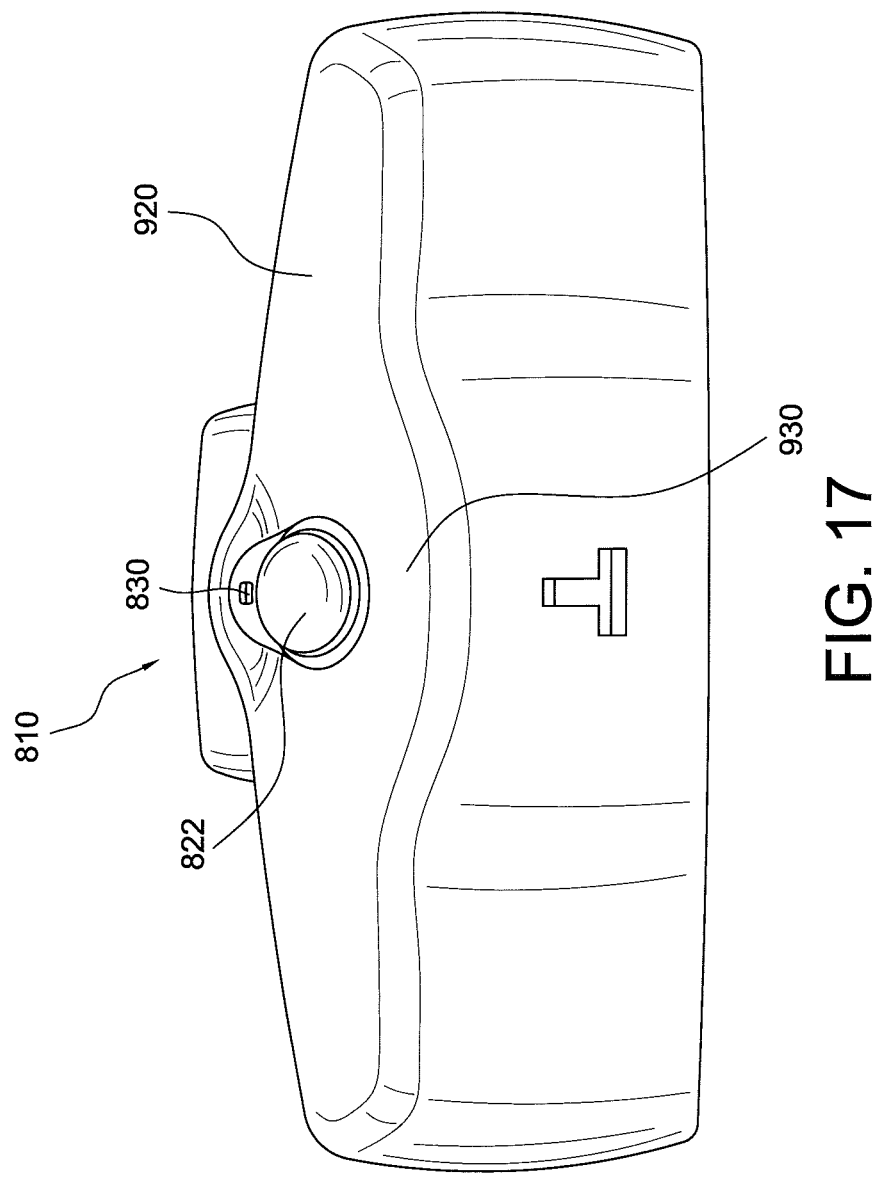
FIG. 17 illustrates a low profile camera wash system with the nozzle assembly of the present invention concealed within an automobile's external trim piece.

FIG. 17 illustrates low profile camera wash system (e.g., 810 or 710) with the nozzle head 830 concealed within an automobile's external trim piece 920 which has a substantially circular aperture fitted closely around camera lens surface 822. The external trim piece has an inconspicuous bulge or blister which entirely covers and substantially conceals nozzle head 830, while permitting the lateral spray 836 to project from the nozzle head 830 in an entirely unimpeded flow, where any accumulated debris or soil will be washed off of lens surface 822 and over the external outwardly facing downstream surface 930 of external trim piece 920.

Another low-profile embodiment of the lens washing system of the present invention is illustrated in FIGS. 18A-18F. Low-profile nozzle assembly 1010 is configured (preferably) with a low-profile conformal housing fixture 1011 aiming a very compact lateral-feed reverse mushroom fluidic oscillator 1200 (as shown in FIG. 18B and FIGS. 18D-18F having an spray-axis length 1210 of about 3 mm, which is much more compact that the previous oscillator's length of about 5 mm (see, e.g., FIG. 18A)). The low-profile nozzle head 1030 includes distally projecting boss 1030 which is proximate the peripheral edge of lens surface 1022 because compact or axially short fluidic oscillator 1200 generates a high velocity spray 1036 with a very wide fan angle (e.g., 90 degrees or more), to provide a very compact and low profile unitary camera and camera washing nozzle assembly package. Low profile nozzle head 1030 may also be configured to generate fan-shaped shear jets.

Low-profile external lens washing system and nozzle assembly 1010 includes a conformal fluid transmission housing and spray aiming fixture 1011 having a distal side 1011D and a proximal side 1011P. Conformal housing fixture 1011 is configured to encircle and support an image sensor or camera 1012 (or 712 or 812) and constrain the camera's external lens exposed toward the distal side; the external lens has an external lens surface 1022 with a lens perimeter and a lens central axis 1050 projecting distally from the lens surface 1022, wherein a lens field of view is defined as a distally projecting solid angle (e.g., a truncated cone or pyramid, encompassing the view in display 209A) including the lens central axis 1050 and originating within the lens perimeter. Washing system 1010 includes at least a first nozzle assembly configured to be supported and aimed toward the external lens 1022 by the low-profile conformal housing fixture 1011 which defines an enclosed internal fluid transmission duct or lumen which is defined in upper and lower levels for unimpeded continuous fluid communication between a fluid inlet 1042 and the nozzle head 1030 which optionally includes a cavity 1011C configured to cooperate with fluidic circuit insert 1200. More specifically, nozzle head 1030 is configured as an upwardly or distally projecting boss or wall segment which distally projects from the aiming fixture's distal side 1011D (see FIGS. 18D and 18F). Ring-shaped conformal housing fixture 1011 is preferably made of plastic and optionally carries an annular elastomeric or rubber seal between the proximal side surface 1011P and the camera housing.

Figure 18D:
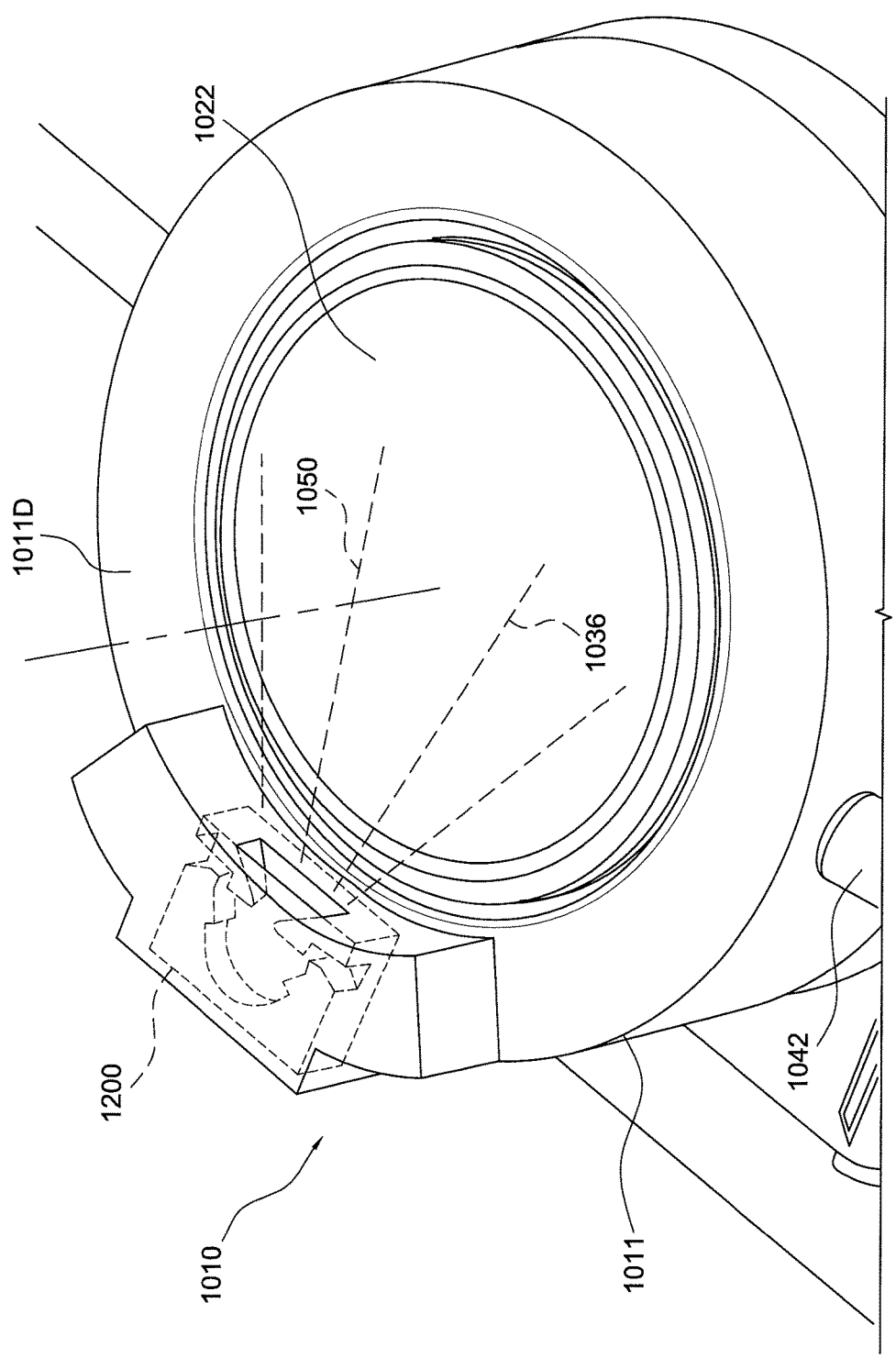

The nozzle 1030 is configured and aimed to spray washing fluid in a substantially planar sheet 1036 having a selected thickness toward the external lens surface 1022 and across the field of view, spraying at a first selected spray aiming angle (i.e., preferably spraying in a plane inclined proximally at an angle) of about 1°. The selected aiming angle can be in a range between 1° and 20° (as seen in FIG. 18D) relative to a plane tangent to the lens external surface 1022. Nozzle 1030 is oriented to spray from a selected side, meaning that it is aimed to spray along a first selected spray azimuth angle in relation to a selected fixed reference point or datum 1051 on the lens perimeter. Distally projecting nozzle head 1030 is positioned beside and aimed to spray along a transverse spray axis aimed at the center of distal objective lens surface 1022, so the spray axis from the nozzle head 1033 is preferably aimed to intersect the lens axis 1050 and that spray passes over the lens peripheral edge at reference point or datum 1051.

Preferably, low-profile lens washing nozzle fluidic circuit 1200 includes a first fluidic oscillator interaction chamber 1220 configured to operate on a selectively actuated flow of pressurized washing fluid flowing through the first oscillator's chamber 1220 to generate a first exhaust flow of fluid droplets 1036, and the conformal housing's fluid inlet 1042 receives pressurized washer fluid and is in fluid communication with the first interaction chamber 1220 which passes the pressurized washer fluid distally to the first laterally offset outlet nozzle 1030 which is configured to exhaust the washer fluid from the first interaction chamber 1220 and generate a first oscillating spray of fluid droplets 1036 aimed toward the external lens surface 1022 and across the field of view. Preferably, fluidic oscillator 1200 is configured as a compact lateral-feed reverse mushroom fluidic oscillator (e.g., as illustrated in FIGS. 18B-F). The preferred spray flow rate is approximately 200 ml/min per nozzle at 18 psi, and the spray thickness (i.e., which is seen as thickness in the spray plane transverse to the spray's fan angle plane, as shown in FIG. 5B) is preferably approximately 2 degrees. The oscillating action and large drops generated by the fluidic oscillator aimed by nozzle 1030 in this manner were discovered to wet lens surface 1022 very rapidly and provided a kinetic impact effect which was found to dislodge, dissolve and drive debris (e.g., like 223, not shown) as part of a flowing effluent laterally off lens surface 1022.

Optionally, laterally offset low-profile washing nozzle head 1030 may be configured as a non-oscillating shear nozzle configured to generate a substantially flat fan spray having a selected wide spray fan angle (e.g., 90°) due to the very close proximity with the lens peripheral edge. Alternatively, laterally offset low-profile washing nozzle head 1030 may be configured as a non-oscillating bug-eye nozzle configured to generate at least one substantially solid fluid jet (i.e., a substantially solid fluid stream having no fan angle).

Preferably, the laterally offset low-profile washing nozzle head 1030 is configured to aim the spray 1036 from a first selected lateral offset distance (from the nozzle's throat or outlet to the nearest peripheral edge 1051 of objective lens' external surface 1022) of about 3 mm, or less than the spray-axis length 1210 of fluidic oscillator insert 1200. The selected lateral offset distance is preferably within the range bounded by 2 mm and 10 mm, in order to keep the entire package as compact as possible.

The low-profile camera lens washing assembly 1010 illustrated in FIGS. 18A-18F is preferably is configured as an integrated automotive camera module and nozzle assembly, with camera module 1012 and the aimed nozzle assembly integrally packaged as a one-piece unitary module configured for assembly into a vehicle 8. Substantially fluid impermeable camera module 1012 has a cylindrical projection which is encircled and affixed within low-profile conformal housing fixture 1011 and has an interior configured to enclose and aim an imaging sensor having an objective lens and a pixelated image sensor array (e.g., like 18), where a bezel or low-profile conformal housing fixture 1011 is configured to support and aim the camera module 1012.

Camera module 1012 comprises a self-contained and sealed module enclosing the image sensor array (e.g., like 18) and associated image signal processing components (e.g., as illustrated in FIG. 1D), and is substantially sealed to limit or substantially preclude water intrusion into the camera module's interior volume. Camera module 1012 and low-profile integral housing 1011 are configured to be positioned at or affixed upon vehicle 8 as a camera lens and lens washer unit 1010. Camera module 1012 also includes an electrical connector 1070 suitable for electrically conductive connection to a vehicle electrical connector when the camera module housing is positioned at the vehicle 8. The camera module's electrical connector extends to be accessible at a proximal end for connecting to the vehicle electrical connector (or vehicle controller 9B) when the camera module is positioned at the vehicle 8 and camera module 1012 is responsive to vehicle controller 9B to process video images captured by the imaging sensor.

In accordance with the present invention (see, e.g., FIGS. 18C-18F), a compact, visually unobtrusive, low-profile image sensor lens washing system 1010 includes a first laterally offset spray nozzle which is supplied with washing fluid and physically supported and aimed by a conformal fluid transmission housing 1011. The distally projecting image sensor's objective lens structure has a cylindrical sidewall, and the peripheral edge of the objective lens surface 1022 is circular. The compact fluidic circuit oscillating sprayer head 1030 is configured to generate a wide fan-shaped oscillating transverse spray of cleaning fluid droplets 1036 which are sprayed across the image sensor's outwardly facing or exterior surface 1022. For circular objective lens surfaces, the conformal fluid transmission duct is configured as an annular ring-shaped member or circumferential arc-segment shaped member 1011 enclosing an interior lumen 1011L which defines the fluid flow channel. The ring-shaped or arc-shaped conformal fluid transmission duct is configured to be press-fit on or bonded to the image sensor's distally projecting lens member's cylindrical sidewall, proximate the lens member's free distal or objective lens end. The low-profile nozzle assembly's ring-shaped or arc-shaped conformal fluid transmission duct or low-profile conformal housing fixture 1011 includes a fluid inlet 1042 in fluid communication with the laterally offset washing nozzle's head 1030 and distally projecting boss 1011B which supports and aims fluidic oscillator 1200 to direct spray 1036 toward the external objective lens surface 1022 and across the image sensor's field of view at a selected shallow aiming angle.

Preferably, the low-profile nozzle assembly's fluidic oscillator insert or chip 1200 has opposing first and second lateral inlets or fluid feeds 1222, 1224 configured to operate on a selectively actuated flow of pressurized washing fluid flowing into the oscillator's interaction chamber 1220 to generate an internal oscillation and issue a transversely projecting exhaust flow of fluid droplets 1036. The nozzle assembly's conformal fluid transmission housing 1011 defines a substantially rigid housing having a cavity or socket 1011C configured to receive fluidic insert or chip 1200 which is unusually short, from front to back, viewed along the center axis of the spray fan, which is coaxial with a central axis of symmetry 1290 for fluidic circuit insert 1200.

The nozzle head 1030 is illustrated in a two-piece configuration. The conformal fluid transmission housing 1011 has upwardly projecting boss 1011B which defines the distal most portion of a substantially rigid enclosure having a cavity 1011C or socket which constitutes one of the two main nozzle pieces. The fluidic insert or chip 1200 constitutes the other. The conformal housing 1011 has a generally flat, planar floor surface defined in cavity 1011C which terminates in a wide, generally rectangular opening (see FIG. 18F) in an inward or lens-facing side surface of the housing's distally projecting boss 1011B. Internally, the fluid transporting lumen 1011L has first and second fluid branches in fluid communication with conformal housing lumen 1011L and the first and second fluid branches which rise within boss 1011B define laterally extending left and right power nozzle supply channels or lumens which terminate in opposing left and right openings in left and right sidewall surfaces in cavity 1011C. The first and second power nozzle supply lumens communicate with the interior volume defined within cavity 1011C, and when pressurized fluid is pumped into and through the left and right power nozzle supply channels, that fluid flows into cavity 1011C though the opposing left and right openings in left and right sidewall surfaces. Conformal fluid transmission duct member 1011 which defines the housing and cavity 1011C is configured to receive a tube or hose on inlet 1042 or may be configured with other means of conveying pressurized fluid into the housing's cavity 1011C.

The fluidic insert or chip 1200 is a generally flat member adapted to be forced or pressed into the housing's cavity 1011C and securely retained therein by the pressure exerted by the housing cavity walls on the insert. For this purpose the material from which the housing is fabricated is a solid plastic which deforms slightly under pressure. The cavity has a top wall and bottom wall which are spaced by a distance substantially equal to the thickness of the insert 1200 between the insert top surface and bottom surface. Optionally, the bottom surface may somewhat bowed, making the insert somewhat thicker along its middle. The insert's sidewalls are likewise spaced by a distance substantially equal to the width of insert between its left and right side or lateral edges. In a preferred embodiment, fluidic circuit insert 1200 may be a few thousandths of an inch wider than cavity 1011C. The insert and cavity may taper along their lengths, being wider at the forward end and narrowing toward the rearward end. The taper may be gradual or may be effected in plural discrete sections which are slightly angled toward one another.

The fluidic oscillator defined in the insert 1200 as a plurality of recessed portions in the top surface. Specifically, the oscillator includes left and right opposing power nozzle venturi-shaped channels 1222, 1224 directed inwardly toward the center of interaction region 1220. The forward end of the interaction region terminates in an exit throat or orifice 1230 which is aligned with the central axis of the fluidic 1290 and the spray pattern 1036 is preferably symmetrical about that axis 1290. All of the fluidic's features are defined as recesses of equal or varying depths into the top surface of the insert or chip. When the fluidic insert 1200 is fully inserted into the housing's slot or cavity 1011C, the housing's first and second laterally extending channels or lumens define left and right opposing openings between the left and right sidewall surfaces, and those left and right sidewall openings align with and communicate with the insert's left and right opposing power nozzle venturi-shaped channels 1222, 1224, so that water flowing into the conformal fluid transmission duct lumen 1011L and into the housing cavity's left and right sidewall openings flow into the corresponding left and right opposing power nozzle channels 1222, 1224 in opposing fluid flow directions and into the interaction chamber to generate oscillating vortices therein. In this manner pressurized fluid is delivered through the conformal housing's internal lumen 1011L and to the opposing first and second power nozzles 1222, 1224, so that an oscillation is established and a jet of fluid is swept back and forth to generate the desired spray 1036 which issues through the exit orifice 1230. When fluidic insert 1230 is pressed or forced into the cavity 1011C, the cavity's sidewalls are spread slightly and in turn exert a higher pressure along the middle of the insert. The oscillator formed in top surface of the insert is substantially centered between edges of the insert and is very tightly sealed against interior walls of the cavity 1011C so that a fluidic oscillator formed in a surface of the insert, or in a surface of the cavity, can be sealed solely by the pressure exerted by the forced fit engagement.

It should be noted that cavity 1011C and fluidic insert 1200, although shown as substantially planar, may be arcuate, angled, or otherwise configured, depending upon the housing shape and spray pattern desired. Likewise, oscillator channels may be defined in both the top and bottom surfaces of the insert (see, e.g., two-sided, folded stepped mushroom fluidic circuit insert 1300, FIGS. 20A and 20B) or in the top and bottom walls of the cavity 1011C. The only limitation is that the fluidic oscillator, whichever surface or surfaces it is defined in, is sealed by the abutting surface(s) through the pressure exerted by the force fit within the housing's cavity (e.g., 1011C).

When low profile nozzle assembly 1010 is in use, pressurized washer fluid flows into the first and second opposing lateral fluid inlets and then into the interaction chamber which passes the pressurized washer fluid distally to the outlet orifice 1230 which is configured aid aimed to spray or exhaust the washer fluid from the interaction chamber and generate an oscillating spray of high velocity fluid droplets 1036 aimed toward external objective lens surface 1022 and across the image sensor's field of view. As noted above, the illustrated fluidic oscillator 1200 is configured as a compact lateral-feed reverse mushroom oscillator circuit (having a length along axis 1290 of about 3 mm, which is much more compact that the previous oscillator's length of about 5 mm (e.g., as seen in FIG. 18A).

Figure 19:
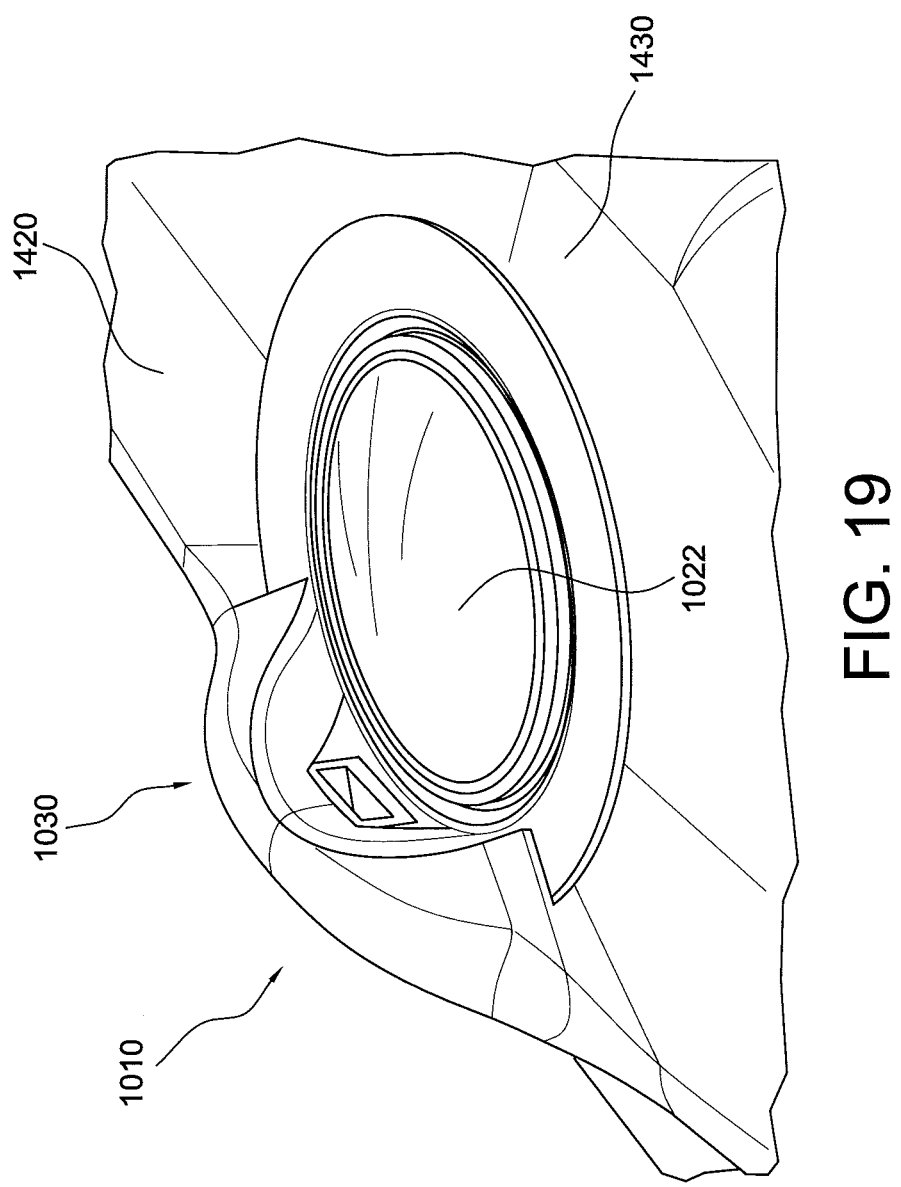
FIG. 19 illustrates a camera wash system with the low profile nozzle assembly of FIGS. 18D-18F concealed within an automobile's external trim piece.

The integrated, compact, low-profile nozzle assembly of the present invention generates the desired high velocity spray 1036 with a very wide fan angle so is ideally well suited for integration into very small, unobtrusive and compact nozzle assembly (e.g., 1010) for placement very near the periphery of the lens surface while remaining out of the camera's view, to provide a low profile unitary camera and camera washing nozzle assembly package, as shown in FIG. 19, which illustrates low profile camera wash system with the nozzle head 1030 substantially hidden or concealed within an automobile's external trim piece 1420 which has a substantially circular aperture fitted closely around camera lens surface 1022. The external trim piece 1420 has an inconspicuous bulge or blister which entirely covers and substantially conceals the distally projecting boss 1011B and the nozzle orifice 1230 from which spray 1036 emerges, while permitting the lateral spray to project from the nozzle in an entirely unimpeded flow, where any accumulated debris or soil will be washed off of lens surface 1022 and over the external outwardly facing downstream surface 1430 of external trim piece 1420.

Figure 20A:
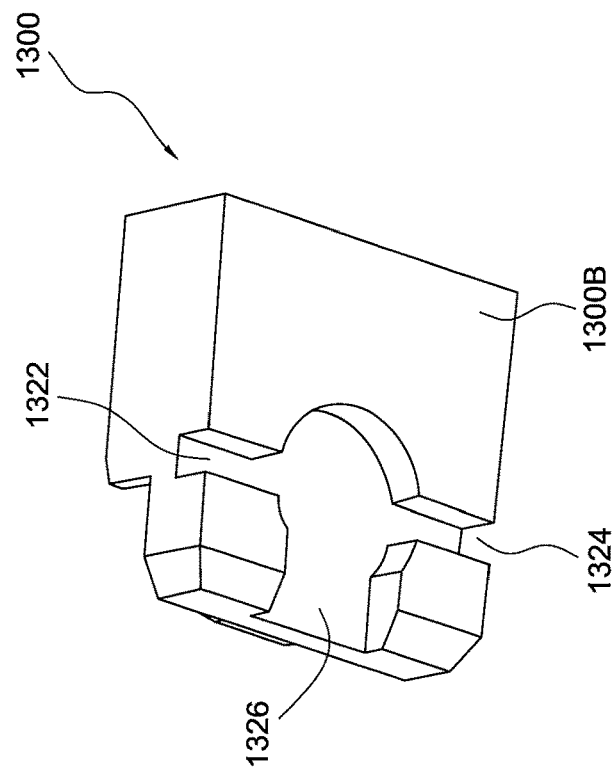
FIGS. 20A and 20B illustrate another new fluidic circuit insert which, in combination with a conformal fluid transmission duct and housing cavity, provides the spray and cleaning performance of larger nozzles in a very compact low profile nozzle assembly, in accordance with the present invention.
Figure 20B:
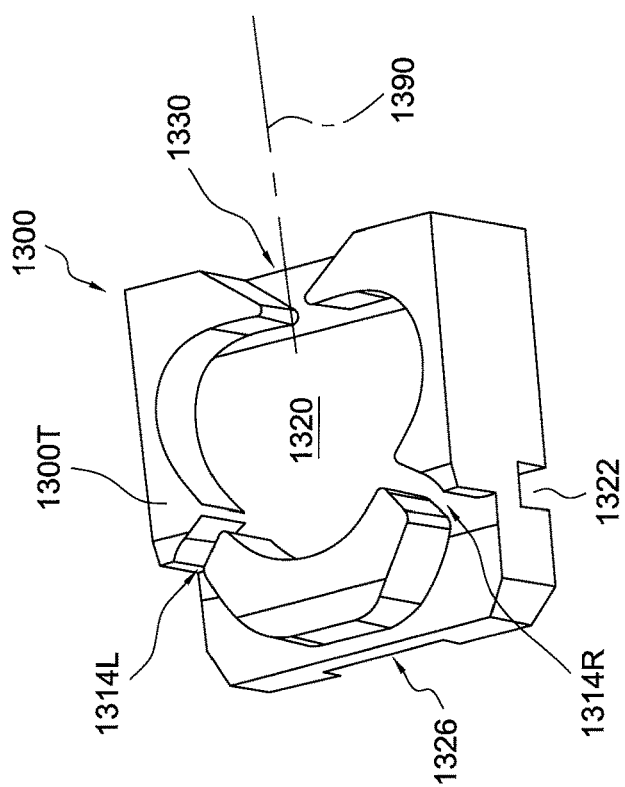

Turning now to the two-sided lateral feed mushroom fluidic circuit insert 1300, FIGS. 20A and 20B illustrate an alternative embodiment which differs slightly from the low profile nozzle assembly 1030 of FIGS. 18C-18F, in that it operates in a manner similar to operation of stepped mushroom fluidic oscillator insert 501, shown in FIGS. 12A and 12B, so two-sided lateral feed mushroom fluidic circuit insert 1300 was developed specifically to enable development of a low-profile lens washer system (e.g., 710, 810 or 1010) for unobtrusive installation on vehicle 8, and as before, a small flow rate is preferred for the low-profile nozzle (e.g., 730, 830, 1030). One embodiment used a fluidic nozzle with a target flow rate of 200+/−40 mL/min @ 18 PSI and this was shown to be very effective in cleaning the lens (e.g., 722, 822 or 1022) with the aforementioned low-profile packaging guidelines. With these flow and packaging considerations in mind, two-sided lateral feed mushroom fluidic circuit insert 1300 of FIGS. 20A and 20B was identified as a desirable fluidic insert configuration. This fluidic circuit (e.g., with two-sided, folded stepped mushroom chip 1300) is capable of performing well in cold weather conditions with 0.06 mm step and allows for very small packaging at (less than 5 mm×5 mm) for a 200 mL/min flow rate and 50° spray fan angle for spray (e.g., 1036). Most importantly, this design can maintain a minimum 0.014" power nozzle lumen dimension which is required for good clog-resistant performance. Power nozzles having lumen widths smaller than 0.014" risk spray stoppages due to clogging in automotive situations. The fluidic circuit may optionally be provided with internal filters (e.g., similar to posts 522 in chip 501, optionally placed near the inlet (e.g., in bottom side channel segment 1326)) or with an external filter. Additionally, this circuit design allows for a small interaction region 1320, helping to support large fluid spray fan angles and still staying within the target packaging space.

The fluid dynamic properties of two-sided lateral feed mushroom fluidic circuit insert 1300 are similar to a stepped mushroom fluidic oscillator as described in commonly owned U.S. Pat. No. 7,267,290, the entirety of which is incorporated herein by reference. Referring again to FIGS. 20A and 20B, the removable fluidic chip 1300 has a top side surface 1300T opposite a bottom side surface 1300B and an oscillating chamber 1320 will be defined between the fluid impermeable surfaces of chip 1300 and the nozzle assembly housing's chip-receiving cavity's interior surfaces (e.g., 1011C, as seen in FIG. 18F), when inserted. As with the embodiments described above, the insert's thickness (defined by the distance between top surface 1300T and the bottom surface 1300B) is substantially equal to the spacing between the housing cavity's sidewalls, and the insert's left and right sidewalls are likewise spaced by a distance substantially equal to the width of the cavity's opening, between the cavity's left and right sides or lateral edges. In a preferred embodiment, the insert may be a few thousandths of an inch wider than the cavity. The insert and cavity may taper along their lengths, being wider at the forward end and narrowing toward the rearward end. The taper may be gradual or may be effected in plural discrete sections which are slightly angled toward one another (e.g., as shown in FIGS. 20A and 20B).

Two-sided lateral feed mushroom fluidic circuit insert 1300 with interaction chamber 1320 is suitable for use at colder temperatures for an exhaust flow in the form of oscillating spray of fluid droplets (e.g., 1036) and has a pair of power nozzles 1314L and 1314R of selected width and depth to aimed to accelerate the pressurized fluid into interaction chamber 1320 which receives the flow from the power nozzles and issues a fluid spray centered on spray axis 1390 from outlet orifice 1330.

A low profile nozzle assembly (e.g., 710, 810, 1010) using two-sided lateral feed mushroom fluidic circuit insert 1300 has a conformal housing (e.g., 1010 with a cavity (e.g., 1010C) that receives fluid from the sides which flows inwardly along the bottom surface of the cavity into the insert's left and right side channels defining left and right side inlet lumens 1322, 1324 as defined in bottom surface 1300B (seen in FIG. 20B) and the fluid flows from inlet lumens 1322, 1324 into and through the bottom-side fluid channel inlet segment 1326 and then upwardly over the insert's back edge 1300B via a passage defined within the housing's cavity (not shown) to flow distally or forwardly along features defined in the top surface 1300T of insert 1300 and into interaction chamber 1320 by flowing through fluid channel inlet segment 1326 and upwardly. The cavity in the conformal housing for fluidic circuit insert 1300 thus has a channel or passage permitting such flow behind the insert 1300, but the front-to back depth of the cavity (not shown) is still very short (e.g., along axis 1290 or 1390), so the resulting camera-wash nozzle assembly will still provide a very low profile, similar to that shown in FIG. 19.

Fluid flow paths through the features defined in two-sided lateral feed mushroom fluidic circuit insert 1300 are characterized as a fluid flow channel beginning with the left and right side inlet lumens 1322, 1324, which are in fluid communication with and supply pressurized fluid to the fluid channel's inlet segment 1326, all on the bottom surface 1300B, as shown in FIG. 20B. The fluid flow channel also includes a fluid passage around the back edge 1300B of the insert and into the features defined in top surface 1300T, including left and right power nozzles 1314L and 1314R which receive the pressurized fluid from fluid channel inlet segment 1326 and provide fluid communication into interaction chamber 1320 and then to outlet orifice 1330. The fluid flow channel, as thus defined, may be configured with a flow instability generating structural feature for increasing the instability of the fluid's flow from the power nozzles, with this structural feature being situated in a location chosen from the group consisting of a location within or proximate fluid channel inlet segment 1326 or proximate the power nozzles 1314L, 1314R. The flow instability generating feature may comprise geometric features of the lumen walls as they intersect fluid channel inlet segment 1326, in that they define outside corner shaped features which project or protrude inwardly from each sidewall defining the fluid channel inlet segment 1326 and so may be configured to cause a flow separation region downstream of the corner features or protrusions. The flow instability generating feature may also be defined as a step or depth change in the height elevation of the floor of the power nozzles 1314L, 1314R with respect to that of the interaction chamber 1320, as best seen in FIG. 20A.

In accordance with the present invention, an integrated automotive system, fluidic circuit nozzle assembly (e.g., 210, 310, 610, or for low profile embodiments, 710, 810, 1010) is useful in the practicing the method for aiming an oscillating spray to clean an exterior objective lens surface and allows the driver to determine when to clean a soiled external-view camera's objective lens, so the driver can ensure that the lens is adequately cleaned before moving.

In the lens cleaning system of the present invention (e.g., 210, 310, 610, or for low profile embodiments 710, 810, 1010), low flow rate fluidic circuit nozzles may be configured to effect bottle cleanings savings, conservation of fluid, and conservation of pressure. Conservation of pressure is especially important when the camera lens cleaning system is integrated into an existing front wash system, where the camera lens washing system must function without detrimentally affecting front glass cleaning, especially under dynamic driving conditions, where the front glass cleaning system's performance is highly sensitive to fluid pressure. The system and method of the present invention is not limited to use with low flow rate nozzles exclusively. Applicants have prototyped a relatively high flow rate nozzle assembly on an exemplary system and it works well, although the camera's image is somewhat compromised when washing. It appears that the low flow rate is best accomplished thru a selected fluidic circuit geometry which allows control of droplet size, since droplet size should remain larger when compared to a shear nozzle's non-oscillating spray.

The lens washing spray method of the present invention presents a very nicely distributed oscillating spray pattern with the following benefits:

nearly flush mounting to the camera lens, so the camera wash assembly package does not interfere with camera viewing angles as would a directed impact nozzle configuration; and places the nozzle orifice very close to the lens periphery to keep the overall width of the package small; e.g., a dome-shaped or convex ("bug-eye") lens would likely need to have the nozzle spray originate from well in front of the lens, angled back, and pushed away from the center line to avoid sight lines, although this would result in a wider and longer package.

The applicants have found that directly spraying nearly parallel to the objective lens assembly's external surface results in less washing fluid (e.g., water) remaining on the lens after conclusion of spraying, preventing water droplets from forming on the lens and obstructing the view, whereas, in prototype development experiments, a more nearly on-lens axis or direct impingement spray method is likely to leave view-obstructing droplets behind.

Having described preferred embodiments of a new and improved lens cleaning system and method, it is believed that other modifications, variations and changes will be suggested to those skilled in the art in view of the teachings set forth herein. It is therefore to be understood that all such variations, modifications and changes are believed to fall within the scope of the present invention.

What is claimed is:

1. A compact, low-profile nozzle assembly configured for placement very near and cleaning of a wide-angle image sensor's exterior surface, comprising:

a rigid, low-profile conformal housing fixture enclosing an internal fluid transmission lumen and providing fluid communication from a conformal housing fixture fluid inlet to a housing fixture distally projecting low-profile nozzle head;

said low-profile conformal housing fixture being configured with a distal side surface opposing a proximal side surface, wherein said distally projecting low-profile nozzle head projects from said housing's distal surface; and said low-profile conformal housing fixture being configured to wrap around or encircle and support an image sensor housing sidewall surface terminating distally in an objective lens surface, wherein said distally projecting nozzle head is positioned beside and aimed to spray along a transverse spray axis aimed at the center of said distal objective lens surface, wherein said low-profile nozzle head is configured to aim a spray issuing from the nozzle's outlet orifice along the spray axis toward the periphery of objective lens' external surface, and wherein the lateral offset distance between said nozzle's outlet orifice and the periphery of objective lens' external surface is selected to be in the range of 2 mm to 10 mm, in order to provide a compact, unobtrusive nozzle assembly, wherein said nozzle head includes a compact fluidic oscillator having an interaction chamber terminating in said outlet orifice, said oscillator being supported with the oscillator's outlet orifice centered on the spray axis, and said oscillator having an axial length along the spray axis of about 3 mm, and wherein said low-profile nozzle head's compact fluidic oscillator's interaction chamber has opposing lateral inlets or fluid feeds configured to operate on a selectively actuated flow of pressurized washing fluid flowing through the oscillator's chamber to generate an exhaust flow of fluid droplets through said outlet spray orifice.

2. The compact, low-profile nozzle assembly of claim 1, wherein said low-profile nozzle head is configured to aim a spray issuing from the nozzle's outlet orifice toward the periphery of objective lens' external surface, and wherein the lateral offset distance between said nozzle's outlet orifice and the periphery of objective lens' external surface is selected to be in the range of 2 mm to 3 mm.

3. The compact, low-profile nozzle assembly of claim 1, wherein said compact fluidic oscillator with a fluidic oscillator interaction chamber with opposing lateral inlets comprises a lateral feed reverse mushroom fluidic oscillator.

4. The compact, low-profile nozzle assembly of claim 1, wherein said compact fluidic oscillator with a fluidic oscillator interaction chamber with opposing lateral inlets comprises a two-sided lateral feed mushroom fluidic oscillator.

5. The compact, low-profile nozzle assembly of claim 4, wherein said fluidic oscillator has a fluid channel inlet segment in fluid communication with at least a pair of power nozzles configured to accelerate the movement of pressurized fluid that flows through said power nozzles so as to form a jet of fluid that flows from each said power nozzle, all being part of a fluid channel pathway that connects and allows for the flow of said fluid between said inlet and said power nozzles;

wherein said fluid channel pathway is defined between boundary surfaces that include a pair of sidewalls, said interaction chamber attached to said nozzles and which receives said jet flows from said nozzles, wherein said outlet orifice exhausts spray from said interaction chamber, and wherein said fluid channel pathway also includes a flow instability inducing feature configured to increase the instability of said flow from said power nozzles, said flow instability inducing feature being configured within said pathway at a location upstream of said power nozzles.

6. The compact, low-profile nozzle assembly of claim 5, wherein said flow instability inducing feature comprises a pair of protrusions that extend inward from said fluid pathway boundary surface, said protrusions configured to cause a flow separation region downstream of said protrusions.

7. The compact, low-profile nozzle assembly of claim 5, wherein said flow instability inducing feature comprises a protrusion that extends inward from each said sidewall of said pathway, said protrusions configured to cause a flow separation region downstream of said protrusions.

8. The compact, low-profile nozzle assembly of claim 5, wherein said flow instability inducing feature comprises a step discontinuity or change in the floor depth configured to cause a flow separation region downstream of said flow instability inducing feature.

9. The compact, low-profile nozzle assembly of claim 1, wherein said fluidic oscillator is configured to generate an oscillating spray of high velocity fluid droplets which impact said external objective lens surface at a shallow angle and wherein said oscillating spray washes and across said image sensor's entire field of view to remove soil, grime and obstructions from said objective lens surface.

10. The compact, low-profile nozzle assembly of claim 9, wherein fluidic oscillator is configured to generate said oscillating spray of high velocity fluid droplets in a flat, fan-shaped spray pattern having a selected fan angle so that said droplets impact substantially the entire external objective lens surface.

11. The compact, low-profile nozzle assembly of claim 10, wherein said oscillating spray's selected fan angle is selected to be in the range 50 degrees to 90 degrees so that said droplets impact substantially the entire external objective lens surface.

12. The compact, low-profile nozzle assembly of claim 9, wherein said low-profile conformal housing fixture and said image sensor housing are permanently affixed to one another to provide a unitary, integrated compact, low-profile image sensor and washing nozzle assembly, wherein said integral nozzle assembly's nozzle head is configured to generate a high velocity spray with a fan angle which is matched for nozzle head placement within 3 mm of the periphery of the lens surface while remaining out of the image sensor's field of view, to provide a very compact and low profile unitary camera and camera washing nozzle assembly package.

13. The compact, low-profile nozzle assembly of claim 1, wherein said distally projecting low-profile nozzle head defines a cavity in fluid communication with said conformal housing's internal fluid transmission lumen and providing fluid communication from a conformal housing fixture fluid inlet; and
wherein said nozzle head cavity has first and second lateral openings which are in fluid communication with said housing's internal fluid transmission lumen.

14. The compact, low-profile nozzle assembly of claim 13, wherein said compact fluidic oscillator is configured as a removable insert having a first (e.g., top) surface, a second surface opposing the first surface, a left side surface and a right side surface; and
wherein said fluidic circuit oscillator's interaction chamber and other features are defined in at least one of said insert's surfaces.

15. The compact, low-profile nozzle assembly of claim 14, wherein said interaction chamber has opposing lateral inlets or fluid feeds defined in said inserts left side surface and said right side surface; and
wherein said nozzle head cavity's first and second lateral openings are in fluid communication with said insert's opposing lateral fluid feeds defined in said insert's left side surface and said right side surface when said insert is installed in said cavity; and
wherein said nozzle head is configured to provide a selectively actuated flow of pressurized washing fluid through the oscillator's chamber when said insert is installed in said cavity and said oscillator being supported with the oscillator's orifice centered on the spray axis.

16. The compact, low-profile nozzle assembly of claim 15, wherein said oscillator insert has an axial length along the spray axis of about 3 mm.

17. The compact, low-profile nozzle assembly of claim 16, wherein said oscillator insert comprises a lateral feed reverse mushroom fluidic oscillator with the lateral inlets and the interaction chamber defined in either the first (e.g., top) surface or the opposing second surface of the insert.

18. The compact, low-profile nozzle assembly of claim 17, wherein said oscillator insert comprises a two-sided lateral feed mushroom fluidic oscillator having the interaction chamber defined in the insert's first surface;
wherein the opposing lateral inlets or fluid feeds defined in said inserts left side surface and said right side surface which are in fluid communication with a fluid channel inlet segment defined in the insert's second surface; and
wherein said fluid channel inlet segment defined in said second surface is in fluid communication with said interaction chamber defined in said top surface when said insert is installed in said cavity.

19. The compact, low-profile nozzle assembly of claim 18, wherein said two-sided lateral feed mushroom fluidic oscillator's fluid channel inlet segment is also in fluid communication with at least a pair of power nozzles defined in said insert's first surface and configured to accelerate the movement of pressurized fluid that flows through said power nozzles so as to form a jet of fluid that flows from each said power nozzle, all being part of a fluid channel pathway that connects and allows for the flow of said fluid between said inlet defined in said insert's second surface and said power nozzles defined in said insert's first surface;
wherein said fluid channel pathway is defined between boundary surfaces that includes a pair of sidewalls, an interaction chamber attached to said nozzles and which receives said jet flows from said nozzles, an outlet orifice from which said spray exhausts from said interaction chamber, and
wherein said fluid channel pathway also includes a flow instability inducing feature configured to increase the instability of said flow from said power nozzles, said flow instability inducing feature being attached to said pathway at a location upstream of said power nozzles, wherein said flow instability inducing feature is defined in said pathway as defined in said insert's first side or said insert's second side.

20. The compact, low-profile nozzle assembly of claim 19, wherein said flow instability inducing feature comprises a pair of protrusions that extend inward from said fluid pathway boundary surface, said protrusions configured to cause a flow separation region downstream of said protrusions.

21. The compact, low-profile nozzle assembly of claim 19, wherein said flow instability inducing feature comprises a protrusion that extends inward from each said sidewall of said pathway, said protrusions configured to cause a flow separation region downstream of said protrusions.

22. The compact, low-profile nozzle assembly of claim 19, wherein said flow instability inducing feature comprises a step discontinuity or change in the floor depth configured to cause a flow separation region downstream of said flow instability inducing feature.

* * * * *